US006631207B2

(12) United States Patent
Hirota et al.

(10) Patent No.: US 6,631,207 B2
(45) Date of Patent: *Oct. 7, 2003

(54) IMAGE PROCESSOR INCLUDING PROCESSING FOR IMAGE DATA BETWEEN EDGE OR BOUNDARY PORTIONS OF IMAGE DATA

(75) Inventors: Yoshihiko Hirota, Toyokawa (JP); Kazuhiro Ishiguro, Toyohashi (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,538

(22) Filed: Mar. 17, 1999

(65) Prior Publication Data

US 2003/0142865 A1 Jul. 31, 2003

(30) Foreign Application Priority Data

Mar. 18, 1998 (JP) ............................................ 10-068988

(51) Int. Cl.$^7$ .................................................. G06K 9/00
(52) U.S. Cl. ........................ 382/167; 358/2.99; 358/518
(58) Field of Search ................................. 382/162–167, 382/198–199, 200, 206, 256–259, 266, 274–275; 358/1.19, 1.1, 1.11, 515–523, 529–530, 532–536, 447, 453–464, 467; 348/453, 606–607, 625–631; 345/150

(56) References Cited

U.S. PATENT DOCUMENTS

| 4,010,446 A | * | 3/1977 | Kawa ........................... 382/258 |
| 5,357,353 A | * | 10/1994 | Hirota .......................... 358/518 |
| 5,838,455 A | | 11/1998 | Imaizumi et al. ............ 358/298 |
| 5,850,293 A | | 12/1998 | Suzuki et al. ................ 358/298 |
| 5,867,285 A | | 2/1999 | Hirota et al. ................. 358/522 |
| 5,974,191 A | * | 10/1999 | Harada et al. ............... 382/258 |

FOREIGN PATENT DOCUMENTS

| JP | 404178892 | * | 6/1992 | .................. 382/258 |

* cited by examiner

Primary Examiner—Jingge Wu
(74) Attorney, Agent, or Firm—Sidley Austin Brown & Wood LLP

(57) ABSTRACT

In order to improve character edge reproducibility in reproducing a color document image, a boundary between a character and a background is detected in color image data. Further, if the detected edge exists at the side of a character, it is decided as a true edge, and the image data are subjected to edge emphasis. Then, when an image is reproduced, undesirable partial whitening in characters in the image can be prevented.

10 Claims, 52 Drawing Sheets

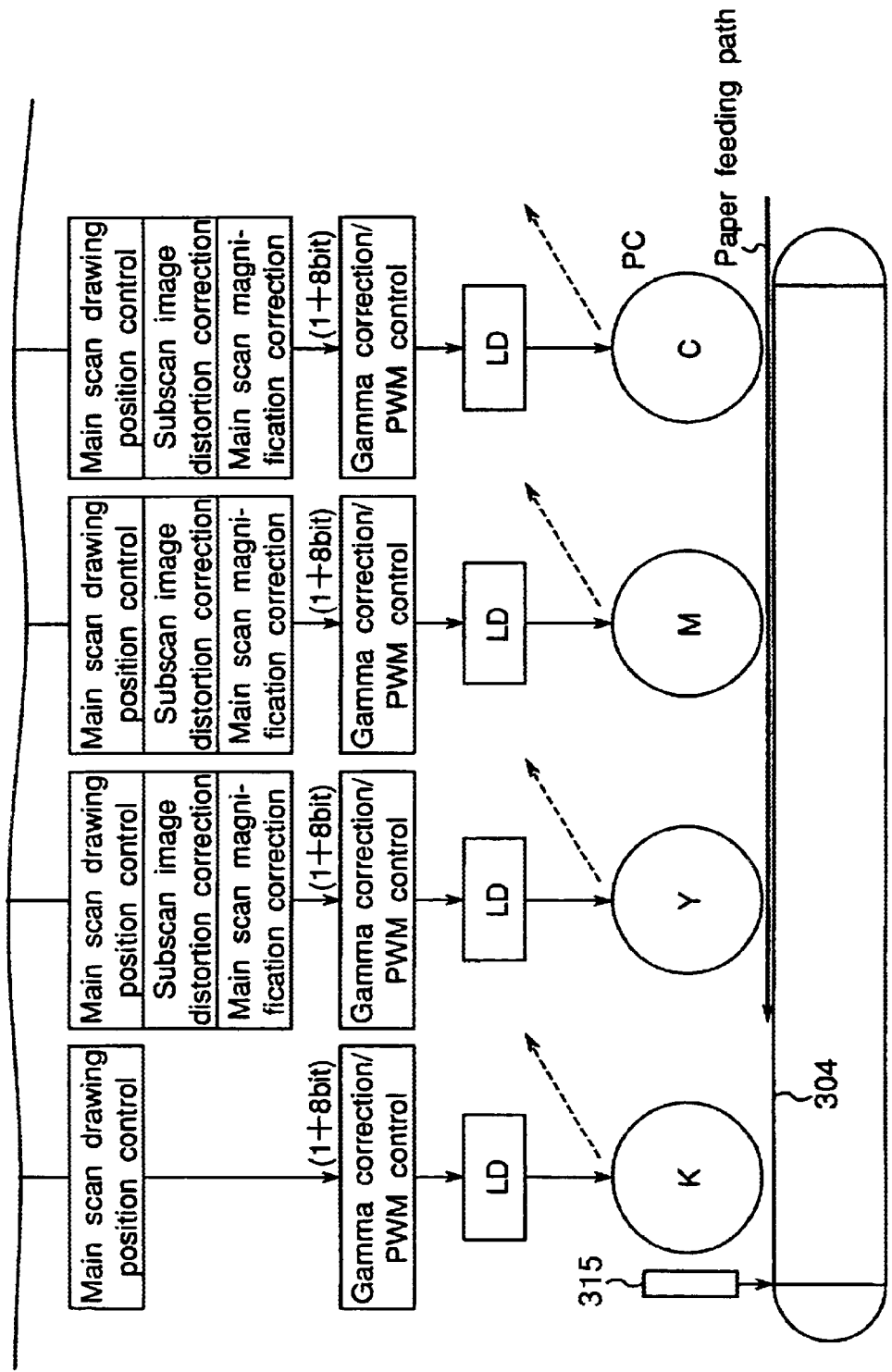

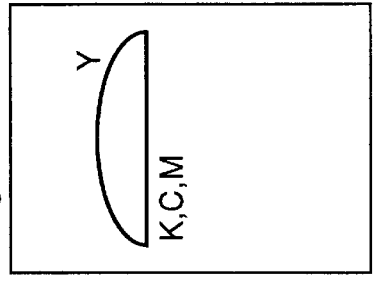
Fig.5A — Shift of subscan drawing position
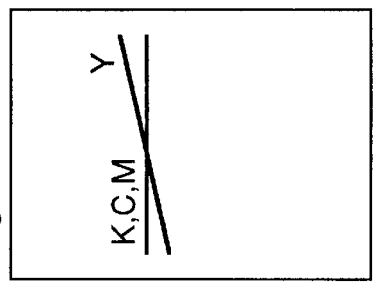
Fig.5B — Skew
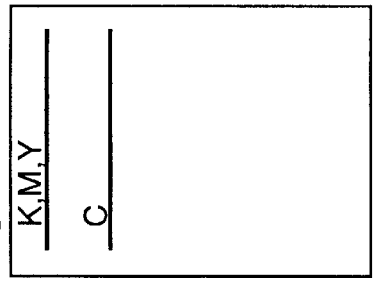
Fig.5C — Bow distortion
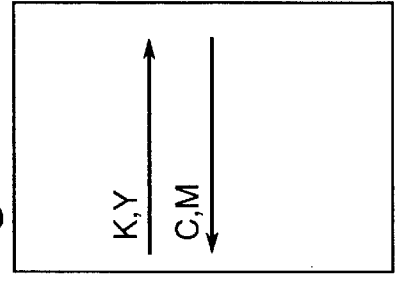
Fig.5D — Distortion of main scan magnification
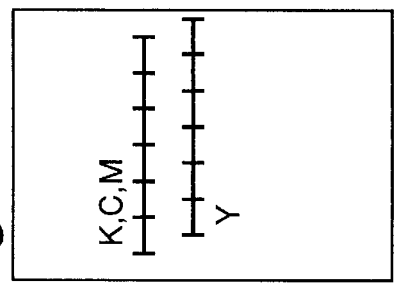
Fig.5E — Shift of main scan drawing position
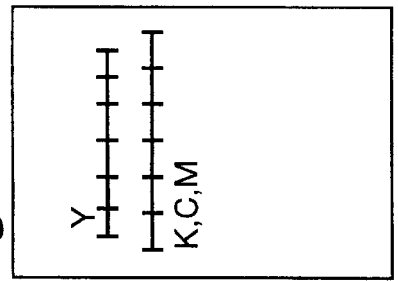
Fig.5F — C,M mirror image Fig.19
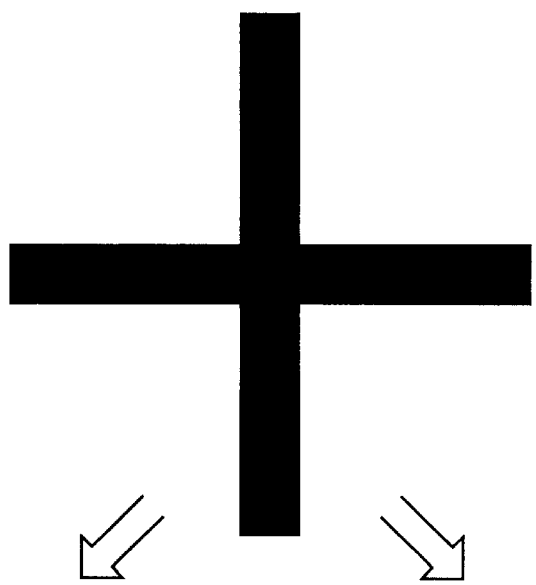
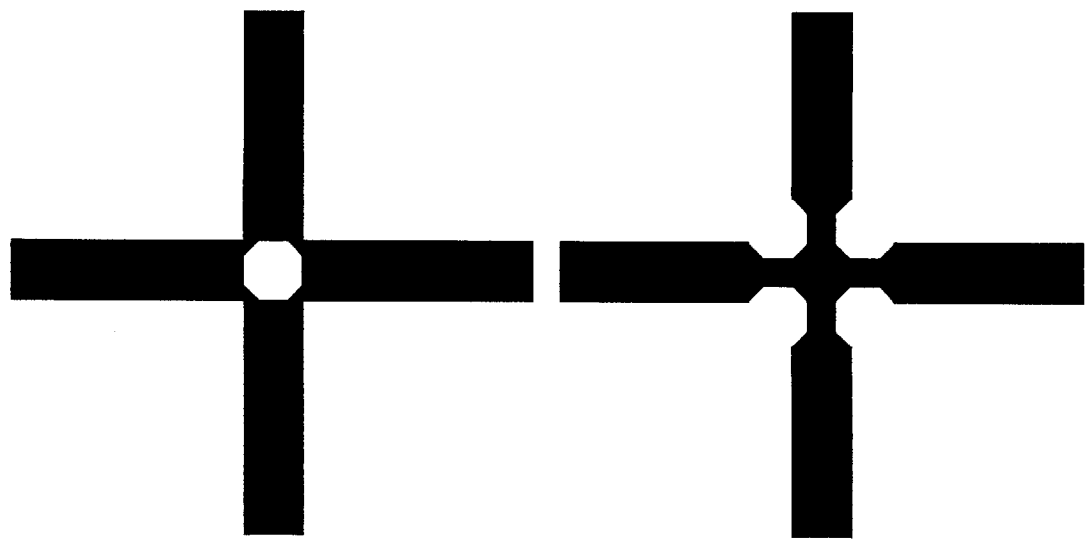
Loss of crossing point
Lines thinned
partially
at intersection

Fig.23

| -1/4 | 0 | 0 | 0 | -1/4 |
|---|---|---|---|---|
| 0 | 0 | 0 | 0 | 0 |
| 0 | 0 | 0 | 0 | 0 |
| 0 | 0 | 0 | 0 | 0 |
| -1/4 | 0 | 0 | 0 | -1/4 |

Fig.24

| 1/4 | 1/2 | 1/4 |
|---|---|---|

IMAGE PROCESSOR INCLUDING PROCESSING FOR IMAGE DATA BETWEEN EDGE OR BOUNDARY PORTIONS OF IMAGE DATA

This application is based on application No. 10-68988/1998 filed in Japan, the content of which is incorporated hereinto by reference.

BACKGROUND OF THE INVENTION

1. Field of the Invention

The present invention relates to an image processor which receives color image data and converts them to image data used for image forming.

2. Description of Prior Art

In reproduction of a color image, it is known generally to detect character edges in input color image data and to emphasize the edges according to the detection results. This improves reproducibility of characters by emphasizing gradation contrast of the background and the characters. However, whitening arises due to contrast emphasis around the characters, and the characters are bordered. Then, in a proposed method, boundaries are detected between characters and the background, and peripheral portions of the characters are detected. Then, the lowest density level among the peripheral pixels is selected in the peripheral portions of the characters.

The proposed method can solve the problem of partial whitening in the peripheral portions of the characters, but there is a problem of bordering of the characters. As to bordering due to edge emphasis at the characters, the obtained image is not so disagreeable if the line width of the character image is wide. However, as to a particular line width, an area disposed between two character edge areas becomes as narrow as one or two dots, and partial disappearance of characters may happen. This phenomenon deteriorates character reproducibility although edge emphasis is performed.

SUMMARY OF THE INVENTION

An object of the present invention is to provide an image processor which improves reproducibility of character edges.

In one aspect of the invention, in an image processor which processes image data of an image consisting of a plurality of pixels, a first allocator decides an edge portion in the image included in the image data and allocates a specified attribute as an attribute of pixels located in the edge portion. Then, a second allocator allocates the specified attribute as an attribute of pixels located in an area interposed between two edge portions.

In another aspect of the invention, in an image processor which processes image data of an image consisting of a plurality of pixels, a first allocator decides a boundary portion between a character image and a background in the image included in the image data and allocates a specified attribute as an attribute of pixels located in the boundary portion. Then, a second allocator allocates the specified attribute as an attribute of pixels located in an area interposed between two boundary portions. An area discriminator discriminates whether each of the image data belongs to a character image area or a background image area, and a corrector performs a specified correction for image data of the pixels to which the specified attribute is allocated by the first and second allocators according to discrimination by the area discriminator.

An advantage of the present invention is that partial whitening in characters is prevented when they are reproduced and that the reproducibility of characters is improved by discriminating character edges.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 4A and 4B are parts of a diagram on relationship between a system constitution of the copying machine and a print image controller block;

FIGS. 5A–5F show color shifts caused due to six types of factors;

FIG. 19 is a diagram on image deterioration on a cross portion due to a generation;

FIG. 23 is a diagram of a Laplacian filter;

FIG. 24 is a diagram, of a smoothing filter;

DETAILED DESCRIPTION OF THE PREFERRED EMBODIMENTS

Figure 1:
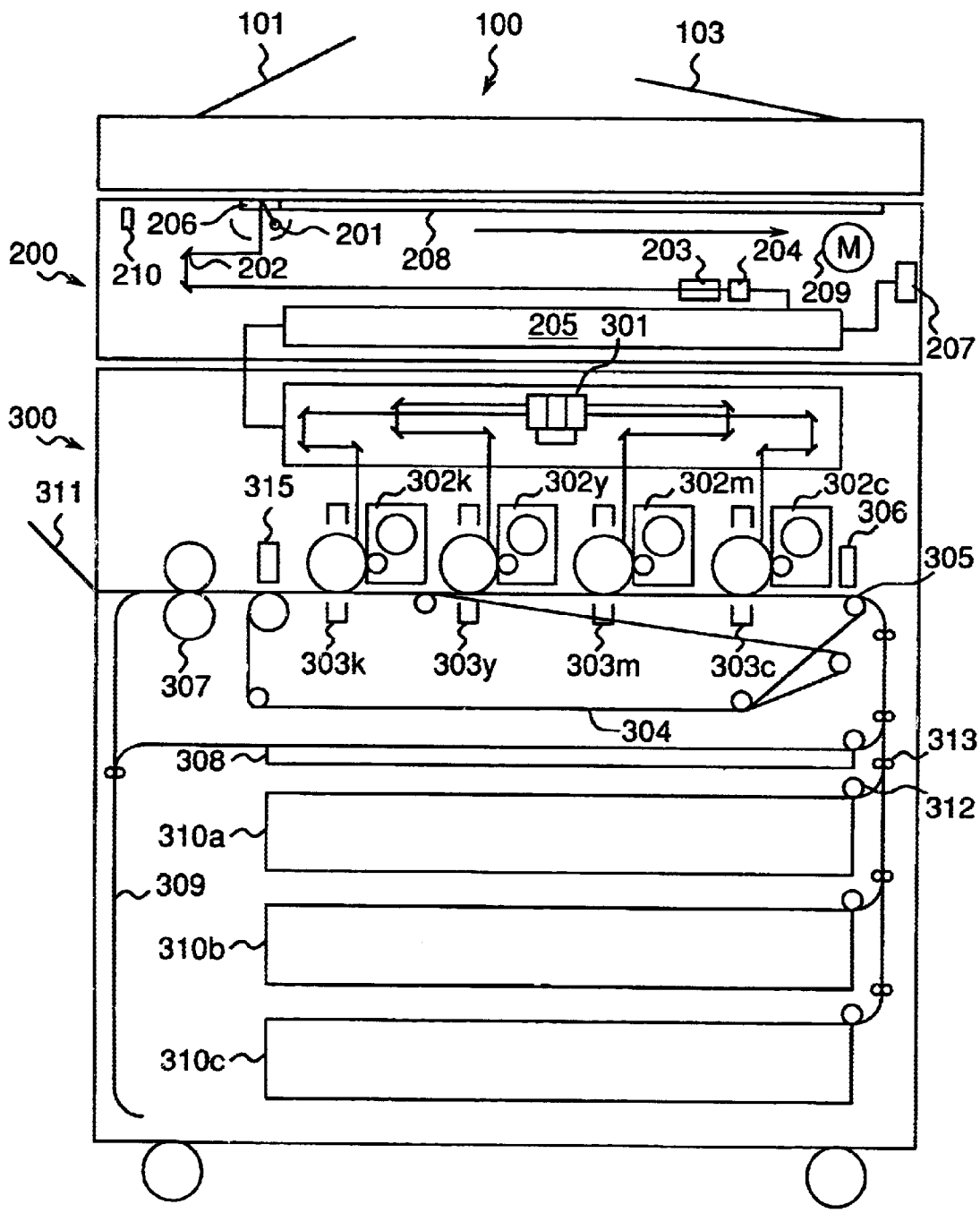
FIG. 1 is a cross sectional view of a color digital copying machine.

Referring now to the drawings, wherein like reference characters designate like or corresponding parts throughout the several views, FIG. 1 shows a whole structure of a color digital copying machine. The copying machine comprises an automatic document feeder 100, an image reader 200 and an image former (printer) 300. Typically, the image reader 200 reads a document which is fed to an image reading position by the automatic document feeder 100, and then the read image data is transmitted to the image former 300, whereby an image can be formed (copy function). Also, an interface 207 enables the copying machine to be connected to an external apparatus. Thus, the image data read by the image reader 200 are outputted to the external apparatus (image read function), or conversely the image data received from the external apparatus are sent to the image former 300, whereby the image can be formed (printer function).

Next, the automatic document feeder 100 is described. The automatic document feeder 100 feeds the document set on a tray 101 to the image reading position of the image reader 200. After the image reading terminates, the document is delivered onto another tray 103.

The document is fed in accordance with a command from an operation panel (not shown). The document is delivered in accordance with a read termination signal from the image reader 200. When a plurality of documents are set, a control signal for these documents is consecutively generated so as to efficiently feed, read and deliver the documents.

Next, the image reader 200 will be described. The document on a platen glass plate 208 is illuminated by an exposure lamp 201. A light reflected from the illuminated document is guided by a group 202 of three mirrors to a lens 203 so that the image is formed on a CCD sensor 204. The CCD sensor 204 consists of three line sensors for red, green and blue arranged in parallel to each other, and the main scan direction is along the line sensors. The exposure lamp 201 and the first mirror scan the document at velocity V in accordance with the magnification power in a direction indicated by an arrow by a scanner motor 209, thereby permitting scanning over the document on the platen glass plate 208. The second and third mirrors are moved in the same direction at velocity V/2 with the scanning of the exposure lamp 201 and the first mirror. The position of the exposure lamp 201 is calculated and controlled in accordance with a scanner home sensor 210 and an amount of movement from home position (the number of steps of the motor). The light reflected from the document, which is incident on the CCD sensor 204, is converted to an electric signal in the sensor. An image processing circuit 205 processes the analog electric signal and converts it to digital image data. Then the digital image is sent to the interface 207 and the image former 300. A white shading correction plate 206 is located at a different position from the image reading position of the platen glass plate 208. The shading correction plate 209 is read in order to create correction data for shading correction prior to the reading of image information on the document.

Next, the image former 300 is described. First, exposure and imaging is described.

The image data transmitted from the image reader 200 or the interface 207 is converted to print data of cyan (C), magenta (M), yellow (Y) and black (K). The data is sent to controllers (not shown) of exposure heads. Each exposure head controller allows a laser to emit the light in accordance with the electric signal of the transmitted image data. The emitted light is scanned by a polygon mirror 301 in one dimension. Photoconductors in imaging units 302c, 302m, 302y and 302k are exposed to the light. Elements required for an electrophotography process are arranged around the photoconductor in each imaging unit. The photoconductors for C, M, Y and K rotate clockwise, whereby the processes of image forming are consecutively performed. The imaging units needed for these image forming processes are integrated for each process, and they are detachable from a body. A latent image on the photoconductor in each imaging unit is developed by each color developing unit. A toner image on the photoconductor is transmitted to paper on a paper feeding belt 304 by transfer chargers 303c, 303m, 303y, 303k located opposite to the photoconductor in the paper feeding belt 304.

Next, paper feeding and fixing are described. A sheet of paper, on which the image is to be transferred, is supplied to a transfer position and the image is formed on the paper in the following sequence. Sheets of paper of various sizes are set in a group of paper cassettes 310a, 310b and 310c. The paper of a desired size is supplied to a feeding path by a paper feeding roller 312 attached to each of the paper feeding cassettes 310a, 310b and 310c. The paper supplied to the feeding path is sent to the paper feeding belt 304 by a pair of feeding rollers 313. A reference mark on the paper feeding belt 304 is detected by a timing sensor 306 so that the paper is timely fed. Resist correcting sensors 315 (three sensors along a main scan direction) are located at the most downstream position of the imaging units. When a resist pattern on the paper feeding belt 304 is formed, these sensors detect the amounts of horizontal and vertical color shifts of C, M, Y and K images and a print image controller (PIC) corrects a drawing position and an image distortion, thereby preventing the color shift of the C, M, Y and K images on the paper. The toner image transferred on the paper is heated, melted and fixed on the paper by a fixing roller pair 307. Then, the paper is discharged to a tray 311.

For a double-sided copy, the paper having the image fixed by the fixing roller pair 307 is reversed by a paper reversing unit 309 in order to form the image on the back side of the paper. The paper is guided by a double side unit 308 and again fed therefrom. The paper feeding belt 304 can be withdrawn from the C, M and Y imaging units in accordance with a behavior of a belt withdrawing roller 305. Thus, the paper feeding belt 304 can be in no contact with the photoconductor. In forming a monochrome image, the C, M and Y imaging units can stop driving. It is therefore possible to reduce the wear of the photoconductor and the processes around the photoconductor.

Figure 2:
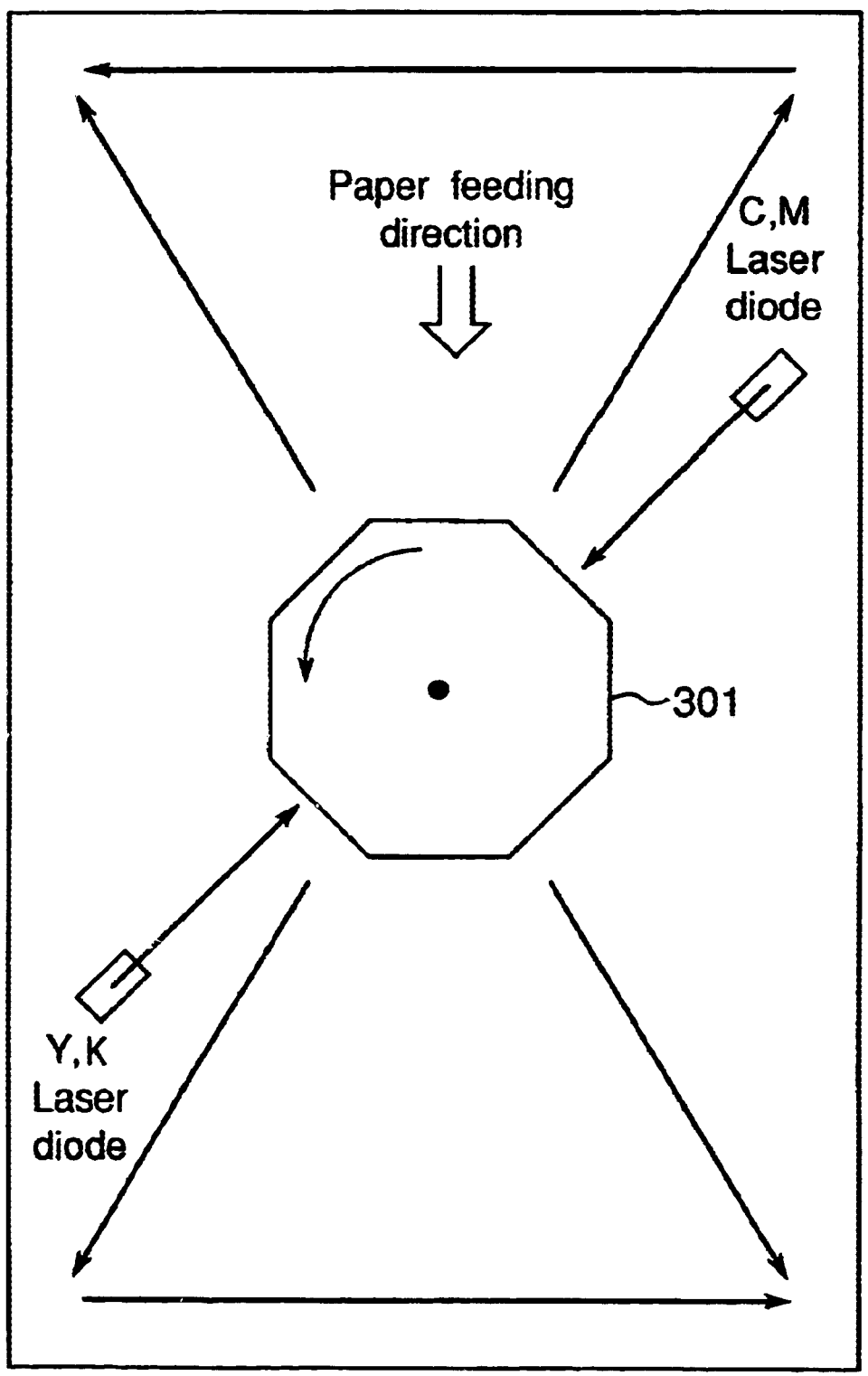
FIG. 2 is a schematic illustration of a constitution of a laser optical system.

FIG. 2 shows a structure of a laser optical system (LD head) including the polygon mirror 301 in top view. Four beams are reflected from the polygon mirror 301. When the photoconductor for each color is exposed to the light, C and M, from the laser, the colors to be painted on the upstream side are thus exposed and scanned in the direction opposite to the direction in which the colors, Y and K, to be painted on the downstream side are exposed and scanned. As described below, the print image controller performs mirror image processing in the direction in which two colors on the upstream side are scanned, thereby solving this problem.

Figure 3A:
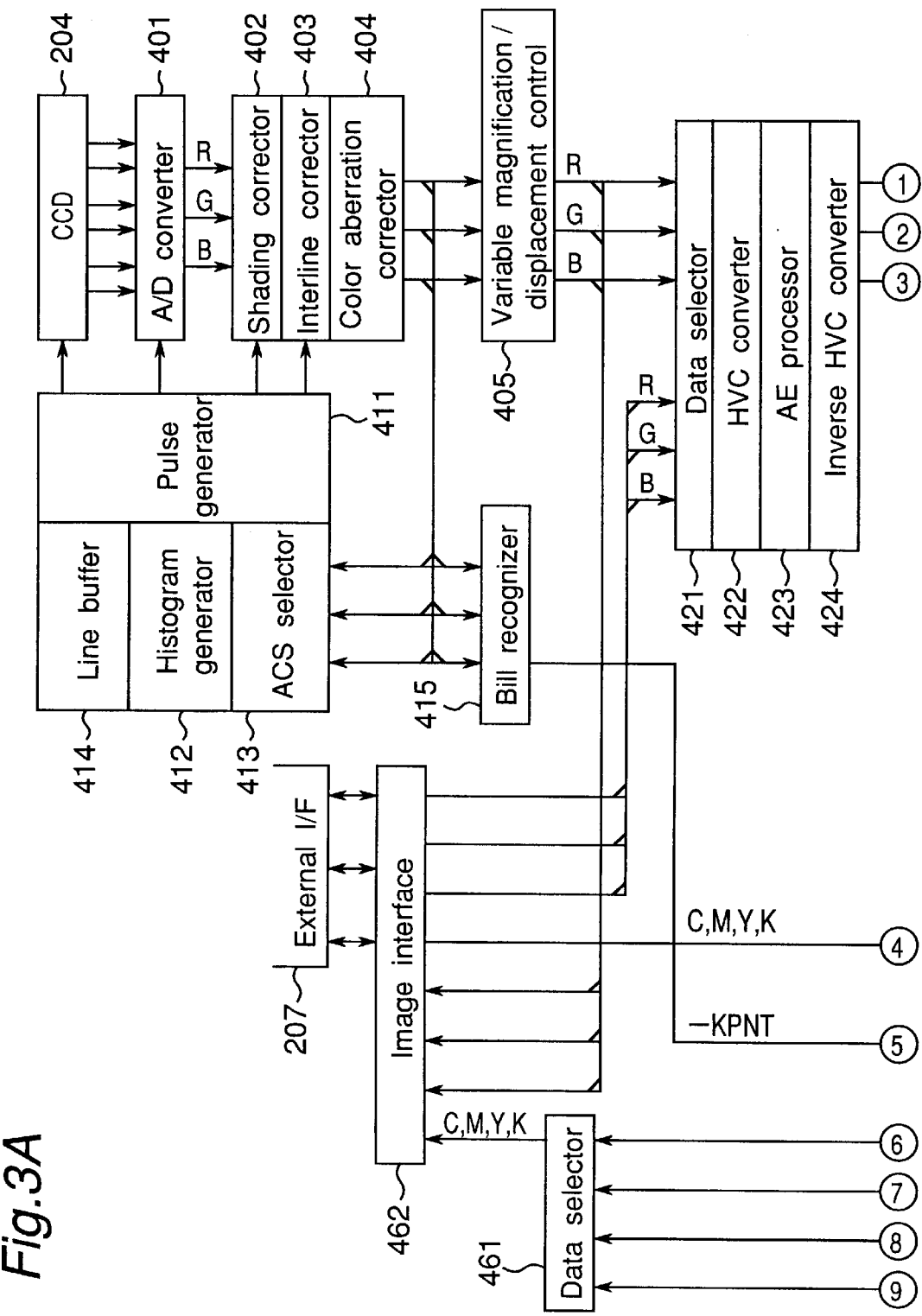
FIGS. 3A and 3B are parts of a block diagram of an image processor.
Figure 3B:
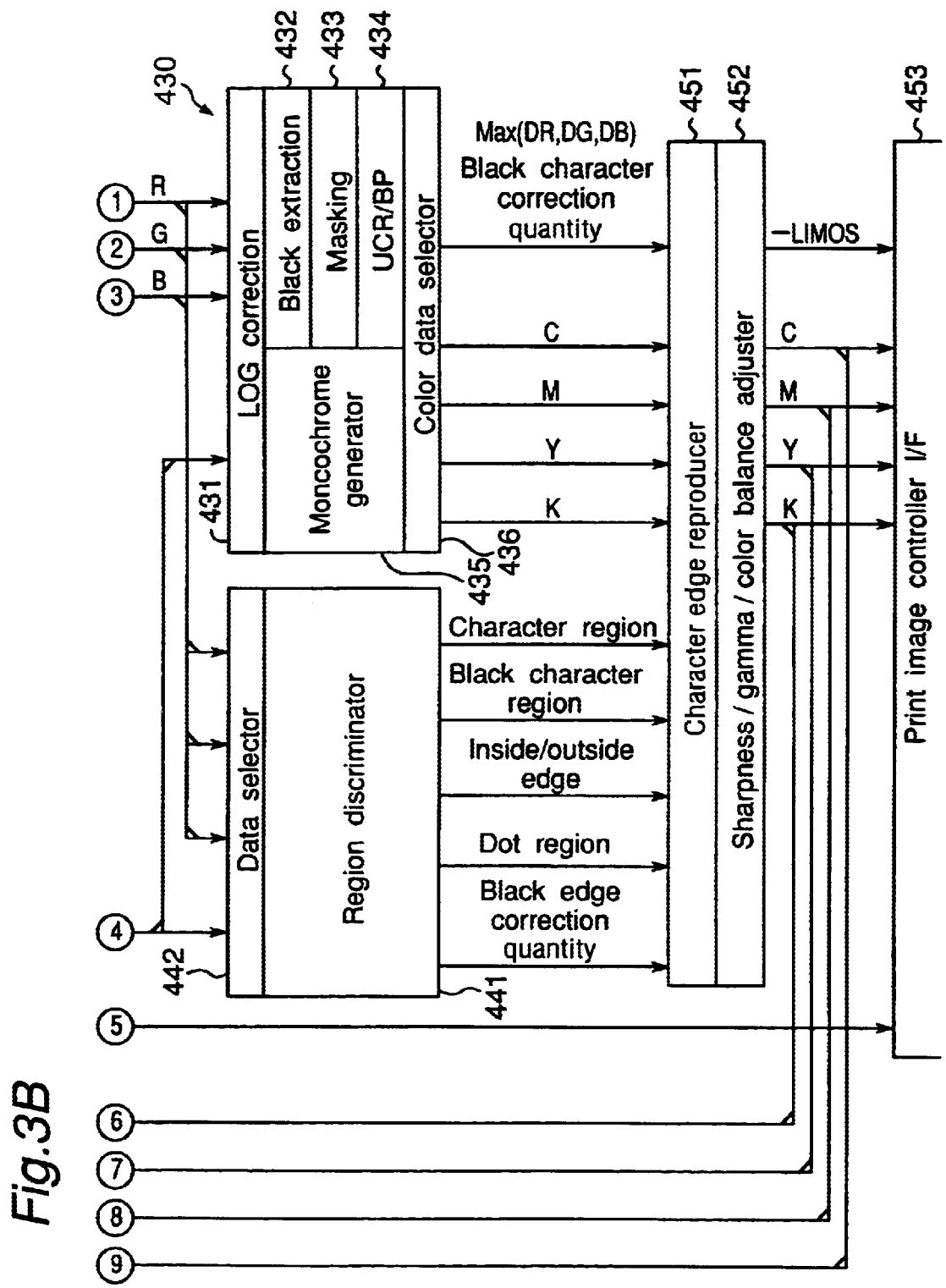

Next, a signal processing by the image reader 200 is described. FIGS. 3A and 3B show a general block diagram of the image processor 205 in the image reader 200. The light reflected from the document surface is formed by a reduction optical system onto an image on the CCD sensor 204, and an analog signal is photoelectrically converted to image data of color information of R, G and B. An A/D converter 401 converts the image data of 400 dpi to 8-bit digital data (256 gradation levels) for each color information of R, G and B by the use of the A/D converter in accordance with a timing signal transmitted from a reference drive pulse generator 411.

In a shading corrector 402, the data obtained by reading the white shading correction plate 209 before reading the document have been stored as reference data in an internal shading memory, independently for each of R, G and B, in order to eliminate a variation in light quantity in the main scan direction in which R, G and B data are scanned in the main scan derection. When the document is scanned, the data is converted to a reciprocal thereof and then multiplied with the read data of the document information, whereby the data is corrected on shading.

In an interline corrector 403, each color data is delayed line by line by the use of an internal field memory in accordance with a scan velocity (depending on the magnification power of subscan). Then, the read positions of the sensor chip for R, G and B are adjusted in the direction in which each sensor chip for R, G and B is scanned.

Due to chroma aberration induced by an optical lens, a phase difference among R, G and B is larger at positions closer to the ends of a document in the main scan direction. This influence causes an error in ACS judgment and black character discrimination to be described below, besides the above-mentioned color shift. Therefore, a chroma aberration corrector 404 corrects the phase difference among R, G and B in accordance with chroma information.

In a variable magnification/displacement processor 405, two line memories for variable magnification are used for each of the R, G and B data so as to alternately input and output the data line by line, and the write/read timing is independently controlled. Then, the magnification power and displacement in the main scan direction are changed. That is, the reduction is accomplished by thinning the data when the data is written to the memory, while the enlargement is accomplished by increasing a number of the data when the data is read from the memory. Under this control, the interpolation is performed in accordance with the magnification power. For the reduction, the interpolation is performed before the data is written to the memory. For the enlargement, the interpolation is performed after the data is read from the memory. This prevents defects and distortion of the image. Besides the enlargement and the reduction, a combination of the control by this block and the scan control realizes centering of the image, image repeating, consecutive enlargement, reduction in a binding margin, or the like.

In a histogram generator 412 and an automatic color selector (ACS) 413, value data of the document is generated from the R, G and B data obtained by prescan, and the histogram of the value data is created in a memory (histogram memory), before the document is copied. Meanwhile, it is judged in accordance with chroma data whether or not each dot is a color dot, and the number of color dots in each mesh of 512 dots in the document is counted in the memory (ACS memory). Automatic control of copy background level (automatic exposure processing) and automatic color selection (ACS) for judging whether a color copy operation or a monochrome copy operation is selected are performed in accordance with this result.

A line buffer 414 has memories which can store one line of the R, G and B data that are read by the image reader 200. The line buffer 414 monitors the image data for image analysis for automatic sensitivity correction and automatic clamp of the CCD sensor for the A/D converter 401.

In a bill recognizer 415, R, G and B data areas are selected at any time to prevent a normal copy when a security such as a bill (paper money) is put on the platen glass plate 208. It is judged by pattern matching whether or not the document is a bill. As soon as the document is judged as a bill, a central processing unit for controlling the read operation by the image reader 200 and the image processor 205 outputs a black paint signal (–KPNT="L") to the print image controller. (The "–" before a reference sign means a signal of negative logic.) The print image controller switches K data to black paint so as to inhibit a normal copy.

An HVC converter 422 temporarily converts the R, G and B data received from a data selector 421 to value (V data) and color difference signals (Cr and Cb data) by a 3*3 matrix operation.

Then, an automatic exposure (AE) processor 423 corrects the V data in accordance with the background level control value and corrects the Cr and Cb data in accordance with chroma level and hue level which are set by the operation panel. Then, an inverse HVC converter 424 reconverts the V, Cr and Cb data to the R, G and B data by a 3*3 inverse matrix operation.

In a color corrector 430, a logarithm corrector 431 converts the R, G and B data to gradation level data (DR, DG and DB data). Then, a black extractor 432 detects a minimum color level of the DR, DG and DB data as under color component. At the same time, a black extractor 432 detects gradation level difference between maximum and minimum colors of the R, G and B data as document chroma data.

The DR, DG and DB data are subjected to a 3*6 nonlinear matrix operation in a masking operation processor 433. The DR, DG and DB data are converted to the color data (C, M, Y and K data) which match color toners of the printer.

An under color removal/black paint processor (UCR/BP processor) 434 calculates UCR/BP coefficients of the under color component (Min(R, G, B)) in accordance with the document chroma data. The UCR/BP processor 434 determines the amounts of UCR and BP by multiplication. The UCR/BP processor 434 determines a finite difference in the amount of under color removal (UCR) among the C, M and Y data from the C, M and Y data which are subjected to the masking operation. The UCR/BP processor 434 calculates the C, M and Y data and then calculates the BP amount equal to K data. A monochrome data generator 435 creates a value component from the R, G and B data, corrects the data with logarithm operation and outputs the data as black data (DV data). Finally, a color data selector 436 selects the image for color copy, i.e., the C, M, Y and K data or the image for monochrome copy, i.e., the DV data (C, M and Y are white).

A region discriminator 441 detects the difference (Max (R, G, B) −Min(R, G, B)) between the minimum color (Min(R, G, B)) and the maximum color from the R, G and B data which are inputted to the region discriminator 441 through a data selector 442. Then, a black character, a color character, a dot, and the like are discriminated. The region discriminator 441 corrects a character edge for the black character discrimination and transmits the data, as well as the result of the discrimination, to a character edge reproducer 451. At the same time, it generates and transmits an attribute signal for switching a method of reproducing the gradation level to the print image controller and to a print head controller.

The character edge reproducer 451 performs the correction (edge emphasis, smoothing and character edge removal) suitable for each discriminated region from the C, M, Y and K data received from the color corrector in accordance with the result of the region discrimination. Finally, a sharpness/gamma/color balance adjuster 452 corrects the image of the C, M, Y and K data in accordance with sharpness level, color balance level and gamma level specified with the operation panel. The adjuster 452 transmits a gradation reproduction attribute signal, −LIMOS, to a print image control interface 453. The adjuster 452 sends the C, M, Y and K data through a data selector 461 to an image interface 462.

The image interface 462 allows the image to be inputted and outputted to/from an external apparatus. The image interface 462 is operated so that it can simultaneously receive and send the R, G and B data and it can sequentially receive and send the C, M, Y and K data. The external apparatus can use the color copying machine for the scanner function and for the printer function.

Figure 4A:
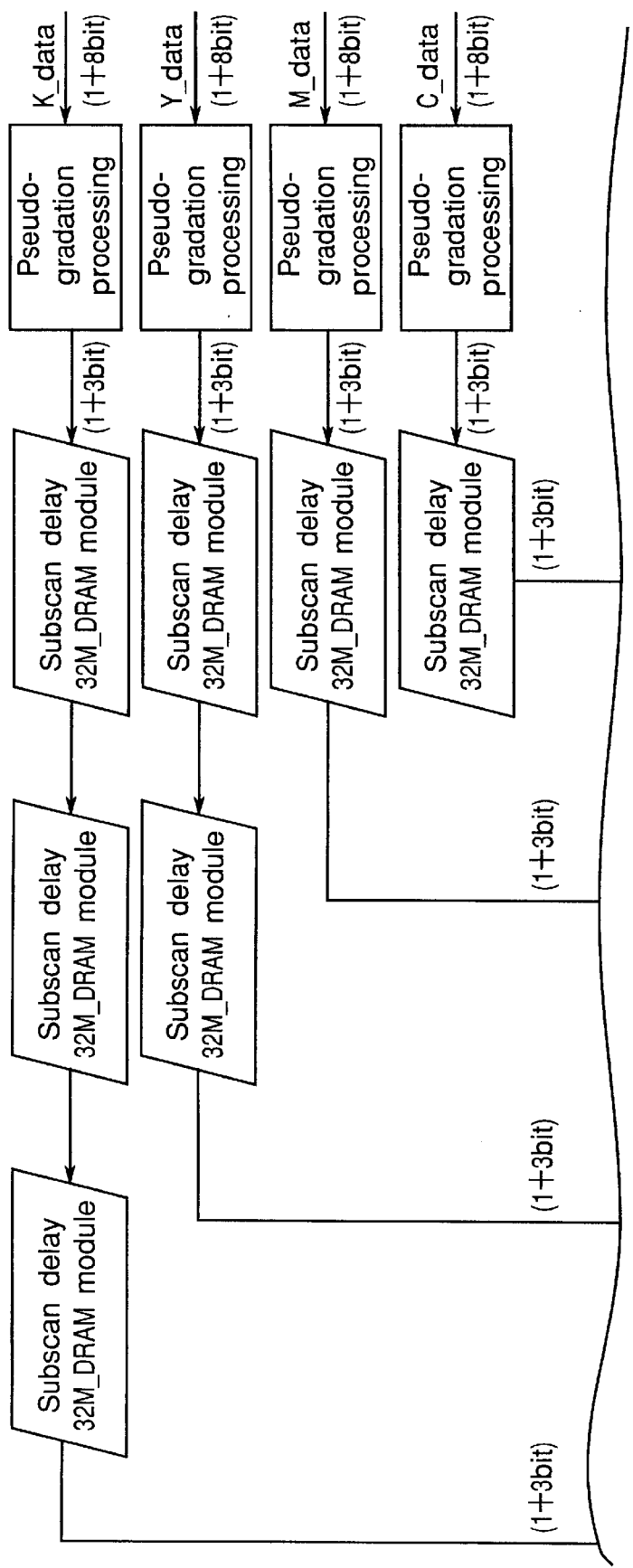

The system explained above is a copying machine for simultaneously outputting four colors per scan. FIGS. 4A and 4B show the relationship between the system structure and the print image controller block. As shown in FIGS. 4A and 4B, the C, M, Y and K data from the image reader 200 are simultaneously transmitted to the print image controller in one scan operation. Accordingly, the processing in the print image controller is basically a parallel operation for the C, M and Y data. The system needs to transmit the image composed of C, M, Y and K toner components on the paper fed onto the paper feeding belt 304 without the color shift.

However, as shown schematically in FIGS. 5A–5F, the color shifts happen due to various factors. Because the photoconductors are substantially equally spaced above the paper feeding belt 304, the timings for developing the C, M, Y and K toners are shifted by the times depending on distances between the photoconductors. The timings for C, M, Y and K are therefore controlled by using subscan delay modules so that they are delayed by the amounts depending on the distance between the photoconductors in the subscan direction. However, as shown in FIG. 5A, the colors are deviated, when for example, C is shifted and drawn in the subscan direction. Moreover, the latent images are formed on the photoconductors with the laser scan by using one polygon mirror and four beams. Thus, a raster scan direction of the first two colors (C and M) is opposite to that of the latter two colors (Y and K) and, as a result, the colors are shifted due to this mirror image relationship (FIG. 5F). In addition, for example, the print start positions are displaced in the main scan direction due to the laser can of the colors (FIG. 5E), the magnification power in the main scan direction is distorted (FIG. 5D), a bow distortion takes place in the subscan direction (FIG. 5C), a skew distortion takes place due to the difference in parallelism between the arrangement of the photoconductors and the laser scan (FIG. 5B), and these factors also cause the color shift. These phenomena are corrected by correcting the position and the images for the C, M, Y and K data, in order to prevent the color shift.

Figure 6:
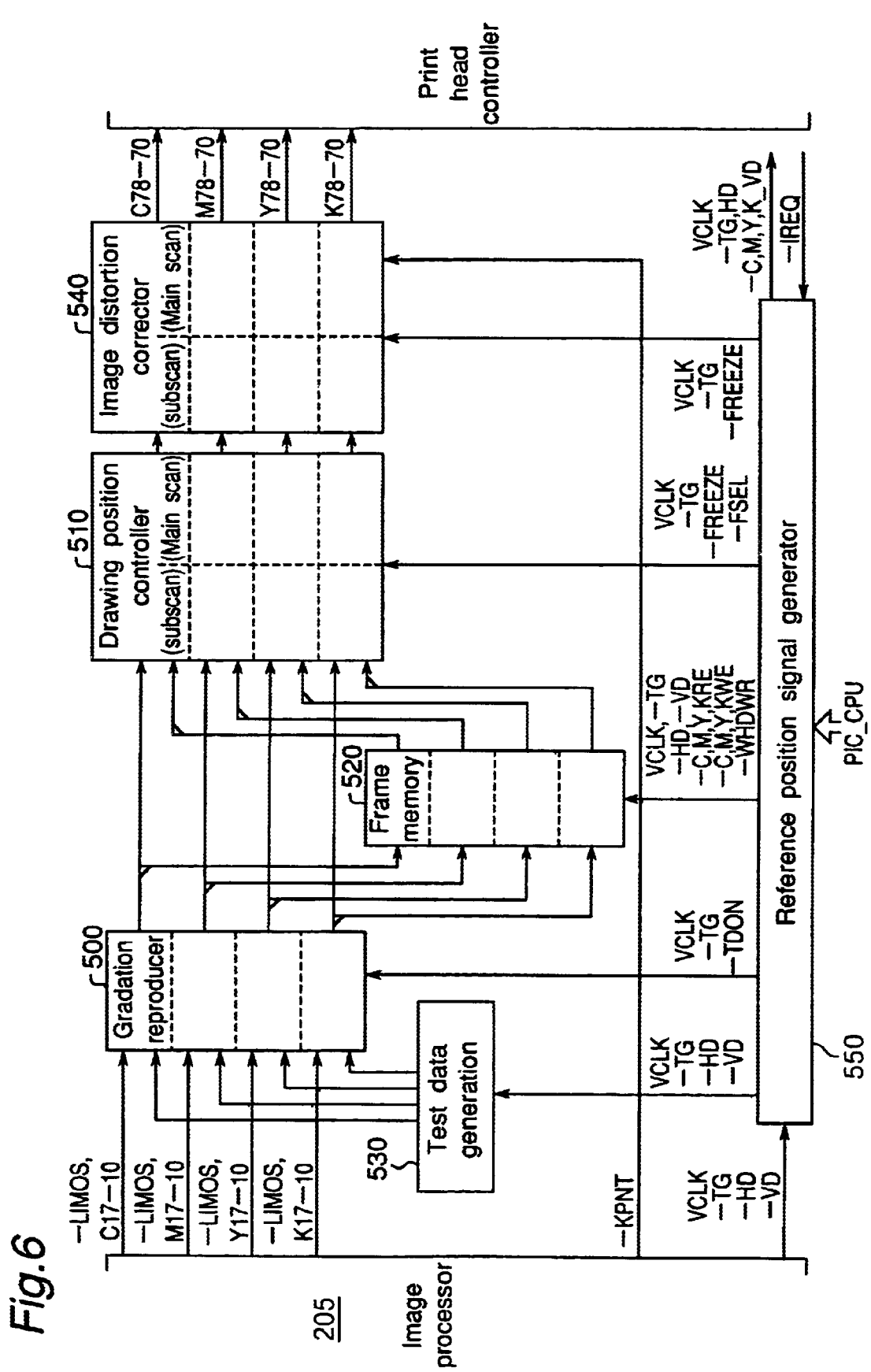
FIG. 6 is a block diagram of the print image controller.

It is the print image controller shown in FIG. 6 that performs these corrections. First, the C, M, Y and K image data transmitted from the image processor 205 are inputted to a gradation reproducer 500. Here, the 8-bit gradation level of the C, M, Y and K data is converted to 3-bit pseudo 256-gradation-level data by a multi-level error diffusion of character separation type in accordance with the −LIMOS signal (gradation reproduction attribute signal). Then, a drawing position controller 510 corrects the position at which the K component is drawn by the K developing unit located at the most downstream position, on the basis of the paper, in order to correct the shift of the developing timing, depending on the distance between the photoconductors (see FIG. 1). The drawing position controller 510 corrects the positions of the other color components for the subscan with respect to the K component. Next, in order to correct the difference in the laser scan direction and the shift of the main scan start position, the C and M images are subjected to main scan mirror image processing. As in the case of the subscan, the position of the K component is corrected on the basis of the paper, while the positions of the other color components are corrected with respect to the K component. A frame memory 520 needs to previously store the image on the front side at the time of a double-sided copy. For this reason, the frame memory 520 has a memory unit whose capacity is equivalent to one surface of A3-size paper, for storing the data from the gradation reproducer 500.

Test pattern data of C, M, Y and K for resist detection, which are generated by a test data generator 530, are simultaneously transferred onto the paper feeding belt 304. The amounts of color shift of the C, M and Y components from the K component are detected by a resist detecting sensor 315 which is located in a still more downstream site than the K developing unit located at the most downstream position. An image distortion corrector 540 corrects the main scan magnification distortion, the subscan bow distortion and the skew distortion of the C, M and Y components by means of the interpolation by a gradation level distribution in accordance with the result of the color shift detection, as diagrammatically shown in FIG. 7. The K image data alone from the drawing position controller 510 is decoded to the 256-gradation-level data. The K image data or black paint data is selected in accordance with the result of the above-described bill recognition. The C, M, Y and K data, which are finally corrected, are shifted to the image position based on the paper by the print imaging controller/print head controller interface. The C, M, Y and K data are transmitted to the print head controller, and then the image is reproduced. A reference position signal generator 550 generates various reference position signals in accordance with various input signals.

Figure 8:
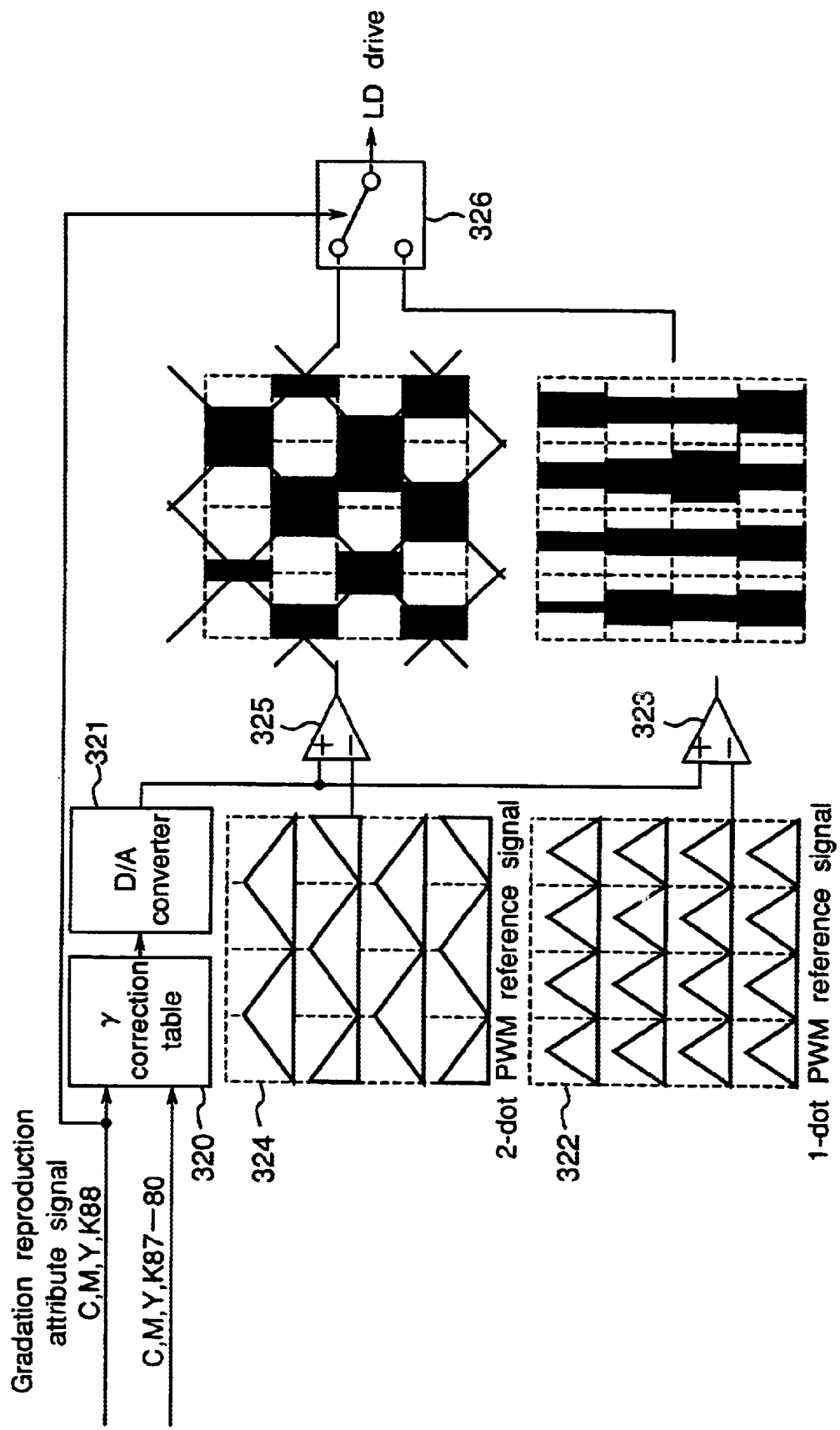
FIG. 8 shows a print head controller.

FIG. 8 shows the print head controller, wherein a gradation level distortion due to gamma-characteristic in the electrophotography process is corrected by a gamma-correction table 320. Then, the gradation level is converted by a D/A converter 321 to an analog level. The most significant bit of each color corresponds to −LIMOS signal (the gradation reproduction attribute signal) transmitted from the image reader. Light modulation method is switched by a switch 326 in accordance with the gradation reproduction attribute signal. When the most significant bit is "L" (=character edge), an LD drive signal is generated by pulse width modulation (PWM) in which a pulse having a cycle of one dot is compared to a reference signal 322 for one dot by a comparator 323. When the most significant bit is "H" (=continuous gradation level), the LD drive signal is generated by pulse width modulation (PWM) in which a pulse having a cycle of two dots is compared to a reference signal 324 for two dots by a comparator 325. By driving a semiconductor laser as explained above, the image is exposed to the light on the photoconductors so as to express the gradation level. For the 2-dot pulse width modulation, a screen angle of 450 is set so that the granular characteristic of the image may be improved. The character edge is reproduced by the 1-dot pulse width modulation which gives priority to resolution and has no defects in characters. For the other regions, the gradation level reproduction is automatically performed. This gradation level reproduction is resistant to an image noise produced by the 2-dot pulse width modulation and the 45-degree screen angle modulation, thus forming the smooth image having excellent granular characteristic.

As is described in detail later, optimum image correction is performed by the character edge reproducer 451 in accordance with the region discrimination result obtained by the image reader 200. The gradation reproducer 500 in the print image controller (shown in FIG. 6) switches the processing to the multi-level error diffusion or simple quantization depending on a judgment of whether or not the region is a character edge in accordance with the gradation level attribute signal. Finally, the print head controller automatically switches the light modulation on the photoconductor so as to improve the quality of the image.

Figure 9A:
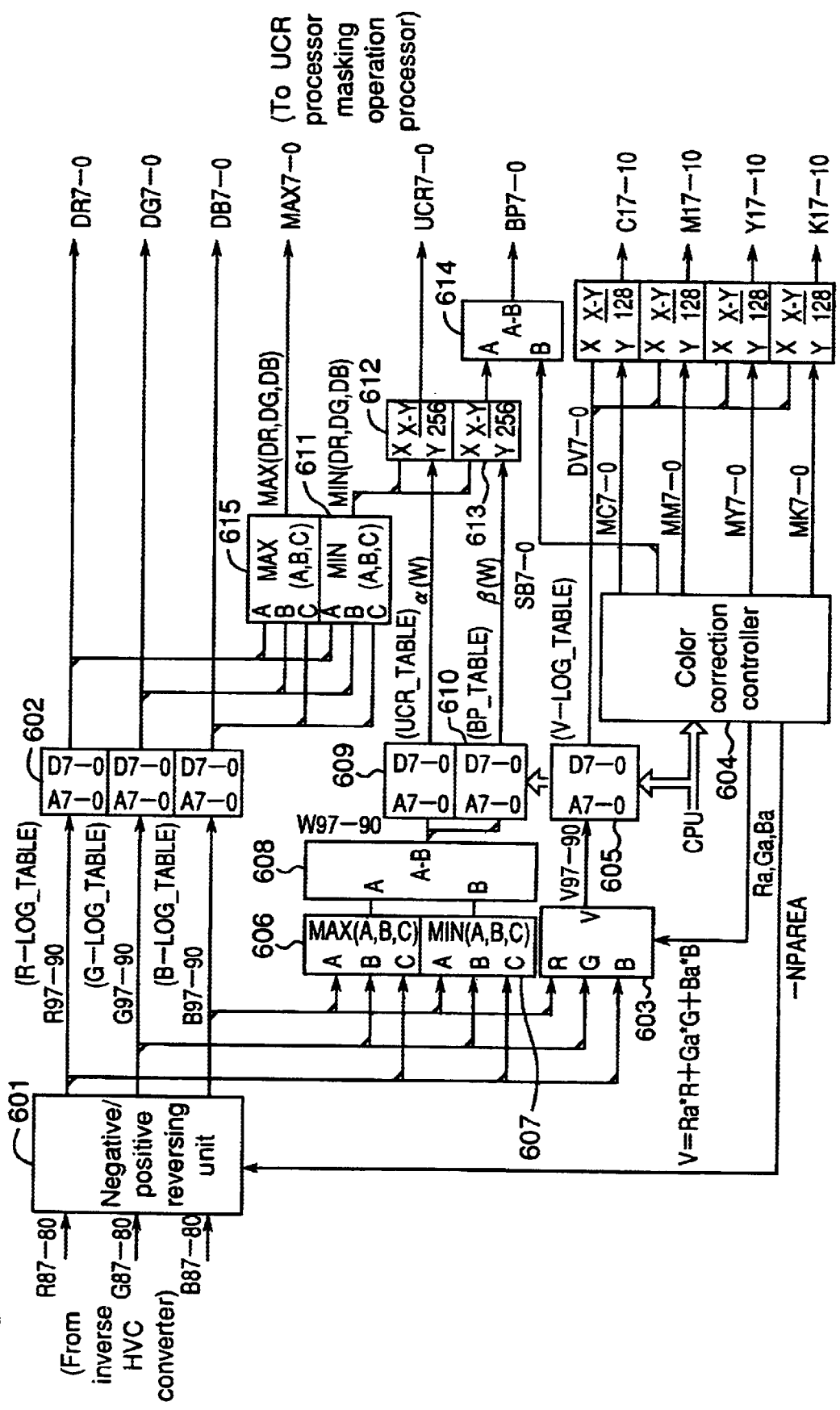
FIGS. 9A, 9B and 9C are parts of a block diagram of the color corrector.
Figure 9B:
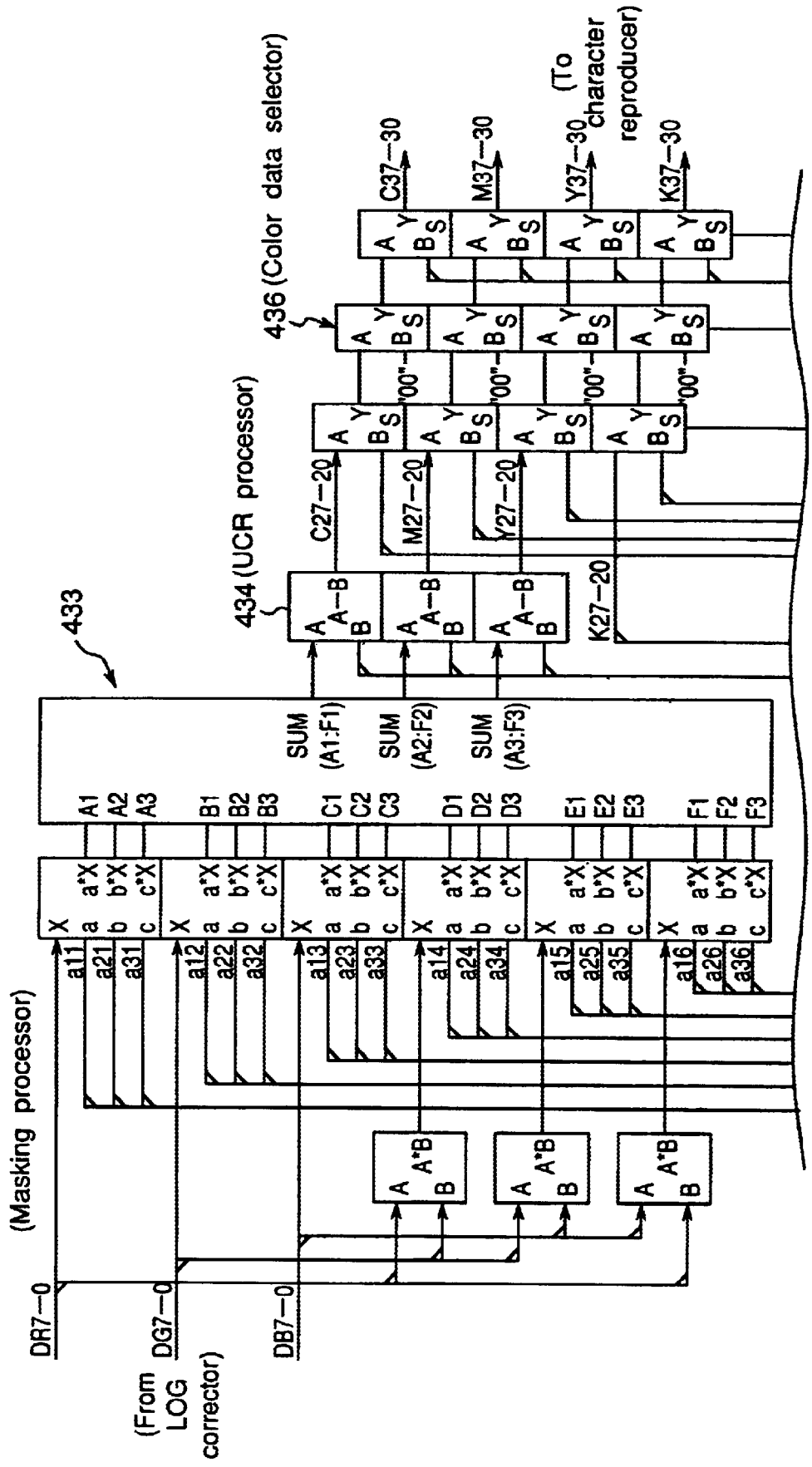
Figure 9C:
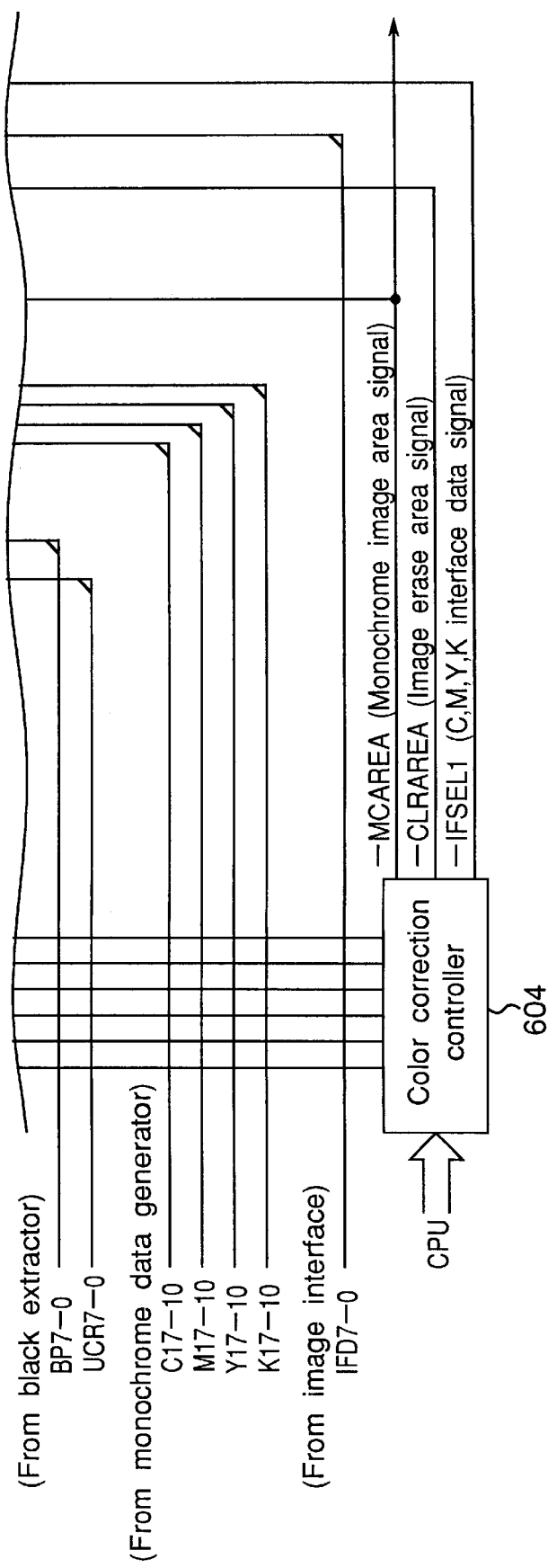

FIGS. 9A to 9C show the color corrector 430. FIG. 9C shows the signal to be supplied to the portion shown in FIG. 9B. The color correction represents generally image correction performed in the LOG corrector 431, the black quantity extractor 432, the masking operation processor 433, the black print/under color removal processor 434 and the color data selector 436. In a negative/positive reversing unit 601 in the color corrector 430, the R, G and B input data, R, G and $B_{87\text{-}80}$, are controlled in accordance with a status of a negative/positive reversal area signal −NPAREA which a central processing unit sets through a color correction controller, and the output data, R, G and $B_{97\text{-}90}$, are controlled in the following manner, whereby the negative/positive reversal is performed.

−NPAREA="L"→R, G, $B_{97\text{-}90}$=255−R, G, $B_{87\text{-}80}$, and

−NPAREA="H"→R, G, $B_{97\text{-}90}$=R, G, $B_{87\text{-}80}$.

Next, because the R, G and B data are the signals to be changed linearly with respect to reflectance of a document, the R, G and B data are inputted to R, G, B-logarithm_tables 602 and transformed to gradation level data DR, DG and $DB_{7\text{-}0}$ which respond linearly to the change in the gradation level. The transformation is expressed as the following equation:

$$D_{7\text{-}0} = \{-\log(Wh^*(A_{7\text{-}0}/256)) - D_{min}\} * 256/(D_{max} - D_{min}),$$

where $D_{max}$ denotes a maximum gradation level range, $D_{min}$ denotes a minimum gradation level range and Wh denotes the reference reflectance of the document in the shading corrector 402.

In order to generate a gradation level signal $V_{97\text{-}90}$ for the monochrome reproduction, a value generator 603 calculates the gradation level signal $V_{97\text{-}90}$ from the R, G and B data in the accordance with the following equation:

$$V_{97\text{-}90} = Ra^*R_{97\text{-}90} + Ga^*G_{97\text{-}90} + Ba^*B_{97\text{-}90},$$

where Ra, Ga and Ba denote parameters of R/G/B mixture ratio to be set by a color correction controller 604. Ra, Ga and Ba are generally set to Ra=0.3, Ga=0.6 and Ba=0.1, thereby providing the value data close to the distribution of spectral luminous efficiency.

$V_{97\text{-}90}$ is inputted to a V-LOG_TABLE 605 and transformed to gradation level data $DV_{7\text{-}0}$ for the purpose of logarithm correction, as in the case of the R, G and B data. $DV_{7\text{-}0}$ is multiplied by data MC, MM, MY and $MK_{7\text{-}0}$ on ratios of C. M, Y and K for determining color separation data C, M, Y and $K_{17\text{-}10}$ for the monochrome reproduction. For example, red monochrome reproduction can be accomplished by setting $MC_{7\text{-}0} = MK_{7\text{-}0} = 0$ and $MM_{7\text{-}0} = MY_{7\text{-}0} 128$.

On the other hand, the difference between the maximum and minimum colors of the R, G and B data is calculated by circuits 606 to 608. The difference is inputted as chroma data $W_{97\text{-}90}$ to UCR/BP_TABLEs 609 and 610. These tables are used to control the amount of under color removal and the amount of black paint for the UCRIBP processing in accordance with the status of $W_{97\text{-}90}$. Here, the under color removal is operated. That is, the minimum color (Min(DR, DG, DB)) is detected from the DR, DG and DB data with logarithm correction by a minimum value circuit 611. The detected data is defined as a basic black paint quantity. A certain ratio (BP quantity) is treated as the K data. Black toner is added to the printer by multipliers 612 and 613 (black paint), and a certain ratio of the basic black quantity (UCR quantity) is subtracted from the C, M and Y data which have been subjected to the masking operation from DR, DG and DB. The outputs of the UCR/BP_TABLEs 609 and 610 control these ratios and are defined by a function of $W_{97\text{-}90}$. If the output of the UCR_TABLE is α(W), the output of the BP_TABLE is β(W) and the K data difference $SB_{7\text{-}0}$ from the color correction controller is k, the following equations hold.

$$UCR_{7\text{-}0}\ (UCR\ quantity) = MIN(DR, DG, DB)^*\alpha(W)/256,$$

and $$BP_{7\text{-}0}\ (BP\ quantity) = MIN(DR, DG, DB)\ \beta(W)/256 - k$$

The difference is determined by a subtractor 614. When the read R, G and B data are a chromatic color (white and black), i.e., when the chroma signal $W_{97\text{-}90}$ is low, the printer had better reproduce the color by the use of the K toners alone, because less toner adheres to the paper and thus the print image looks more black and sharp. In such a case, it is therefore desirable that the value α(W)/P(W) is increased whereby the UCR/BP quantities are increased. On the contrary, in the case of chromatic color, the large values α(W) and β(W) yield dull color reproduction. In other words, the high chroma signal $W_{97\text{-}90}$ would reduce the value α(W)/β(W). As described above, α(W) and β(W) are used for the optimum control in the UCR_TABLE 609 and the BP_TABLE 610, respectively, in accordance with the chroma signal $W_{97\text{-}90}$.

At the same time when the basic black quantity MIN(DR, DG, DB) is calculated, the DR, DG and DB maximum color data MAX (DR, DG, DB) is also calculated by a maximum value circuit 615. This data $MAX_{7\text{-}0}$ is transmitted to the following character edge reproducer 451 (shown in FIG. 3A). The data $MAX_{7\text{-}0}$ is used as black character correction data which replaces the K component as the BP quantity in the black character discrimination region. The DR, DG and $DB_{7\text{-}0}$ subjected to logarithm correction are transmitted to the masking operation processor 433 in order to approximate the spectral distribution of the color toner of the printer and thus improve color reproducibility.

In the masking operation processor 433, a nonlinear masking, which uses the nonlinear terms of DR, DG and DB, i.e., DR*DG, DG*DB and DB*DR, is performed by using masking coefficients inputted from the color correction controller 604 in order to improve approximate accuracy. The DR, DG and DB data are transformed into the C, M and Y data.

$$\begin{pmatrix} C \\ M \\ Y \end{pmatrix} = \begin{pmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \end{pmatrix} * \begin{pmatrix} DR \\ DG \\ DB \\ DR*DG/256 \\ DG*DB/256 \\ DB*DR/256 \end{pmatrix} \quad (1)$$

The masking coefficients are experimentally-determined in such a manner that a test color print formed by the image former 300 is read by the image reader 200 and the data difference between the image former 300 and the image reader 200 is minimum.

In the UCR processor 434, the UCR quantity is then subtracted from the C, M and Y data subjected to the masking operation. The resultant data is then outputted together with BP quantity=K data as color separation data C, M, Y and $K_{27\text{-}20}$ for the color copy. Thereafter, in the case of a monochrome image area (−MCAREA"L"), the color data selector 436 replaces the C, M, Y and K data by color separation data C, M, Y and $Ki_{17\text{-}10}$ for the monochrome reproduction. In the case of an image erase area (−CLRAREA="L"), the color data selector 436 replaces the C, M, Y and K data by "0". When the input of the sequential C, M, Y and K data transmitted from the image interface 462 is selected (−IFSEL1="L"), the C, M, Y and K data are replaced by $IFD_{7\text{-}0}$. Then, color separation data C, M, Y and $K_{37\text{-}30}$ are transmitted together with the black character correction data $MAX_{7\text{-}0}$ to the character edge reproducer 451.

Figure 10A:
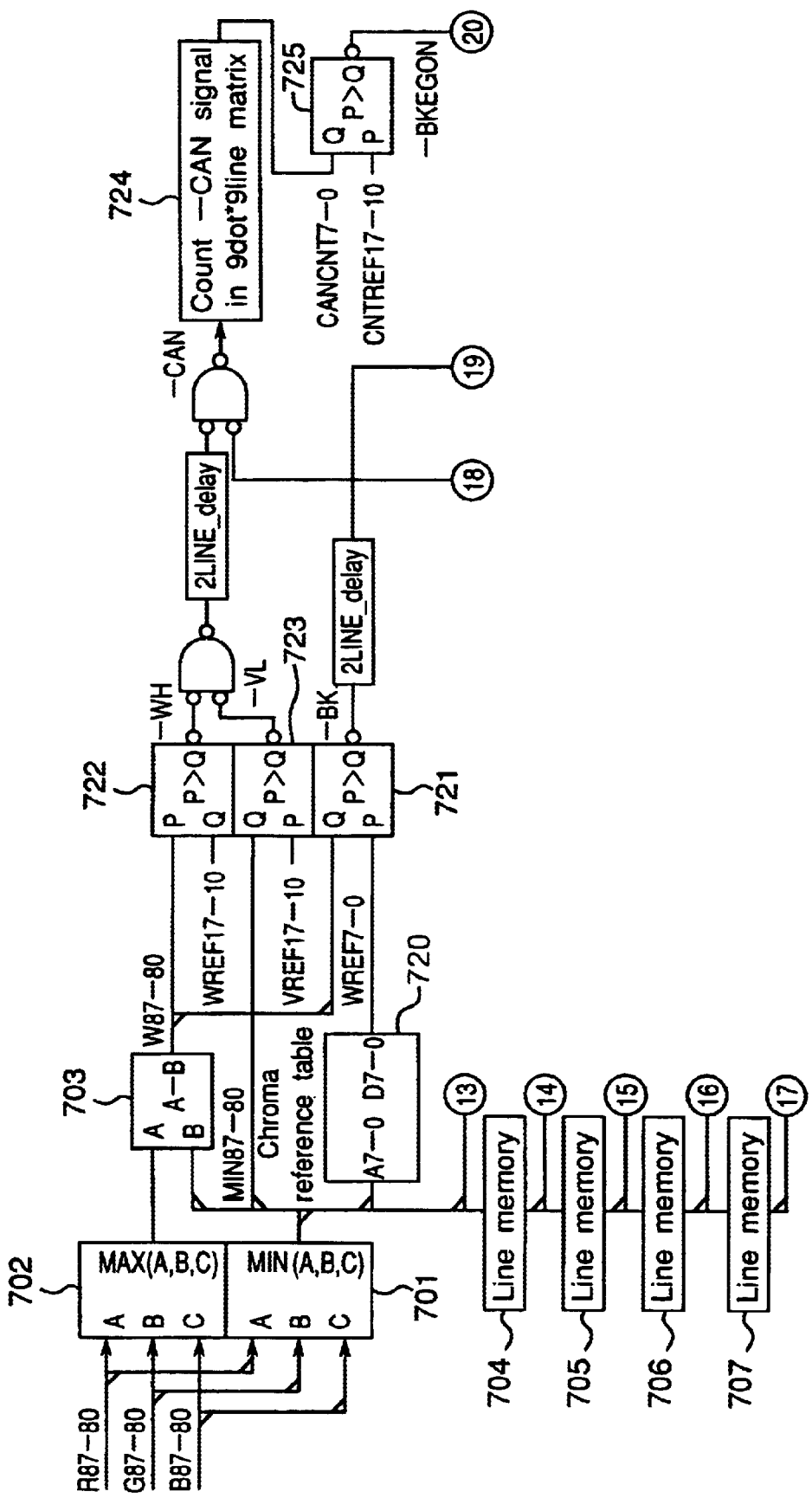
FIGS. 10A and 10B are parts of a block diagram of a region discriminator.
Figure 10B:
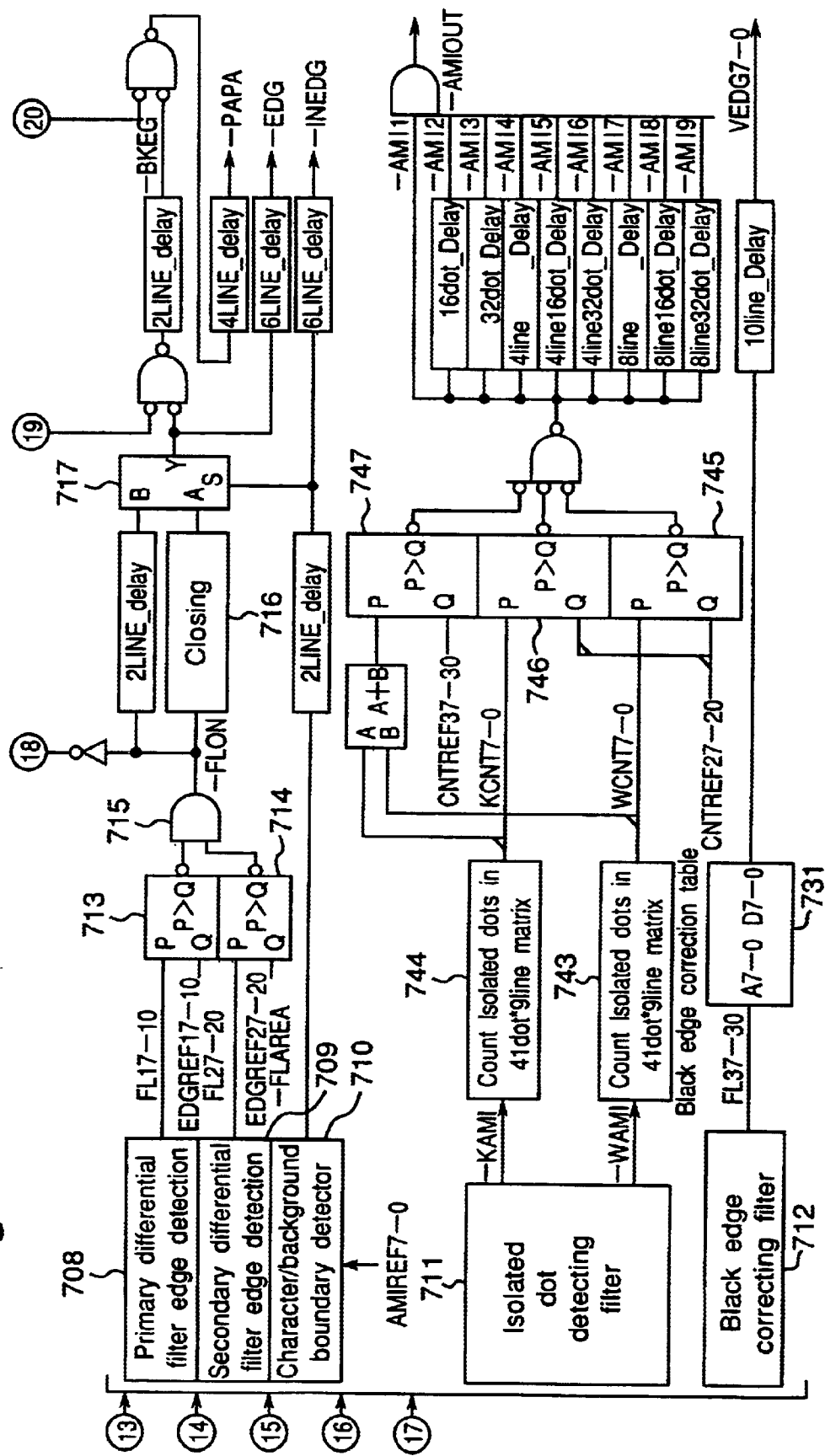

FIGS. 10A and 10B show the region discriminator 441. The R, G and B data, R, G and $B_{87\text{-}80}$, transmitted from the inverse HVC converter 424 are subjected to region discrimination such as black character discrimination, color character discrimination, dot discrimination and switching of the gradation level reproduction.

First, extraction of the value and chroma components required for region discrimination is described. A minimum color $Min_{7\text{-}0}$ of input R, G and B signals is used as the value component needed to detect the character edge and to detect isolated dots during the dot discrimination. The minimum value $Min_{7\text{-}0}$ is obtained by a minimum value circuit 701. The minimum color $Min_{7\text{-}0}$ is used because discrimination is not influenced by the colors in the document. For example, if the document has a black color character, the R, G and B signals have substantially the same low gradation level. However, if the document has a red color character, the R signal is bright and the G and B signals are dark. Accordingly, when the minimum value of the R, G and B signals is used, both the red and black characters depend only on a character density and respond to substantially the same value level. Thus, the character and the dot can be judged in accordance with the colors on various documents. A difference $W_{87\text{-}80}$(i.e., Max(R, G, B)−Min(R, G, B)) between the maximum and minimum colors of the R, G and B data obtained by a maximum value circuit 702 and the minimum value circuit 701, respectively, is determined by a subtractor 703. The document chroma (a judgment of whether or not the image is black) needed for black character discrimination is judged based on the difference $W_{97\text{-}80}$.

Next, black character discrimination in the region discriminator 441 is described. The contents of black character discrimination are generally classified into character judgment (edge judgment), prevention of erroneous black judgment and erroneous black character discrimination, and generation of a black edge correction signal.

First, the judgment of character (edge) is described. A value component $Min_{87\text{-}80}$ is expanded in a two-dimensional matrix of 5 dots*5 lines by the use of line memories 704 to 707. The value components of five lines are inputted to a primary differential filter 708, a secondary differential filter 709, a character/background boundary detector 710, an isolated dot detecting filter 711, and a black edge correcting filter 712.

Figure 11:
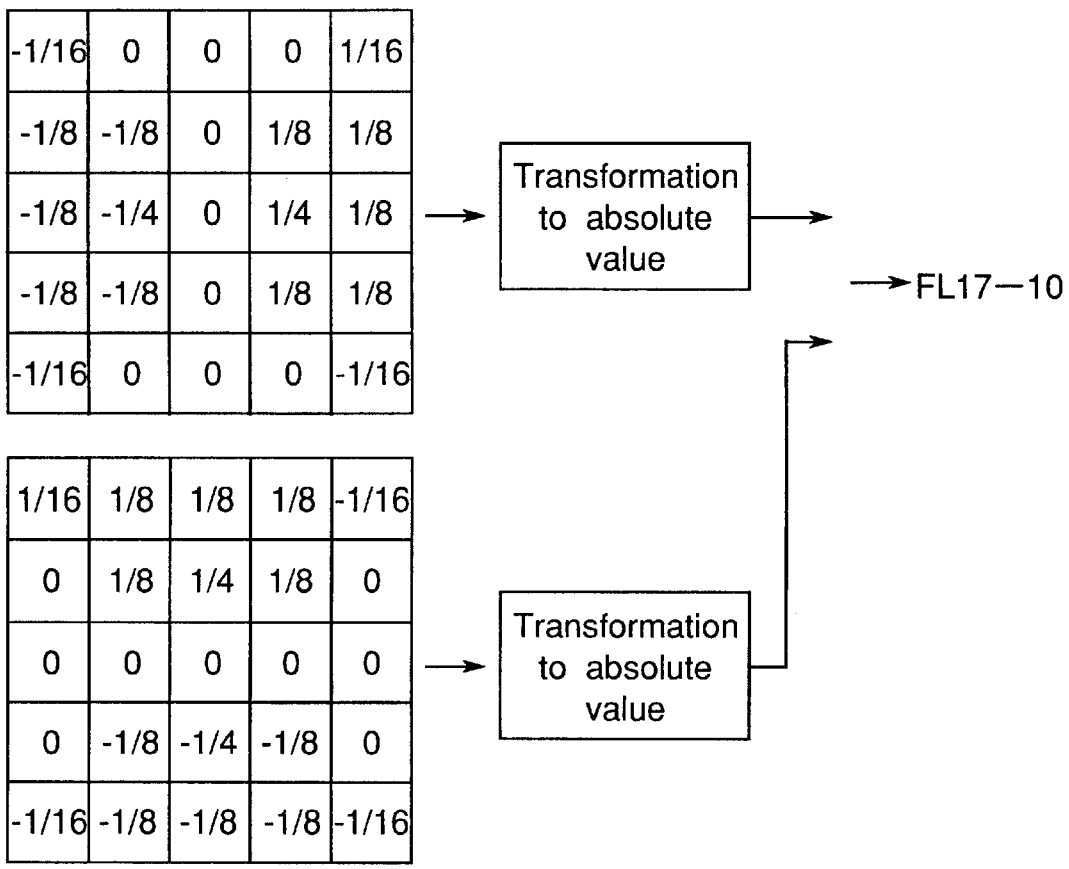
FIG. 11 is a diagram of a primary differential filter.
Figure 12:
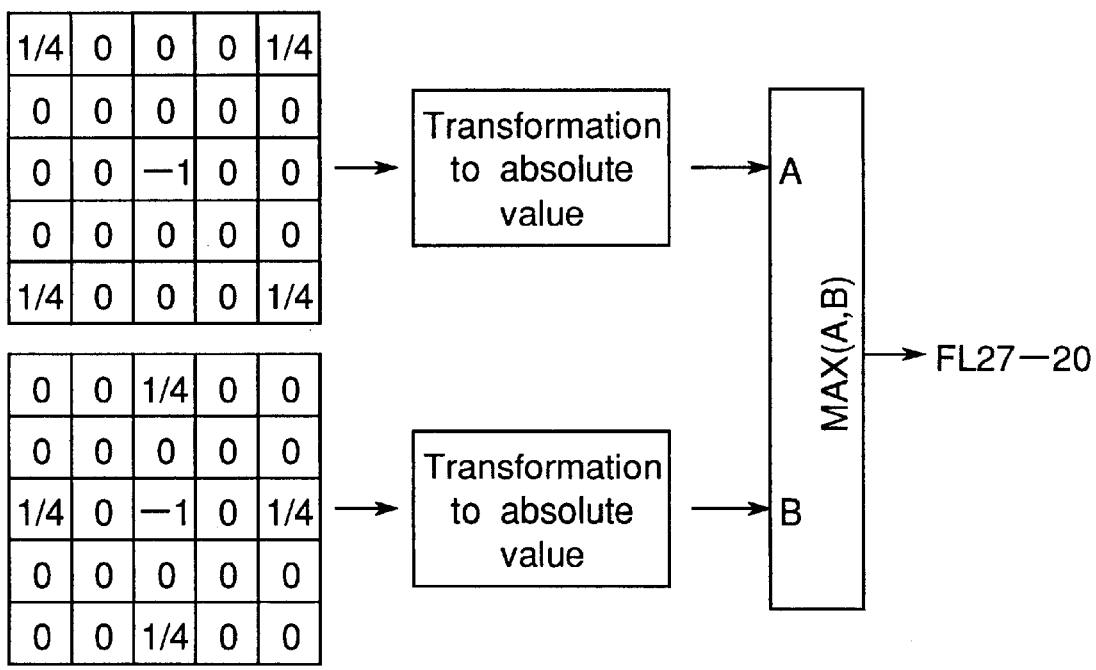
FIG. 12 is a diagram of a secondary differential filter.

In the primary differential filter 708, as shown in FIG. 11, the skew of pixels adjacent to an objective pixel (central pixel) is detected in the main scan and subscan directions independently of each other. The value is calculated by adding absolute values thereof and is outputted as a primary differential edge quantity $FL_{17\text{-}10}$. In the secondary differential filter 709, as shown in FIG. 12, a secondary differential value of the objective pixel is determined independently of one another in the vertical, horizontal and diagonal directions. The maximum value of the absolute values is outputted as a secondary differential edge quantity $FL_{27\text{-}20}$. Comparators 713 and 714 compare the edge quantities with edge reference data $EDGREF_{17\text{-}10}$ and $EDGREF_{27\text{-}20}$. If either edge quantity is larger than a reference level, −FLON= "L" is outputted as the character edge through a buffer circuit 715.

Figure 13:
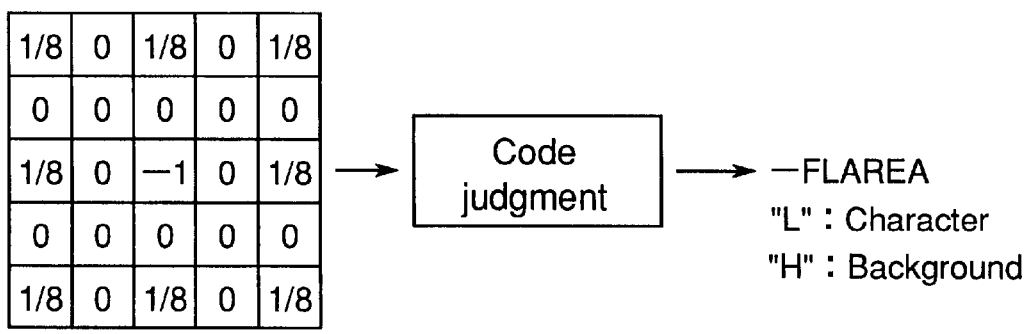
FIG. 13 is a diagram on operation of a character/background boundary identifier.

In the character/background boundary detector 710, as shown in FIG. 13, an integral value (average value) of the secondary differential filters in four directions is determined. If the code is "L", the edge is discriminated as the character-side edge (hereinafter referred to as an inside edge). If the code is "H", the edge is discriminated as the background-side edge (hereinafter referred to as an outside edge). Then, −FLAREA is outputted. The signal −FLAREA is delayed by a predetermined line. The signal is outputted to the character edge reproducer 451 as character/background boundary discrimination signal −INEDGE.

Figure 14:
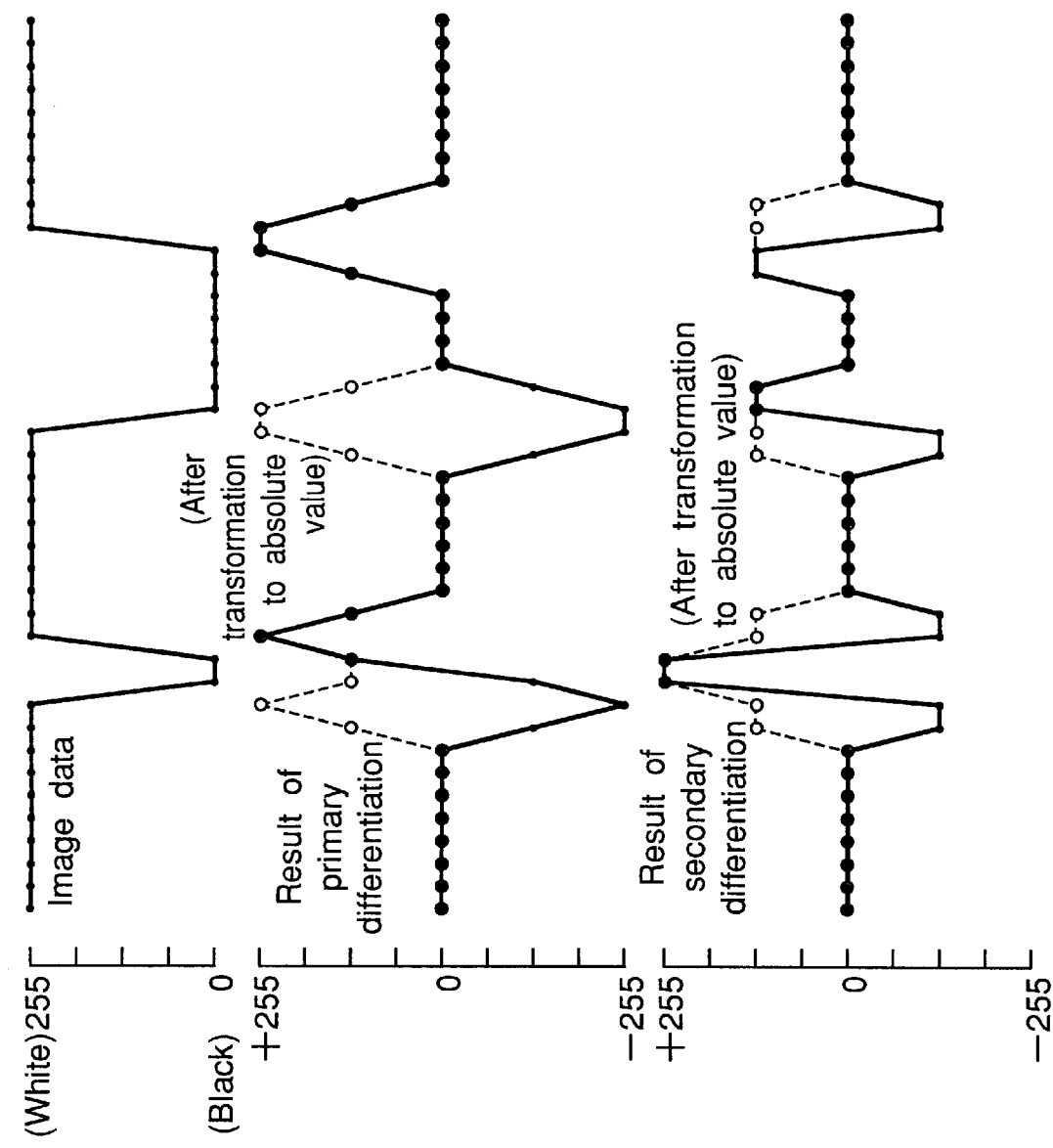
FIG. 14 is a diagram on operation of a combination of two differential filters.

Two differential filters are used for the character edge detection due to the following reason. As shown in FIG. 14, the primary differential filter 708 is used to detect the gradation level difference between the pixels adjacent to the objective pixel. The filter 708 judges a region near the boundary between the line and the background as the edge. The secondary differential filter 709 is used to detect the sum of the objective pixel and the gradation level differences between the pixels adjacent to the objective pixel. The filter 709 detects the reversed code in regions adjacent to the region near the boundary between the line and the background. In the case of a thin line, the filter 709 detects the line itself as the edge. Accordingly, the combination of two types of filters enables the character edge to be judged continuously from a thin line to a thick line. Furthermore, a boundary can be judged in accordance with a change in the code near a boundary between the edge of secondary differential and the background.

Figure 15:
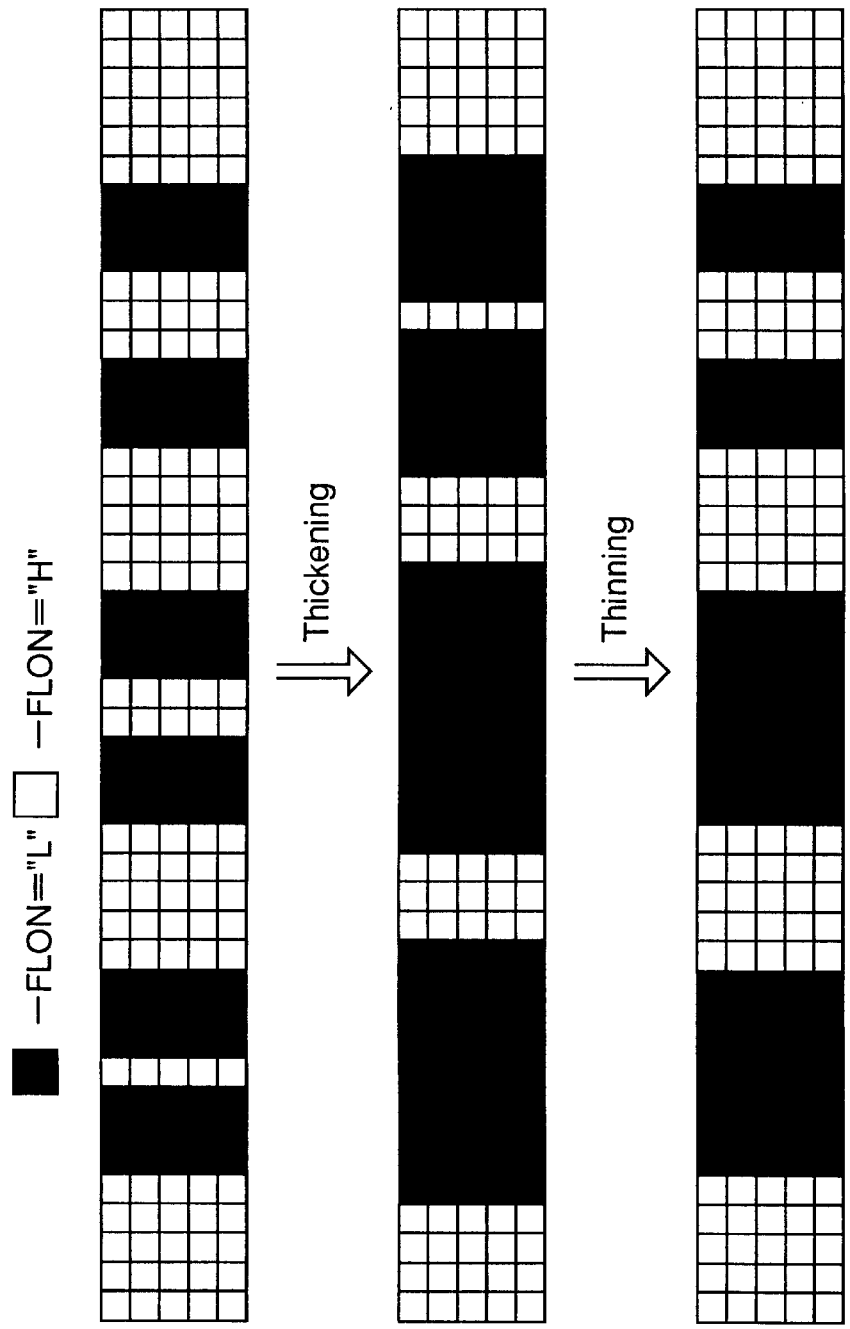
FIG. 15 is a diagram for illustrating operation of a character edge processing.

The signal −FLON, which has once detected an edge, is transmitted to a closing processor 716. In the closing processor 716, the result of −FLON="L"(the character-side edge) is first thickened by the use of the matrix of 3 dots*3 lines. If the 3*3 matrix includes even one dot of −FLON="L", this thickening forces the result of −FLON of the central dot to be replaced by "L". In short, the result of −FLON="L" is thickened by one dot for a previous line and for a following line. In three examples shown in the uppermost portion in FIG. 15, there are shown one dot, two dots and three dots of −FLON="H" (the background-side edge) in the main scan direction. In these examples, the region of −FLON="L" is increased by one dot with the thickening. Then, the result of the edge judgment after the thickening is again expanded in the matrix of 3 dots*3 lines, whereby the result is conversely thinned. This thinning forces the result to be replaced by "H", if the 3*3 matrix includes even one dot (−FLON="H") that is not an edge in the character side. In short, contrary to the thickening, the result of −FLON="L" is thinned by one dot in the previous and following lines. The signal can be thus converted to the character edge (−FLON="L"), only when the dot is judged as the dot (−FLON="H") that is not the character-side edge within the distance of two dots or less in the main scan and subscan directions, as shown in FIG. 15.

One of the results is selected by a selector 717 in accordance with the character/background boundary discrimination signal (−FLAREA), where the results include a result after the character edge closing (delay by two lines on the matrix expansion) and a result obtained by simply delaying the result before the character edge closing by two lines. That is, the closed character edge judgment result is used as the final character edge signal in the inside edge (−FLAREA="L"), while the non-closed character judgment result is used as the final character edge signal in the outside edge (−FLAREA="H"). After a predetermined line delay, a −EDG signal is transmitted to the character edge reproducer 451.

Figure 16:
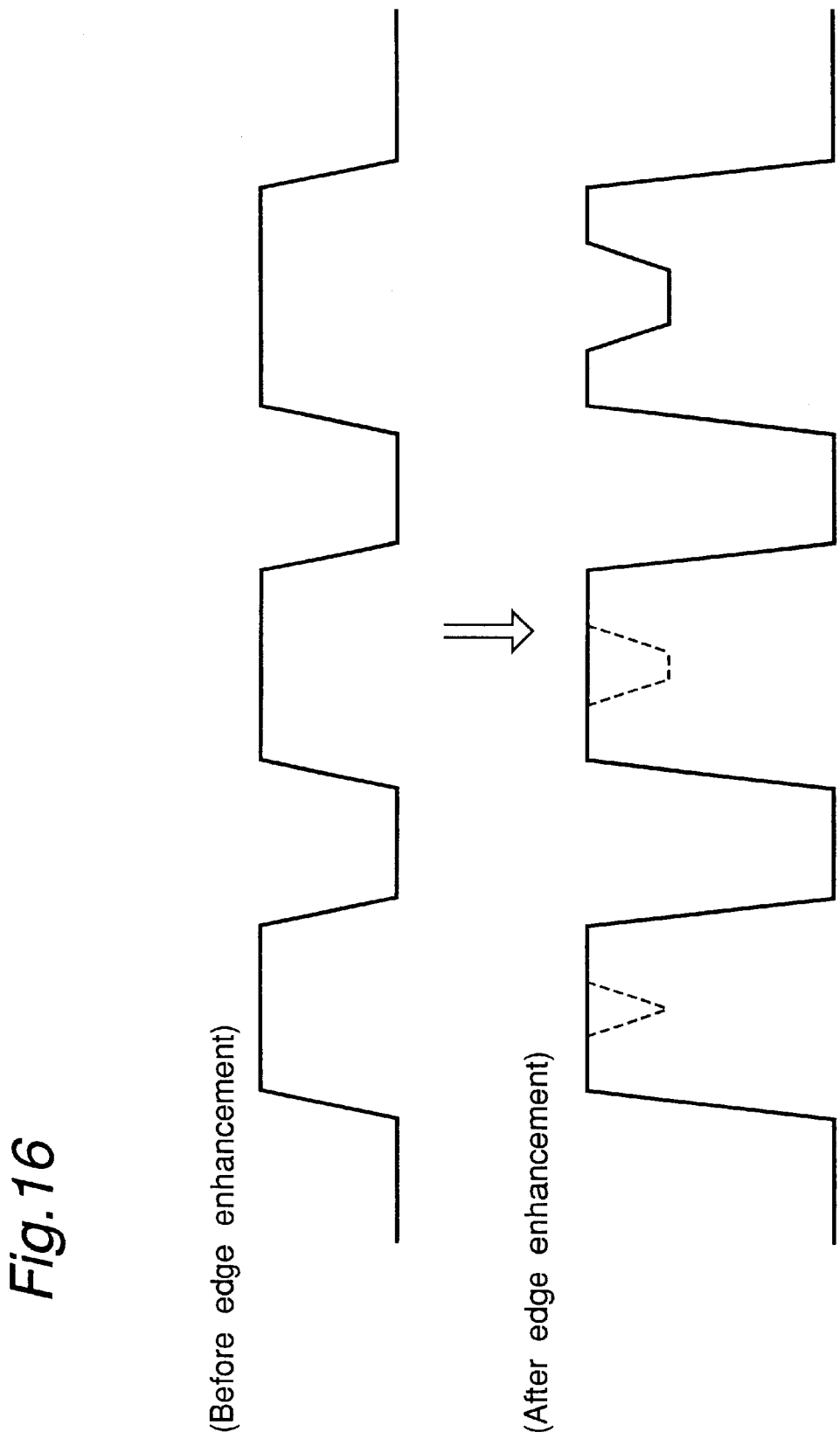
FIG. 16 is a diagram on a concavity made due to an edge emphasis.

This processing is performed for the following purpose. The edge is emphasized on a pixel judged as the character edge by the character edge reproducer 451 as described below. At this time, the edge emphasis allows a character to be bordered, thereby enhancing the contrast. However, when a character has a thickness of about 5 to 7 dots, at the center of the character, there are pixels of one or two dots that are not subjected to edge emphasis. This gives an impression that the reproduced character is hollow (see FIG. 16). The judgment is therefore corrected. That is, only an inside edge is judged as the character edge, so that edge emphasis is performed on the pixels at the character edge surrounded by two or less dots in the main scan and subscan directions. Thereby, the above-mentioned phenomenon is eliminated, and thus the reproducibility of characters is improved. However, if this correction is provided to an outside edge, the image in the region between the lines such as a line pair vanishes.

Figure 17:
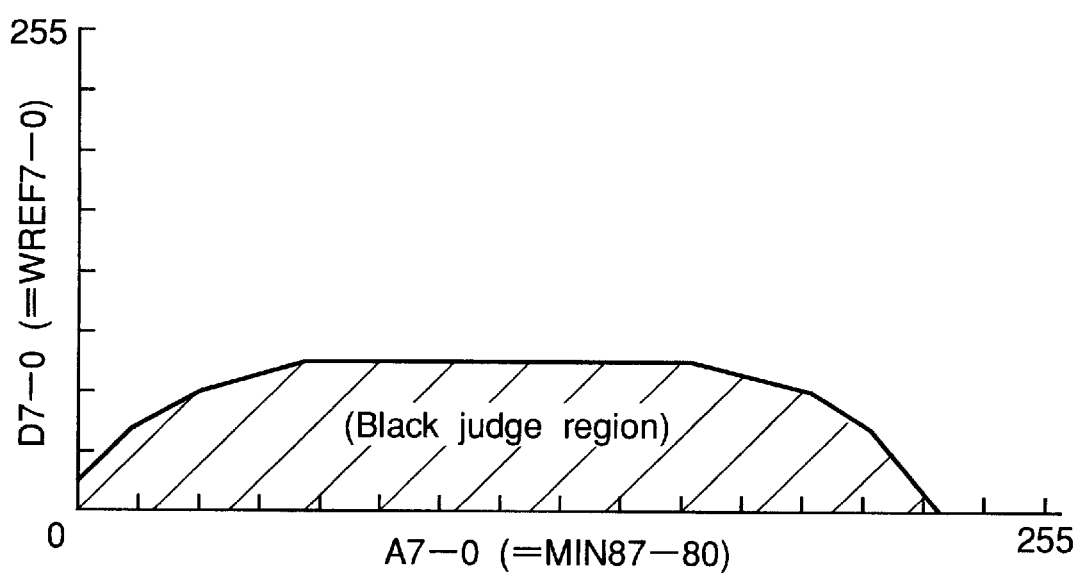
FIG. 17 is a graph of a chroma reference table.

Next, the black judgment in the region discriminator 441 is described. Whether or not the image is black is determined, by comparing the difference $W_{87-80}$ between the maximum and minimum colors of the R, G and B data with chroma reference data $WREF_{7-0}$ to which the minimum color data $MIN_{87-80}$ is converted by a chroma reference table 720. As shown in FIG. 17, the chroma reference table 720 has a low reference at the low and high value levels and has zero above a certain value level. In the comparison of the reference data to $W_{87-80}$, the level at which the image is judged as black can be varied depending on the value level. Thus, the image is not judged as black at all above the certain value level because this level represents the background. Thereby, the table 720 deals with the increase in the chroma difference due to a little phase difference among the R, G and B data in a character edge (at intermediate gradation levels), while it judges the value level collectively. Although this table is set by a central processing unit, its contents can be varied in accordance with a background level adjustment value obtained by the foregoing automatic exposure processing. The comparison between $WREF_{7-0}$, and $W_{87-80}$ is performed by a comparator 721. If the image is black ($WREF_{7-0}>W_{87-80}$), −BK="L" is outputted. After the four-line delay for the delay quantity of the edge detection, if the result of the character edge judgment after the closing is "L", the character edge is once judged as a black character edge, or −BKEG="L".

Next, the prevention of erroneous black character judgment in the region discriminator 441 is described. When the black character discrimination alone is performed, a character edge having low chroma (green, royal purple, etc.) may be misjudged. Therefore, when color dots of uniform density are detected, if the central pixel in the area having a large number of color dots of uniform density is judged as a black character, the result is canceled. First, $W_{87-80}$ is compared by a comparator 722 with chroma reference data $WREF_{17-10}$ set by a central processing unit. If the chroma is high ($W_{87-80}>WREF_{7-10}$), WH is set to "L". A comparator 723 compares $MIN_{87-8}$ to value reference data $VREF_{17-10}$ set by the central processing unit. If the value is low ($MIN_{87-80}<VREF_{17-10}$). −VL is set to "L". If a pixel has −VL="L" and WH="L" and is judged as a non-edge (−FLON="H") by the edge detection, it is judged as a color solid pixel, −CAN="L".

The data are expanded in a matrix of 9 dots*9 lines by the circuit 724, and the number of dots of −CAN="L" in the matrix is determined. The value $CANCNT_{7-0}$ is compared, by a comparator 725, to a count reference value $CNTREF_{17-10}$ set by the central processing unit. If the number of color dots of uniform density is more than the count reference value ($CANCNT_{7-0}>CNTREF_{17-10}$), −BKEGON is set to "H". The result (−BKEG="L") of the black character discrimination, which has been once judged, is canceled. On the other hand, if the number of color dots of uniform density is less than the count reference value, the result is allowed and transmitted to the character edge reproducer as the final result (−PAPA="L") of the black character discrimination.

Figure 18:
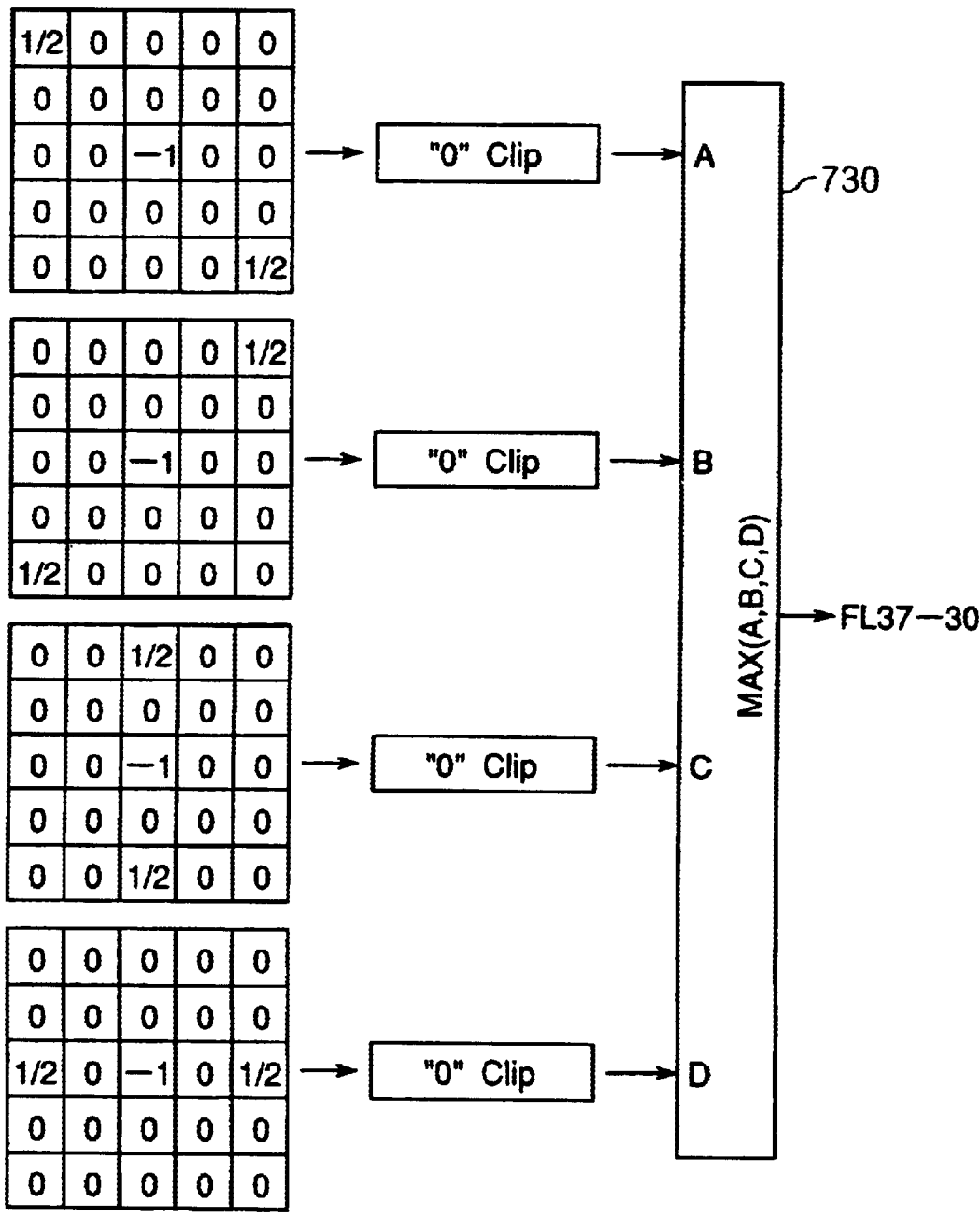
FIG. 18 is a diagram for illustrating black judgment.

Next, the generation of the black edge correction signal in the region discriminator 441 is described. As shown in FIG. 18, the black edge correcting filter 712 inputs the minimum color $MIN_{87-80}$ of the R, G and B data to the secondary differential filters in four directions. The results of the filters obtained independently are clipped to "0" (a negative value is clipped to "0"). The maximum value of each directional result is inputted as black edge correction data $FL_{37-30}$ to a black edge correction table 731 by a maximum value circuit 730. The result of the conversion by the table is taken as $VEDG_{7-0}$. After a predetermined line delay, the result is outputted as the edge correction data for the black character to the character edge reproducer 451. The data is used as an amount of the edge emphasis of the black character edge. The maximum value of the four secondary differential filters is used as the edge correction data in order to improve a generation characteristic of the black character copy. As exemplified in FIG. 19, when an edge is enhanced by the secondary differential filter of 45°, the lines are thinned at an intersection of the lines crossing at 90°. If the copies are repeatedly reproduced through generations (i.e., a master copy (a first generation) is copied to obtain a new copy (a second generation), the obtained copy (the second generation) is then copied to obtain another new copy (a third generation), and the third generation and the following are repeatedly reproduced in the same manner), the lines are noticeably thinned at crossing points and thus the character is difficult to read. When the edge is enhanced by the secondary differential filter of 0°/90°, the intersection of the lines crossing at 90° is lost. This is also not preferable from the viewpoint of the generation characteristic. The maximum value of the result of the four filters is used as the edge correction quantity, in order to prevent the image deterioration caused due to this phenomenon.

The edge correction signal for the black character is determined from the minimum color of the R, G and B data due to the following reason. Since R, G and B are value information, an edge change quantity of the R, G and B data in a filter is more sensitive to the background level (white background) on which the more intense character edge emphasis is needed, while it is less sensitive to a high gradation level on which the less intense enhancement is needed than that of the C, M, Y and K data subjected to logarithm correction.

The black edge correction table 731 is provided in order to convert the filter data $FL_{37-30}$ so that the amount of edge emphasis may be a proper value in the black character edge emphasis. The contents of the table 731 are set by the central processing unit.

A Laplacian filter used generally in the edge emphasis is an inverse filter of the secondary differential filter. The image data subjected to edge emphasis by the character edge reproducer 451 is the gradation level data of C, M, Y and K. This data is the inverse of the value data $MIN_{87-80}$ (having the opposite white/black gradation levels). Thus, the secondary differential filter can be used.

Figure 20:
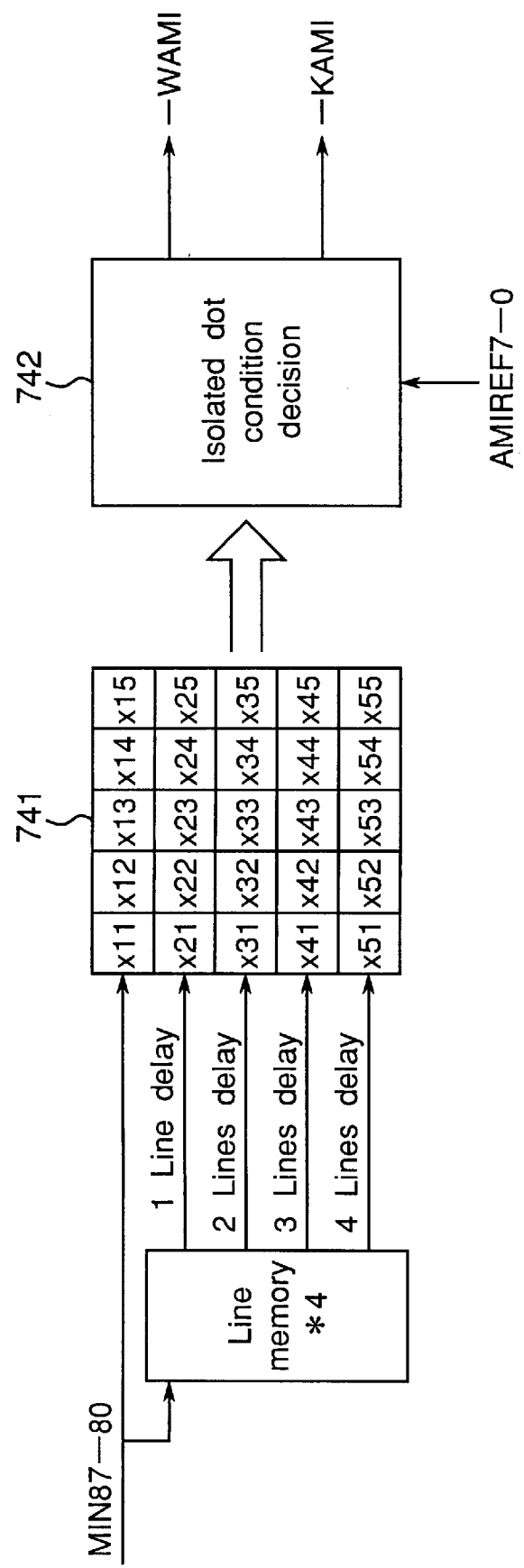
FIG. 20 is a diagram on an isolated dot condition decision for discriminating a dot.

Next, the dot discrimination in the region discriminator 441 is described. The minimum color $MIN_{87-80}$ of the R, G and B data is inputted to the isolated dot detecting filter 711 in the same manner as the edge detection. As shown in FIG. 20, $MIN_{87-80}$ is expanded in a matrix 741 of 5 dots*5 lines. Then, an isolated dot condition decision section 742 judges whether or not each pixel is an isolated dot having the same image distribution as that of the central pixel of the dots in a dot print.

The isolated dot detecting filter 711 judges whether or not the pixel satisfies two types of isolated dot conditions, in order to judge whether the pixel is a valley (white isolated dot) or a peak (black isolated dot) in the dot print.

First Condition: The gradation level of a central pixel X is higher (white isolated dot condition) or lower (black isolated dot condition) than the gradation levels of eight peripheral pixels around the central pixel $X_{33}$:

$$X_{33} \geq MAX(X_{22}, X_{23}, X_{24}, X_{32}, X_{34}, X_{42}, X_{43}, X_{44}),$$

and $$X_{33} \leq MIN(X_{22}, X_{23}, X_{24}, X_{32}, X_{34}, X_{42}, X_{43}, X_{44}).$$

Second Condition: The gradation level of a central pixel $X_{33}$ is higher (white isolated dot condition) or lower (black isolated dot condition) than an average level of the gradation level distributions in eight peripheral directions:

$$X_{33} > MAX(X_{11}+X_{22}, X_{13}+X_{23}, X_{15}+X_{24}, X_{31}+X_{32}, X_{34}+X_{35}, X_{51}+X_{42}, X_{53}+X_{43}, X_{55}+X_{44})/2 + AMIREF_{7-0}; \text{ and}$$

$$X_{33} < MIN(X_{11}+X_{22}, X_{13}+X_{23}, X_{15}+X_{24}, X_{31}+X_{32}, X_{34}+X_{35}, X_{51}+X_{42}, X_{53}+X_{43}, X_{55}+X_{44})/2 - AMIREF_{7-0},$$

where isolated dot reference data $AMIREF_{7-0}$ for determining the isolated dot conditions is an image parameter set by the central processing unit. The pixel, which satisfies two types of conditions described above, is transmitted to the following step as the white isolated dot (-WAMI="L") or the black isolated dot (-KAMI="L").

The two types of isolated dot information are each then expanded into the matrix of 41 dots*9 lines. As in the case where the number of "L" dots of a -CAN signal is counted for the prevention of the black character misjudgment, counters 743 and 744 count the number of "L" dots of -WAMI and -KAMI. The count values are $WCNT_{7-0}$ and $KCNT_{7-0}$ (if the count values are 255 or more, they are clipped to 255). The data $WCNT_{7-0}$ and $KCNT_{7-0}$ as to the number of white and black isolated dots are compared in parallel, by comparators 745 and 746, to reference data $CNTREF_{27-20}$ as to the number of isolated dots. If $WCNT_{7-0}$ or $KCNT_{7-0}$ is larger than $CNTREF_{27-20}$, the image is judged as a dot print image and AMI1="L" is outputted. That is, a condition of the dot image discrimination is that the number of the pixels (-WAMI="L" or -KAMI="L"), which have the same image distribution as that of the dots in the dot image, is equal to or larger than a fixed value $CNTREF_{27-20}$ in a certain unit area (41 dots*9 lines).

A rough value of the reference $CNTREF_{27-20}$ as to the number of isolated dots is described. The image read condition of the system is 400 dpi. Assuming that the dot print conditions are that the screen angle is 45° and that the number of screen lines is W, at least $2*(W/SQRT(2))^2$ dots are thus present in an area of one inch square (400*400 dots). Therefore, $CNTREF_{27-20}$ is expressed as the following equation.

$$CNTREF_{27-20} = (369/160,000)*W^2.$$

If W=100, the reference value is 23. This value is obtained when the isolated dot detecting filter 711 can detect the dot pixels with accuracy of 100%. Thus, the value which is a little lower than the calculated value is, in fact, a proper value. It is necessary to change the reference value, depending on magnification power or the like. For enlargement, the value $CNTREF_{27-20}$ is smaller than $CNTREF_{27-20}$ for a life size reproduction because of a small number of isolated dots per unit area. On the contrary, $CNTREF_{27-20}$ for reduction is larger than $CNTREF_{27-20}$.

It is difficult for the isolated dot detecting filter 711 to judge a dot pixel as an isolated dot, in the case of a print image having a small number of screen lines of the dots (a great distance between the dots) and a dot-area ratio of about 50%. A particular case is the intermediate-gradation-level dot print having about 65 to 85 screen lines. When the document to be printed has the intermediate gradation level, the isolated dot detecting filter 711 judges that the white and black isolated dots are substantially equally mixed because the dot-area ratio is about 50%. Consequently, the number of white isolated dots is substantially equal to that of black isolated dots. Thus, the value does not reach to the above-mentioned value $CNTREF_{27-20}$. Thus, previously, the pixel has or has not been judged as a dot at about the intermediate gradation levels in the dot print. This may produce image noises. In order to solve this problem, the following processing is additionally performed. First, a sum of the number of white isolated dots $WCNT_{7-0}$ and that of black isolated dots $KCNT_{7-0}$ is determined. Then, the sum is compared to another reference data $CNTREF_{37-30}$ as to the number of isolated dots by a comparator 747, thereby judging whether or not the document is a dot print image.

Figure 21:
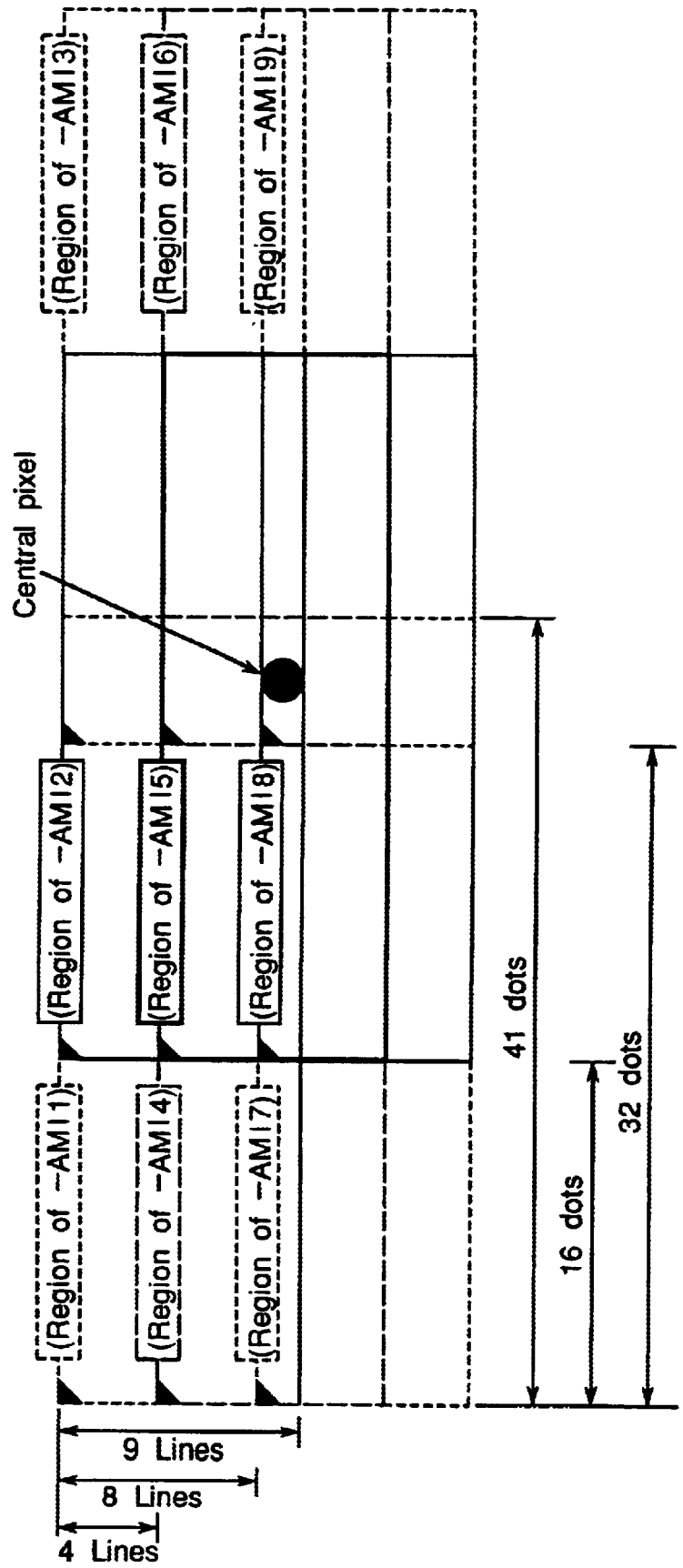
FIG. 21 is a diagram on dot discrimination which is performed when a central pixel is shifted.

After it is once judged whether a pixel is a dot (–AMI= "L") or not (–AMI="H"), a –AMI1 signal is inputted to eight types of delay blocks. Under delay control by predetermined lines and dots, if any one of the dot results $-AMI_{1-9}$ is "L", i.e., the dot, the document is judged as a dot print, and –AMIOUT="L" is transferred to the subsequent character edge reproducer 451. This means, as shown in FIG. 21, that whether or not one of the numbers of isolated dots exceeds a certain level is judged in a region shifted according to the central pixel to be judged by a certain number. Therefore, even if a dot print portion is included in a document, the accuracy of dot discrimination is not decreased near a boundary of the dot print portion.

The processing in the region discriminator 441 has been described above. In the block diagrams shown in FIGS. 10A and 10B, signals needed for the discriminations are synchronized to one another. Thus, the delay control by predetermined numbers of lines or dots is performed. For example, for the dot discrimination, the discrimination result –AMIOUT is delayed with respect to the input R, G and B data by ten lines in total, two lines by the line memory, four lines by the count of the isolated dots, and four lines for shifting the discrimination region from the central pixel. For the black character discrimination, the discrimination result –PAPA is delayed with respect to the input R, G and B data by ten lines in total: two lines by the line memory, two lines by the closing, two lines for synchronizing the count result of the –CAN signal for preventing the misjudgment, and four lines for synchronizing the dot result.

In this manner, the discrimination results of character edge discrimination signal –EDG, black character discrimination signal –PAPA, character/background boundary discrimination signal –INEDG, dot discrimination signal –AMIOUT and black edge correction signal $VEDG_{7-0}$, are delayed so as to prevent phase shift at the output positions. The results are transmitted to the subsequent character edge reproducer 451.

Figure 22A:
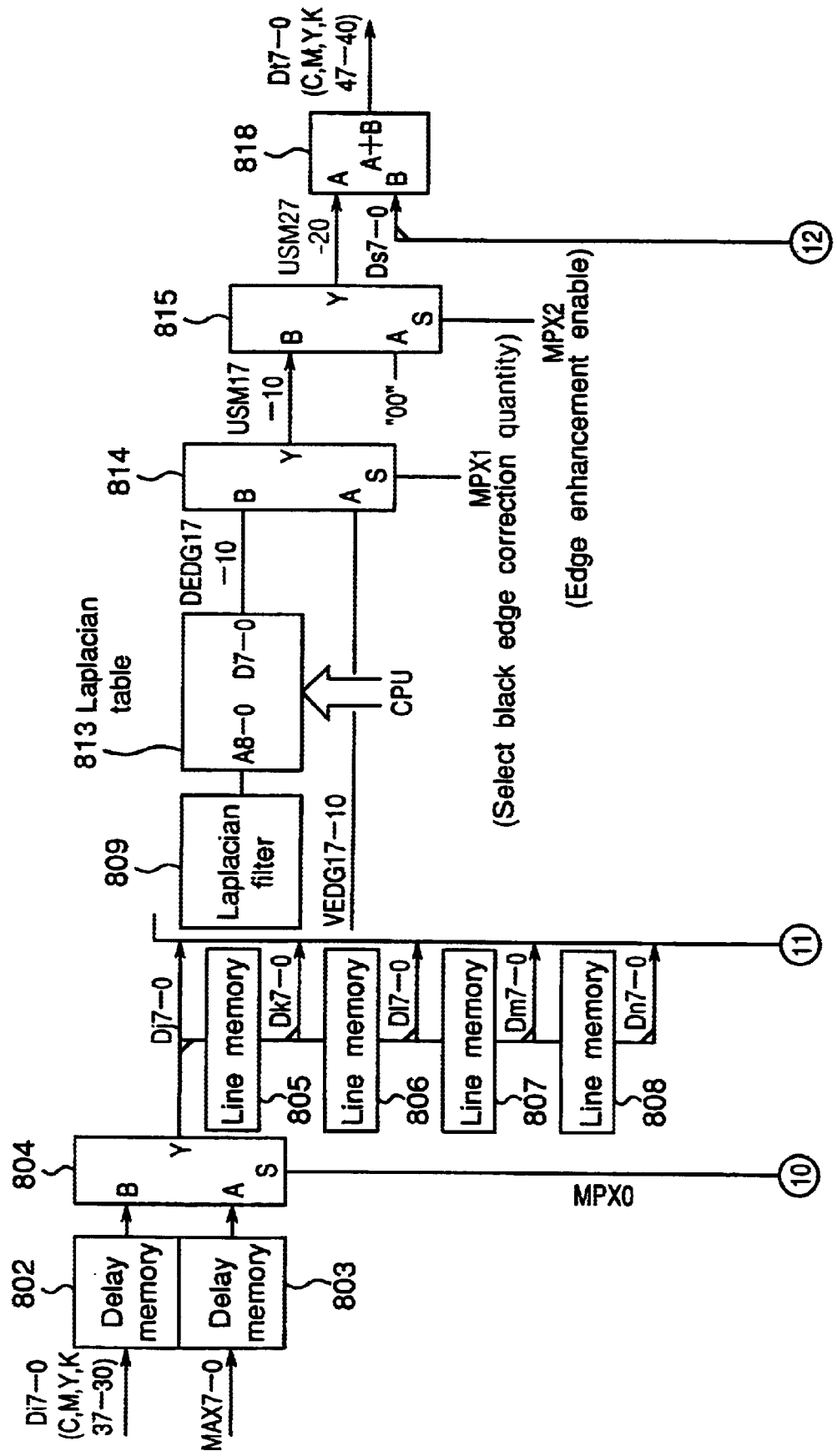
FIGS. 22A and 22B are parts of a block diagram of a character edge reproducer.
Figure 22B:
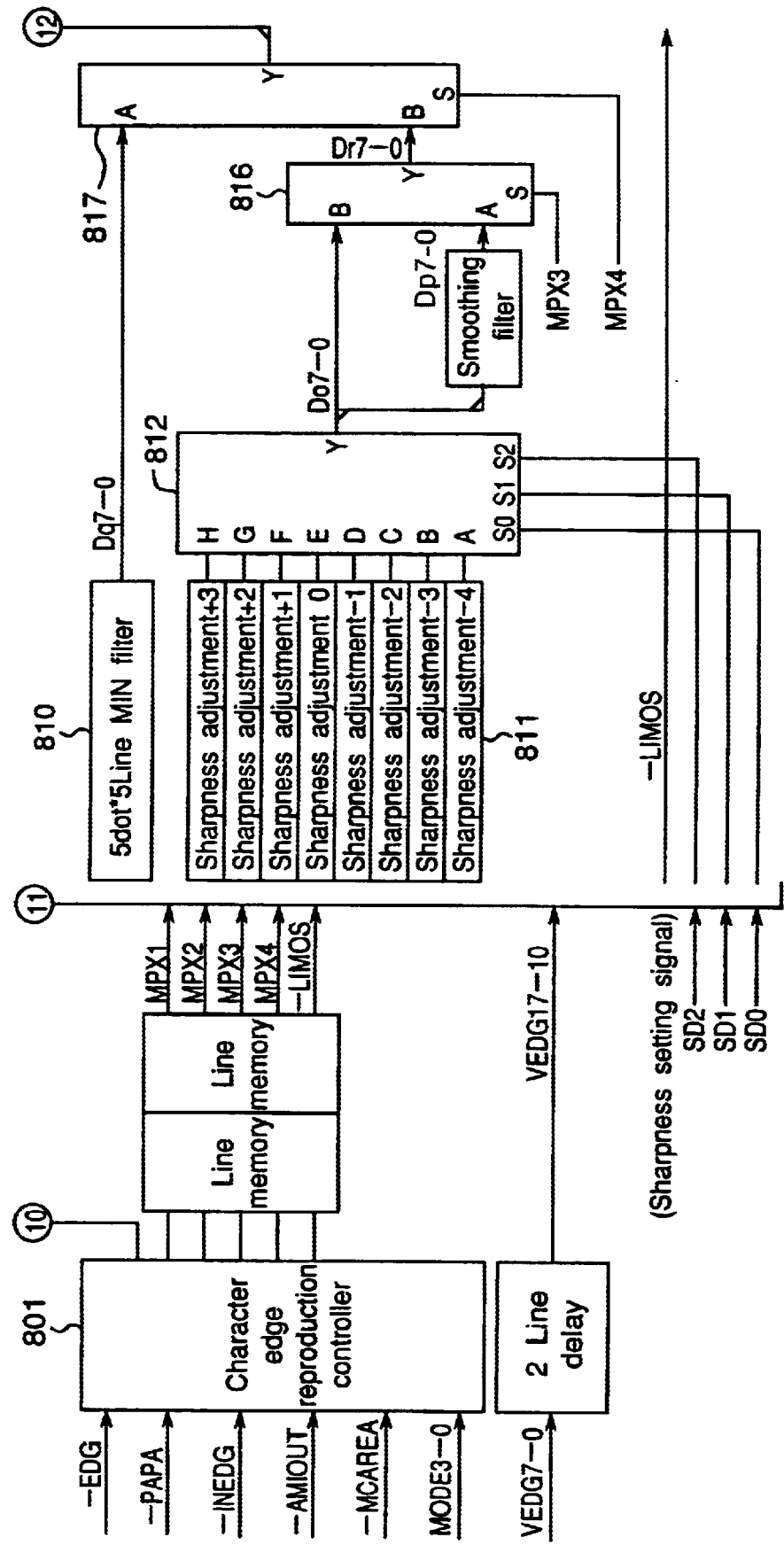

FIGS. 22A and 22B show the character edge reproducer 451. The character edge reproducer 451 performs appropriate image correction on the C, M, Y and K data after color correction in accordance with the result of the discrimination in the region discriminator 441. Although C, M, Y and K are processed in parallel, the C, M and Y signals are processed in the same manner, while the K signal is differently processed. The region discrimination result is inputted to a character edge reproduction controller 801. The result is converted to a select signal for switching the corrections in the character edge reproducer 451. The contents of this conversion are changed in accordance with the status of document mode signal $MODE_{3-0}$ and monochrome image area signal –MCAREA which are inputted together with the region discrimination result. The document mode signal is used in order that a user specifies a document on the platen glass plate by the operation panel. This signal includes not only a character mode, a map mode a character photograph mode, a photographic paper photograph mode, a print photograph mode, etc., but also a negative film mode and a positive film mode for an optional film projector, a mode (printer function) for inputting the image from an external apparatus, etc. Herein, the general character photograph mode is described.

First, a structure of the character edge reproducer 451 is described. Data $Di_{7-0}$ (C, M, Y and $K_{37-30}$) and maximum color data $MAX_{7-0}$ are inputted to delay memories 802 and 803 in order that they are synchronized to the region discrimination results. The data $Di_{7-0}$ have been obtained by converting/correcting the R, G and B data to the C, M, Y and K data in the color corrector, and the data $MAX_{7-0}$ have been obtained by logarithm correction on the R, G and B data. A selector 804 selects $Di_{7-0}$ or $MAX_{7-0}$ for each color. $MAX_{7-0}$ is the signal selected instead of the normal K image data in a region which has been subjected to the black character discrimination by the black character correction data. The output $Di_{7-0}$ of the selector 804 is inputted to four line memories 805 to 808, which are dependently connected, in order to expand a matrix of 5 lines*5 dots. The data (Dj, Dk, Dl, Dm and $Dn_{7-0}$) of five lines from the line memories are inputted to a Laplacian filter 809, a Min filter 810 for the 5 dots*5 lines and a sharpness adjuster 811. A predetermined sharpness adjustment image is selected by a selector 812 in accordance with the status of a sharpness setting signal $SD_{2-0}$ depending on the sharpness level set by the operation panel. $Do_{7-0}$ is outputted for each of the C, M, Y and K data.

The Min filter 810 selects the data of the minimum gradation level from the data expanded in the 5*5 two-dimensional matrix, and it outputs $Dq_{7-0}$. This is used for the removal of the outside data of the character edge in order to remove the color components (C, M and Y) and to improve the contrast during the black character discrimination. The Laplacian filter 809 (shown in detail in FIG. 23) is a spatial filter for edge emphasis using a 5*5 matrix. The filter results of the colors are once inputted to a Laplacian table 813 in order to convert the data to optimum data as the edge emphasis quantity. The data is then outputted as $DEDG_{17-10}$. A selector 814 selects the edge emphasis signal $DEDG_{17-10}$ obtained from the Laplacian filter of each color or the black edge correction signal $VEDG_{7-0}$ from the region discriminator. Then, the selector 814 outputs $USM_{17-10}$. The difference between $DEDG_{17-10}$ and $VEDG_{7-0}$ is as follows. The former is the edge correction signal for the color gradation level components (C, M, Y and K), while the latter is the value edge correction signal obtained from the R, G and B data by the secondary differential filter.

Then, a selector 815 selects whether or not the edge is emphasized. The selector 815 outputs the final edge correction signal $USM_{27-20}$. On the other hand, the output data $Do_{7-0}$ of the selector 812 is inputted to a selector 816 and a smoothing filter (shown in detail in FIG. 24). The data $DO_{7-0}$ is selected together with the smoothing filter result $Dp_{7-0}$ by the selector 816. Then, $Dr_{7-0}$ is outputted. The result $Dr_{7-0}$ or $Dq_{7-0}$ of the 5*5 Min filter 810 is selected by a selector 817 and then outputted as $Ds_{7-0}$ to an adder 818 for the edge emphasis. Finally, the adder 818 adds the edge correction data $USM_{27-20}$ of each color-to $Ds_{7-0}$ which the color image data are directly corrected into. Then, $Dt_{7-0}$ (C, M, Y and $K_{47-40}$) are outputted.

Accordingly, selection signals $MPX_4$–$MPX_0$ for controlling the character edge reproducer perform the following control.

MPX0 (the selection of black character correction data): If MPX0 is "L", the first selector 804 selects $MAX_{7-0}$ (or the maximum color data after the logarithm correction on R, G and B data), while if it is "H", the selector 804 selects $Di_{7-0}$ C, M, Y and $K_{37-30}$, C, M, Y and K data after the color correction).

MPX1 (the selection of black edge correction quantity): If MPX1 is "L", the second selector 814 selects the black edge correction data $VEDG_{17-10}$ from the region discriminator. If it is "H", the selector 814 selects the correction data $DEDG_{17-10}$ for the edge emphasis from the Laplacian filter 809 of the input C, M, Y and K data.

MPX2 (the permission of edge emphasis): If MPX2 is "L", the third selector 815 selects the inhibition of edge emphasis (the edge correction quantity=0). If it is "H", the selector 815 selects the permission of edge emphasis.

MPX3 (the selection of smoothing filter): If MPX3 is "L", the fourth selector 816 selects the smoothing filter result. If it is "H", the selector 816 selects that the result of the sharpness adjustment is allowed to pass through.

MPX4 (the selection of Min filtering): If MPX4 is "L", the fifth selector 817 selects the result of the MIN filter in 5 dots*5 lines. If it is "H", the selector 817 selects that the result of the foregoing fourth selector 816 is allowed to pass through.

As described above, the data inputted to the character edge reproducer is selected in accordance with MPX0. It is selected in accordance with MPX1 and MPX2 whether the correction data for the edge emphasis for the input data is selected or inhibited. The correction of the input data itself is selected in accordance with MPX3 and MPX4. The contents of the processing in the character edge reproducer are therefore determined by the conversion of five types of select signals MPX4–MPX0 for determining the correction in accordance with the result of the region discrimination in the character reproduction controller.

It is described below how the character edge reproducer 451 actually controls the character edge reproduction.

In color character photograph mode (MODE$_{3-0}$="2" and –MCAREA="H"), a document region is judged from the result of the region discrimination in the following way. In the data, –AMIOUT denotes dot discrimination signal, –PAPA denotes black character signal, –EDG denotes character edge discrimination signal, –INEDG denotes character/background discrimination signal.

| -AMIOUT | -PAPA | -EDG | -INEDG | Document region |
|---|---|---|---|---|
| "L" | "H" | — | — | Dot region |
| "L" | "L" | — | "L" | Black character in dot image |
| "H" | "L" | — | "L" | Black character |
| "H" | "H" | "L" | "L" | Color character |
| "H" | — | "L" | "H" | Outside of character edge |
| "H" | "H" | "H" | — | Continuous gradation level portion |

Then, the K data in the color character photograph mode is controlled by MPX4–MPX0 in the following manner.

| Document region | MPX0 | MPX1 | MPX2 | MPX3 | MPX4 | -LIMOS |
|---|---|---|---|---|---|---|
| Dot region | "H" | "H" | "L" | "L" | "H" | "H" |
| Black character in dot image | "L" | "H" | "H" | "H" | "H" | "H" |
| Black character | "L" | "L" | "H" | "H" | "H" | "L" |
| Outside of character | "H" | "H" | "L" | "H" | "H" | "L" |
| Continuous gradation level portion | "H" | "H" | "L" | "H" | "H" | "H" |

Further, the C, M and Y data in the color character photograph mode are controlled by MPX4–MPX0 in the following manner.

| Document region | MPX0 | MPX1 | MPX2 | MPX3 | MPX4 | -LIMOS |
|---|---|---|---|---|---|---|
| Dot region | "H" | "H" | "L" | "L" | "H" | "H" |
| Black character in dot image | "H" | "H" | "L" | "H" | "L" | "H" |
| Black character | "H" | "H" | "L" | "H" | "L" | "L" |
| Outside of character | "H" | "H" | "H" | "H" | "H" | "L" |
| Continuous gradation level portion | "H" | "H" | "L" | "H" | "H" | "H" |

This means following facts.

(1) For a dot region, each input color data is smoothed and the edge emphasis is not permitted.

(2) For a black character in a dot image, an edge component is removed from the C, M and Y components by the 5*5 Min filter. The K component is replaced by MAX(DR, DG, DB).

(3) For a black character, the edge component is removed from the C, M and Y components by the 5*5 Min filter. The K component is subjected to edge emphasis by the value component and replaced by MAX(DR, DG, DB).

(4) For a color character, the C, M and Y components are subjected to edge emphasis by the Laplacian filter of each color. The input data of the K component is allowed to pass through.

(5) For an outside of a character, the edge component is removed by the 5*5 Min filter.

(6) For a continuous gradation level portion, the input data of each color is allowed to pass through.

Next, it will be explained how the character edge reproducer 451 corrects each document region judged in accordance with the result of the region discrimination.

First, processing on a dot region is described. In an area judged as a dot region, a moire pattern is prevented by the smoothing. The causes of a moiré pattern are generally classified into three types:

(1) Interaction between a sampling period (resolution) and a dot period when the image is read by the CCD sensor.

(2) Interaction between the frequency characteristic of the spatial filter such as a Laplacian filter for edge emphasis and the dot period.

(3) Interaction between a gradation level reproduction period and the dot period when the gradation levels are reproduced by the printer.

The type (1) is little visually noticeable at the resolution level of about 400 dpi.

The type (2) differs depending on the size and directivity of the filter for edge emphasis. However, it can be solved by inhibiting the edge emphasis in dot areas in a document. Thus, the edge emphasis is inhibited in the dot regions.

The type (3) depends on the pulse width modulation cycle in the print head controller for determining the gradation level reproduction period. In the dot areas, moire patterns are liable to occur due to the 2-dot pulse width modulation as described below. Thus, as shown in FIG. 24, three-dots in the main scan direction are subjected to integration type smoothing in order to previously attenuate high frequency components of the dot frequency. Thereby, the interference with the gradation level reproduction period is avoided.

Next, processing on a black character region in a dot image is described. At present, it is not perfectly possible to distinguish a type of a document having black characters printed on a light color background with a dot-like pattern from another type of a document having black dots printed thereon, because detection of an isolated dot for detecting dots coexists with character edge detection. Consequently, an intermediate processing is applied to an area in which the black character discrimination and the dot detection coexists. In the area, the smoothing is not performed so that a black character is prevented from being blurred. The edge emphasis is not performed so that moire patterns are prevented. In order to prevent color blur of a black character, the black component is replaced by the maximum color data obtained from the R, G and B data after logarithm correction, and the edge component of the color components (C, M, Y) is attenuated with a Min filter.

Next, black character discrimination in the character edge reproducer 451 is described. In the black character discrimination, the C, M and Y components are attenuated and removed by the Min filter 810 in order to correct the blurred color in an edge. The components are removed by the Min filter 810, thereby preventing the phenomenon caused by the too much reduction of the components, i.e., preventing partial whitening of the periphery of the character. The K component is replaced by the maximum color in R, G and B after the logarithm correction. The edge is enhanced in accordance with the value edge correction signal obtained from the minimum color of R, G and B. Thus, the data can be corrected into the clear black data which is resistant to copy generation. The clear black characters are thus reproduced on a copy as if they were reproduced by the use of black color alone.

Figure 25:
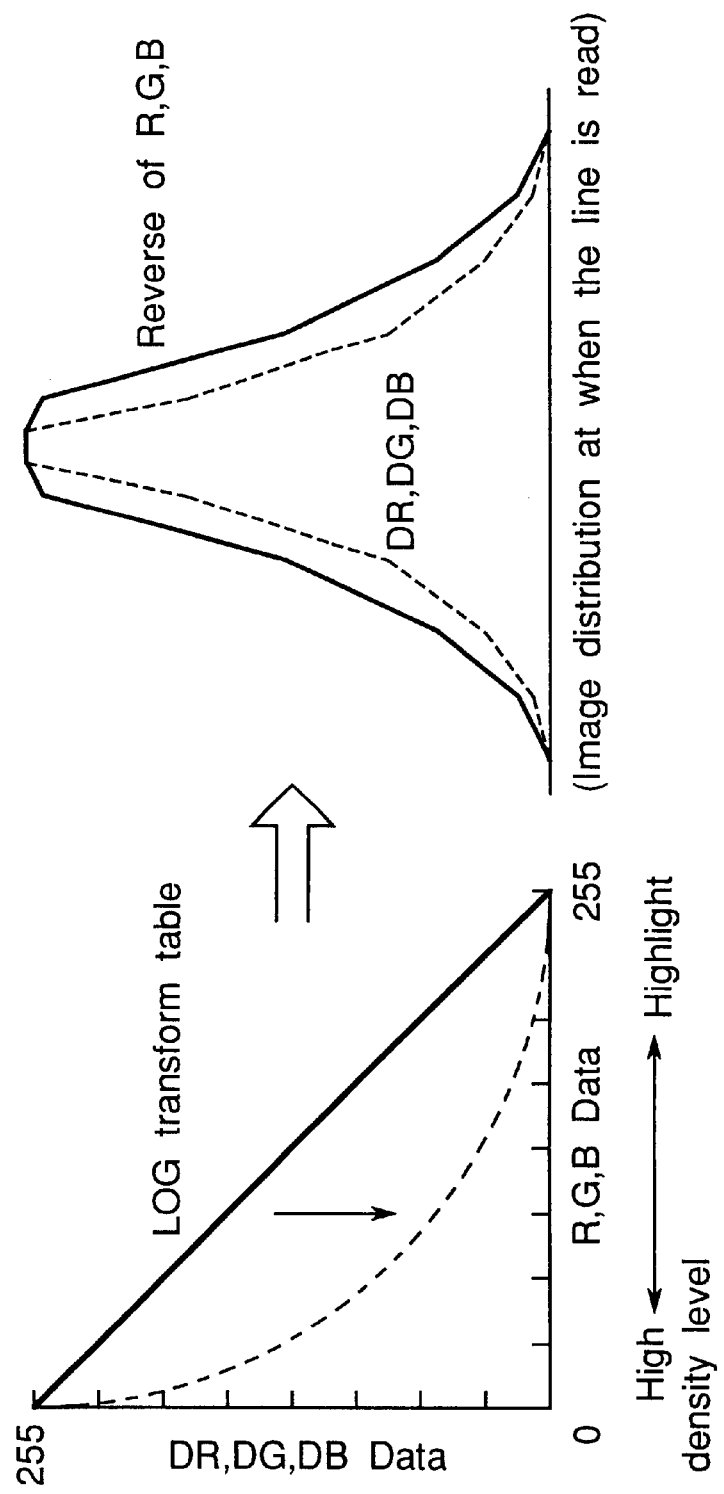
FIG. 25 is a diagram for showing an influence of LOG correction on the edge.

It is explained here why the value edge correction signal obtained from the data MIN(R, G, B) is used as the edge emphasis quantity. As mentioned above on the region discriminator, the value edge is sensitive to the background (white background). On the other hand, it is insensitive to gradation change at high densities and hard to generate image noises. The value edge itself has characteristics to improve contrast and to prevent narrowing a line, compared to the gradation level image data after logarithm correction. Both are affected by the logarithm correction, and the influence of the logarithm correction on a line read can easily be seen in FIG. 25. In order to improve the generation of the character image, it seems better that contrast of characters is enhanced relative to the white background and that the edge is enhanced a little over. Therefore, the edge is enhanced by the edge correction of the value component. In this case, because MIN (R, G, B) is used as the value component, the thickened image distribution is obtained when a line is read.

Figure 26:
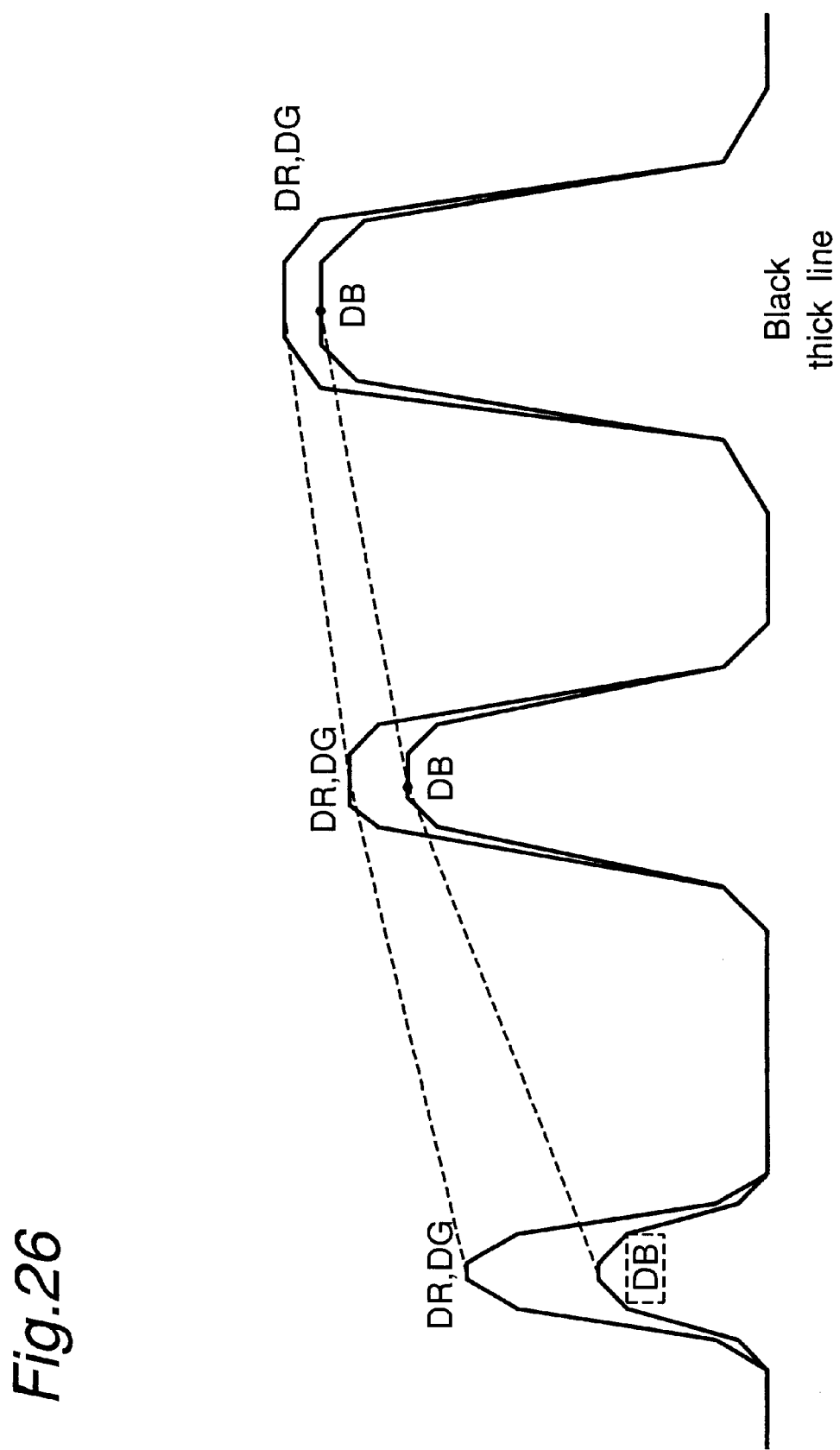
FIG. 26 is a diagram on the improvement of reproducibility of the edge of a black thin line.
Figure 27:
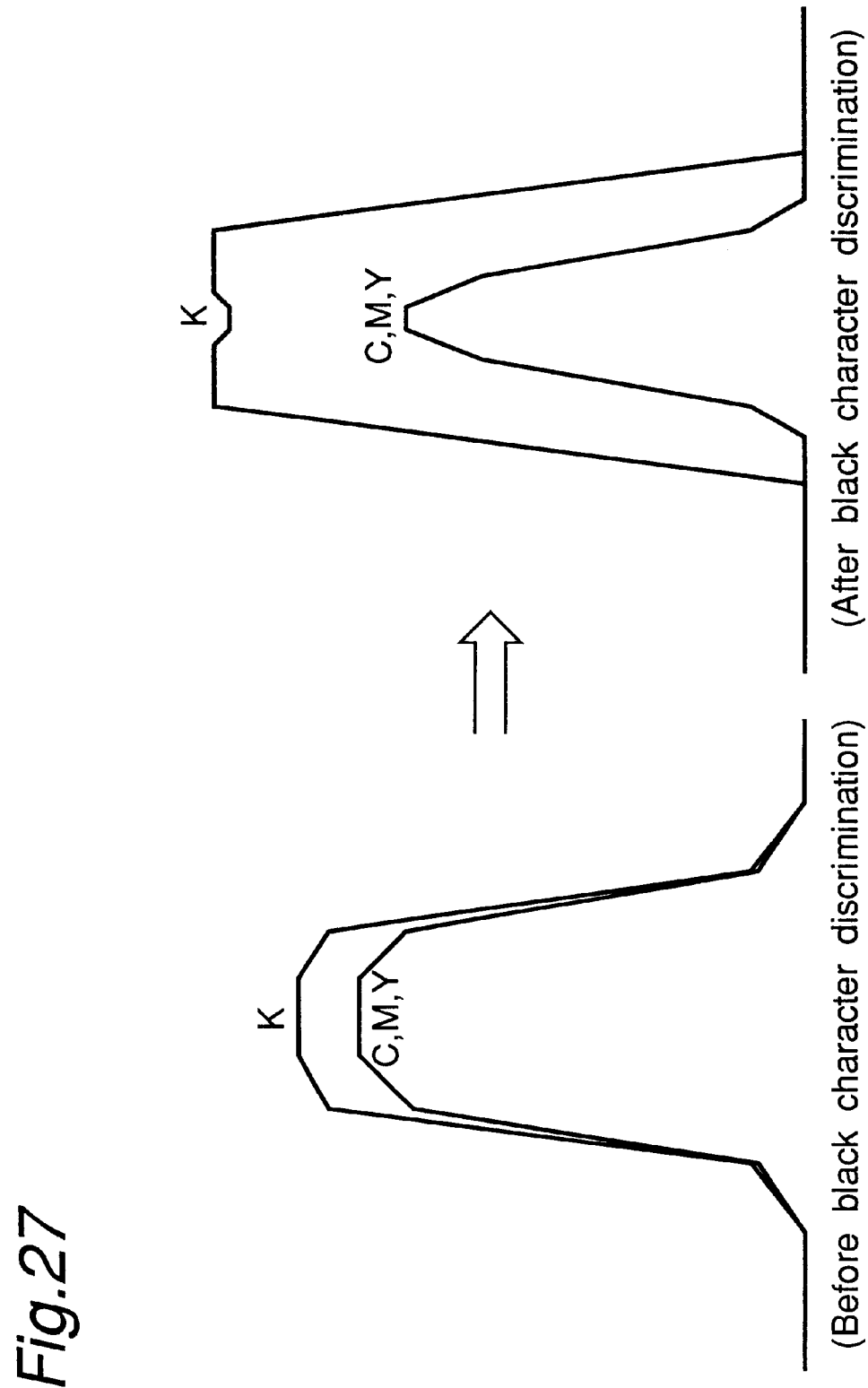
FIG. 27 is a diagram on the correction of the blurred color by a black character discrimination.

Next, it is described why the K component is replaced by the data MAX(DR, DG, DB) before the edge emphasis. The gradation level of the K component is determined by the black paint processor in the color corrector. This value is 100% of the black paint quantity BP at maximum, i.e., MIN(DR, DG, DB). Accordingly, the K data after the color correction has the following relationships: MAX(DR, DG, DB)>=MIN(DR, DG, DB)>=K data. Therefore, there is a tendency that MAX(DR, DG, DB) having the higher gradation level is suitable for the character reproduction than the normal K data. More particularly, as shown in FIG. 26, this is more evident for the reproduction of a thin line. The reason is that there are differences in the solutions among R, G and B due to the characteristic of the lens for forming the image on the CCD sensor. Thus, when a black thin line is read, only data of low contrast is obtained as MIN(DR, DG, DB) due to the resolution difference. Thus, a black thin line is unclearly reproduced and, as a result it lacks clearness. Since the normal K data has the extremely low gradation level, the improvement of the contrast by the edge emphasis is limited. The K data is therefore replaced by MAX(DR, DG, DB) not affected by this influence, whereby the reproducibility of a black thin line is improved much, thus realizing the black character reproduction that does not depend on the line width. FIG. 27 shows correction of blurred color in the black character discrimination.

Next, it is described how a color character region is processed. A region which is not a dot region, not a black-character region and an in-character edge region are regarded as a color character region, and in the region, the C, M and Y color components are subjected to the edge emphasis. In this case, the edge correction data for the edge emphasis is processed in accordance with the result of a Laplacian filter of each color so as to prevent the color change at the edge due to the edge emphasis. The as-received data of the K component is allowed to pass through.

First, a processing at an outside region of a character edge is described. At the side of the background (outside edge) decided by the discrimination between the character and the background in a character edge, a 5-lines*5-dots Min filter is used in order to achieve an unsharp mask effect (to increase the gradation level change at the edge) for improving the contrast of the character reproduction and the edge emphasis at the inside of the character. Because the minimum gradation level in the peripheral pixels is selected in the periphery of the edge, the gradation level is not extremely reduced in the periphery of the edge due to the substitution in accordance with the result of the Min filter of each color. Therefore, typically, the edge emphasis by the Laplacian filter can prevent the periphery of a character from turning white.

Next, it is described how the continuous gradation level region is processed. A pixel which does not belong to any of the five types of document regions described above is judged as a continuous gradation level portion, wherein without a particular correction, the as-received data of each color is allowed to pass through.

Next, processing of the gradation reproduction attribute signal –LIMOS is described. The gradation reproduction attribute signal is transmitted together with the image data of C, M, Y and K for the purpose of automatically switching the gradation level reproduction to a following print imaging controller and the gradation reproduction cycle in the print head controller. This signal is "L" level in a non-dot region (–AMIOUT="H"), in a character edge region (–EDG="L") and in an inside edge region (–INEDG="L"). The signal gives an instruction to perform the gradation level reproduction which gives priority to the resolution and does not distort the character. The pseudo 256-gradation-level processing called the multi-value error diffusion is typically performed for the gradation level reproduction in the print imaging controller. In the character edge corresponding to –LIMOS="L", the simple quantization is, however, performed thereby preventing the edge from being distorted.

The 2-dot pulse width modulation reproduction whose screen angle is set to 45° is typically performed in the print head controller. However, the 1-dot pulse width modulation reproduction giving priority to the resolution is performed in a region corresponding to –LIMOS="L". The processing is switched for an inside edge in the character edge, whereby the gradation reproduction cycle of the print head controller is switched at a character edge boundary. Thus, a gradation level jump due to difference in the gamma-characteristic becomes harder to be noticeable.

In this manner, the C, M, Y and K data (C, M, Y and $K_{47-40}$) after the optimum image correction in accordance with the result of the region discrimination in the character edge reproducer are subjected to the image adjustment in a color balance/gamma adjuster 452 in accordance with the setting from the operation panel. Then they are transmitted together with the −LIMOS signal to the print imaging controller. Thereafter, the data are subjected to the exposure control for forming an image on each color photoconductor by means of the light modulation using the semiconductor laser in the print head controller.

Next, a gradation reproducer 500 of the print imaging controller is described. The 8-bit data, which are obtained by converting the R, G and B data that are read by the image reader 200 into the C, M, Y and K data by means of the image processing, are simultaneously inputted to the gradation reproducer 500. The gradation reproducer 500 receives the 8-bit image data of C, M, Y and K and the gradation reproduction attribute signal −LIMOS and converts them to the pseudo 256-gradation-levels by the character separation type multi-value error diffusion. The gradation reproducer 500 outputs each 3-bit color data (gradation level data) and 1 bit gradation reproduction attribute signal.

Figure 28:
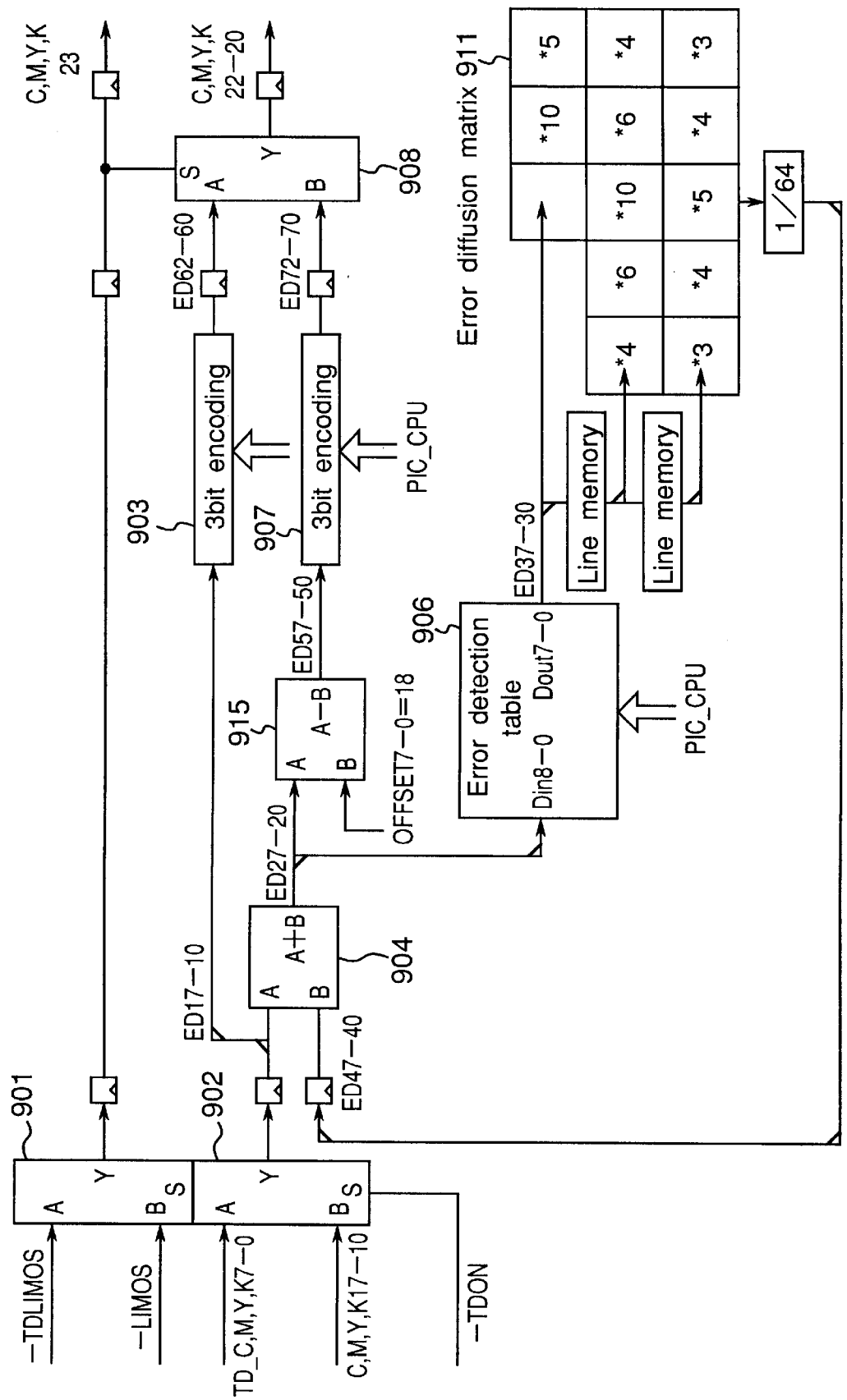
FIG. 28 is a block diagram of a gradation reproducer.
Figure 29:
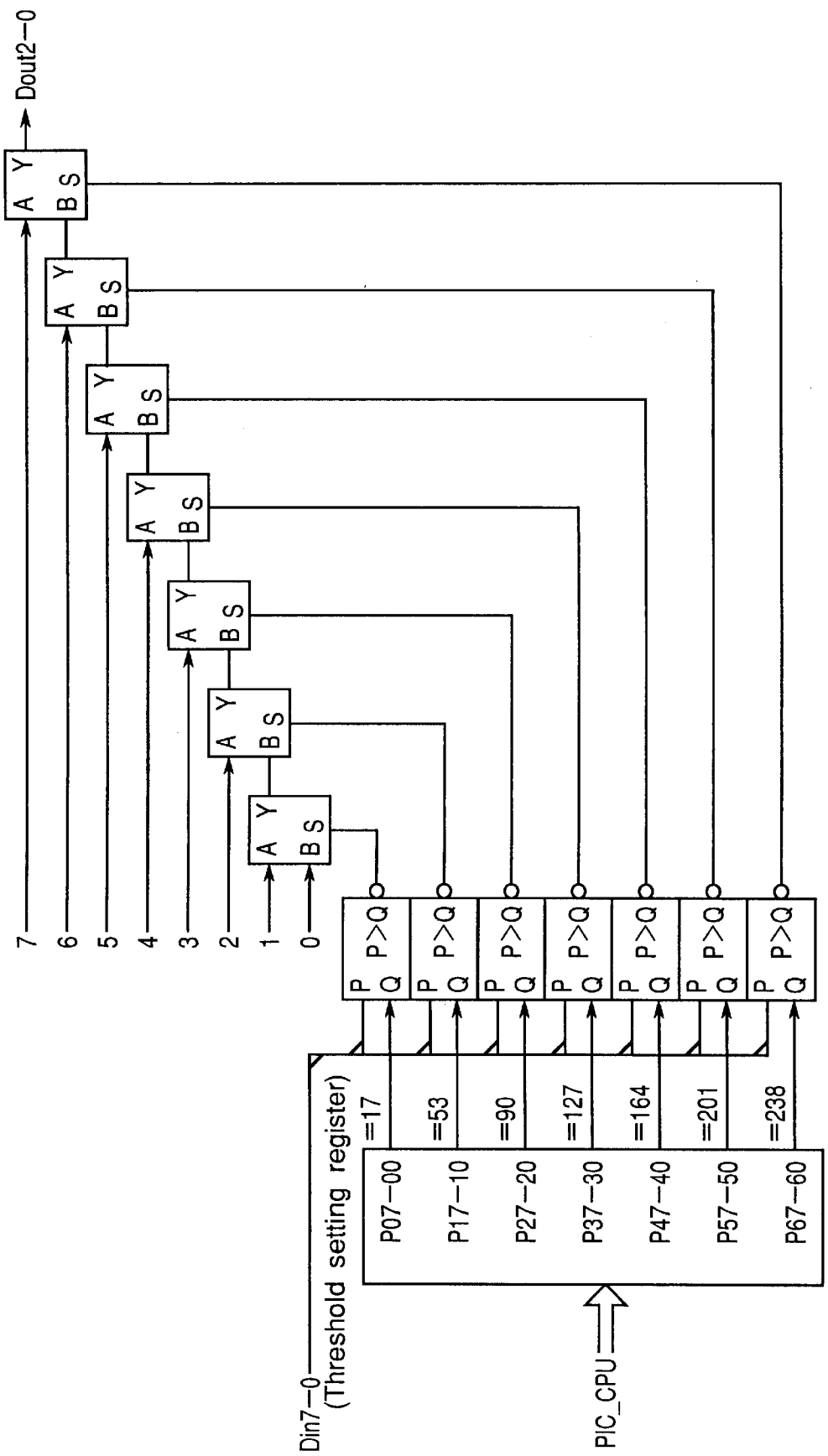
FIG. 29 is a block diagram of a 3-bit encoding.

FIG. 28 is a block diagram of the gradation reproducer 500. Selectors 901 and 902 select a test data for the resist detection or image data from the image reader 200. The selected 8-bit data $ED_{17-10}$ is converted to 8 gradation level data obtained simply by substantially equally dividing 0–255 gradation level range into 7 by a 3-bit encoder 903 (see FIG. 29). That is, the following encoding is performed.

| Input gradation level data | Encoded data |
| --- | --- |
| 0-17 | 0 |
| 18-53 | 1 |
| 54-90 | 2 |
| 91-127 | 3 |
| 128-164 | 4 |
| 165-200 | 5 |
| 201-238 | 6 |
| 239-255 | 7 |

On the other hand, an adder 904 adds $ED_{17-10}$ to feedback error data $ED_{47-40}$ subjected to error diffusion and outputs $ED_{27-20}$. Then, a subtractor 905 subtracts an offset-quantity ($OFFSET_{7-0}=18$) from the data $ED_{27-20}$ obtained by the addition in order to cancel offset error data provided so as not to result in a negative error by an error detection table 906, as described below. The contents of the error detection table 906 are as follows. If Din−18≧239, Dout=(Din−18)−255+18. If 238≧Din−18≧202, Dout=(Din−18)−220+18. If 201≧Din−18≧162, Dout=(Din−18)−183+18. If 164≧Din−18≧128, Dout=(Din−18)−146+18. If 127≧Din−18≧91, Dout−(Din−18)−109+18. If 90≧Din−18 ≧54, Dout=(Din−18)−72+18. If 53≧Din−18≧17, Dout=(Din−18)−35+18. If 16≧Din−18, Dout=(Din−18)+18. Similarly to the value $ED_{57-50}$ obtained by the subtraction, encoding to 3-bit data is performed by a 3-bit encoder 907 for encoding into 8 gradation level data. A selector 908 selects the image data $ED_{72-70}$ after the error diffusion or the image data $ED_{62-60}$ obtained by simply encoding the input image data into 8 gradation level data, in accordance with the gradation reproduction attribute signal.

In synchronization with the image data, the transmitted gradation reproduction attribute signal −LIMOS indicates the character edge if it is "L" level or indicates the continuous gradation level portion (non-edge) if it is "H" level. That is, a character edge is simply encoded into a 3-bit data of 8 gradation levels, while a non-edge is encoded into a 3-bit data with error diffusion. Thus, a character edge does not have the distortion or texture unique to the error diffusion, while a continuous gradation level portion obtains the smooth gradation level reproduction due to the multi-value error diffusion. The 3-bit C, M, Y and K gradation level data after the gradation level reproduction are transmitted to a following drawing position corrector together with the gradation reproduction attribute signal (3-bit data of each color).

Next, an error feedback route for the error diffusion is described. A sum value $ED_{27-20}$ of the feedback error $ED_{47-40}$ and the input image data $ED_{17-10}$ is inputted to the error detection table 906 in order to determine the error data to be added for the subsequent pixel. First, the error detection table 906 subtracts the offset error quantity (=18) from the value. Then, the table 906 determines the gradation level error in the gradation level range coinciding with a threshold level (=1, 7, 53, 90, 127, 164, 201, 236) in the 3-bit encoder. Finally, the table 906 adds the offset value (=18) equivalent to the maximum minus error value so that the error can be integrated with weights at high speed in an error diffusion matrix 911. A series of processing is calculated by means of a lookup table, to output error data $ED_{37-30}$. The contents of the table are downloaded by a central processing unit in the print imaging controller. The contents can be changed in connection with the threshold level of the 3-bit encoding and the gradation level of a gradation level decoder described below. In this embodiment, the error diffusion is accomplished by equally dividing the 0–255 gradation level range into seven. However, the following processing can be also performed. For example, if priority is given to the highlight gradation level, the threshold levels in the 3-bit encoding are set to values more towards zero. In accordance with this setting, the gradation level of the gradation level decoder and the gradation level difference in the error detection table are set by the central processing unit in the print imaging controller to download them. Then, this can realize very flexible gradation level reproduction. This approach permits calculation of a series of processing in the table at high speed.

The output error data $ED_{37-30}$ are subjected to integration with error weights near an objective pixel by the error diffusion matrix 911 by the use of line memories 909 and 910. The feedback error data $ED_{47-40}$ of the subsequent image data is outputted. At a stage in which the data is outputted from the error detection table 906, the error data is offset so that the maximum minus error value (=−18) may be canceled and the error value may be set to zero. Thus, the error diffusion matrix does not need an operation on negative values (or only simple adder circuits are needed). Consequently, the circuit operation is at high speed and its scale can be small.

An error feedback system must be operated at high speed for the following reason. When a transmission rate of the input C, M, Y, K image data is fast, it is necessary to perform error diffusion operation before the subsequent pixel data enters the system.

The drawing position controller 510 in the print imaging controller has the following two functions.

(1) The image is stored in a memory for the time delays caused due to the positions of the photoconductors located along the scan direction. The image is delayed and outputted.

(2) In the control of the main scan position, a start position of the drawing in the main scan direction is controlled, in order to correct an error of a position in the main scan direction of the print head, and the mirror image phenomenon of the C and M data due to the structure of the print head is corrected.

Figure 30A:
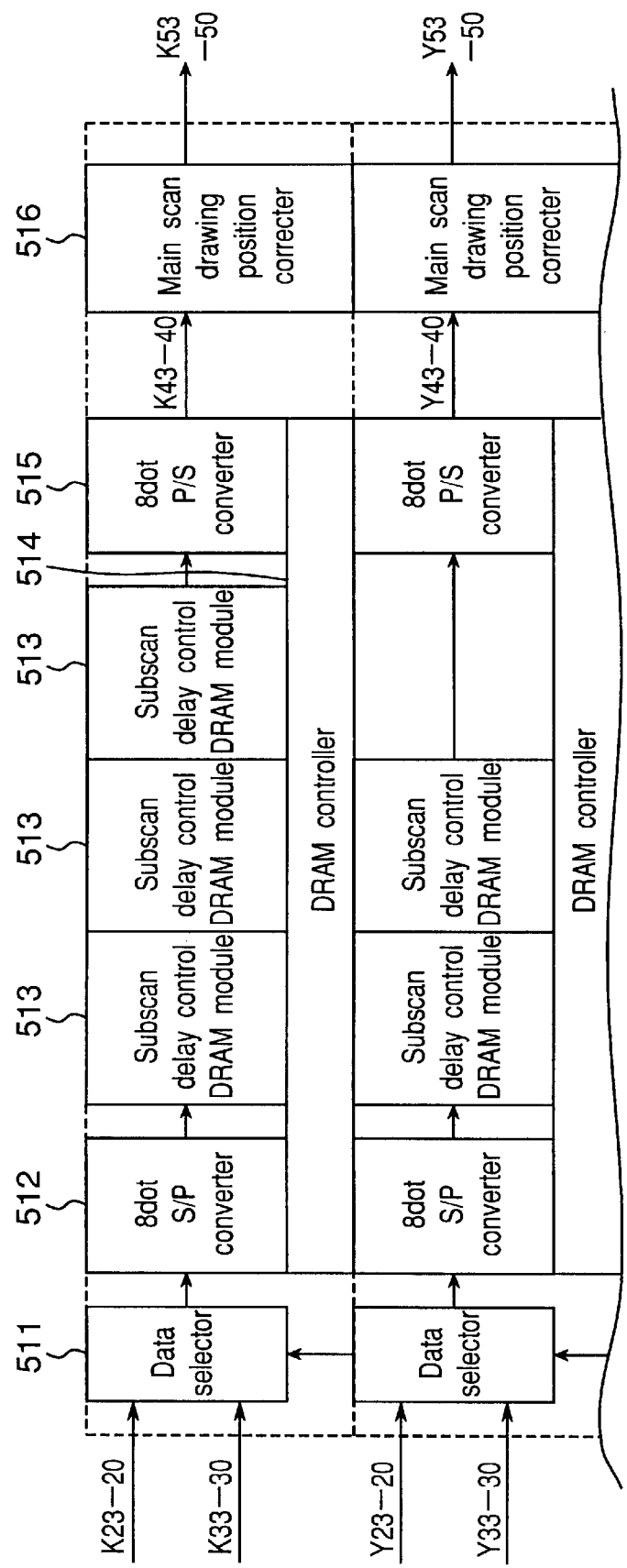
FIGS. 30A and 30B are parts of a block diagram of a subscan drawing position controller.
Figure 30B:
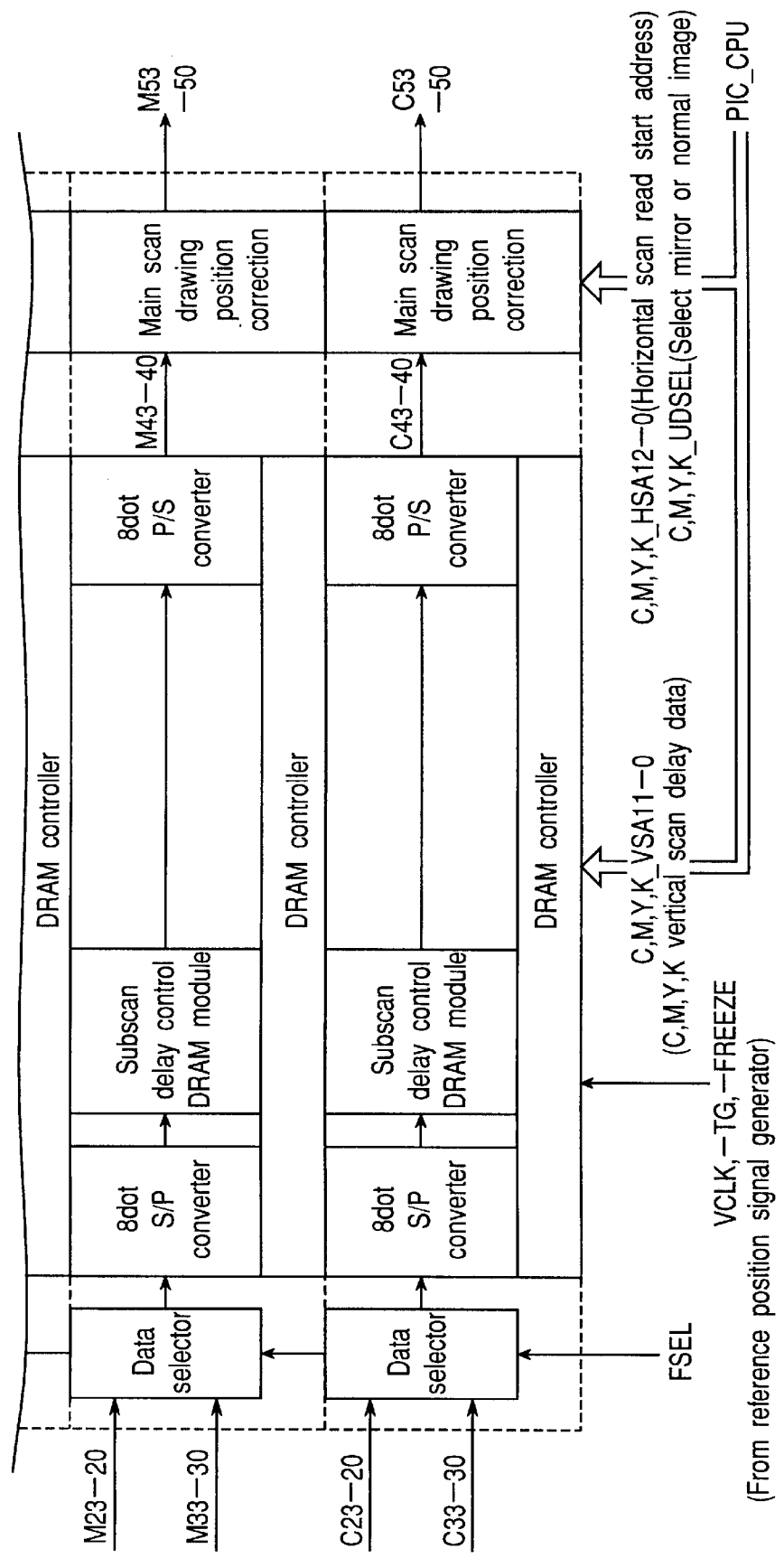

FIGS. 30A and 30B show the drawing position controller 510 for the subscan. Although the same circuits are provided for the four colors C, M, Y and K, these circuits differ in the number of subscan delay control DRAM modules 513. First, a data selector 511 selects either the data C, M, Y and $K_{23-20}$ transmitted from a gradation reproducer 500 or the data C, M, Y and $K_{33-30}$ transmitted from the frame memory 520 according to an FSEL signal set by a reference position signal generator 550. The 4-bit image data of 8 dots in the main scan, selected by the data selector 511 are inputted as one pack of serial data to an 8-dot S/P converter 512. The converter 512 converts the serial data to 32-bit parallel data. In the following DRAM control, the data is thus read from and written to the memory by using eight dots as one cycle.

Figure 30C:
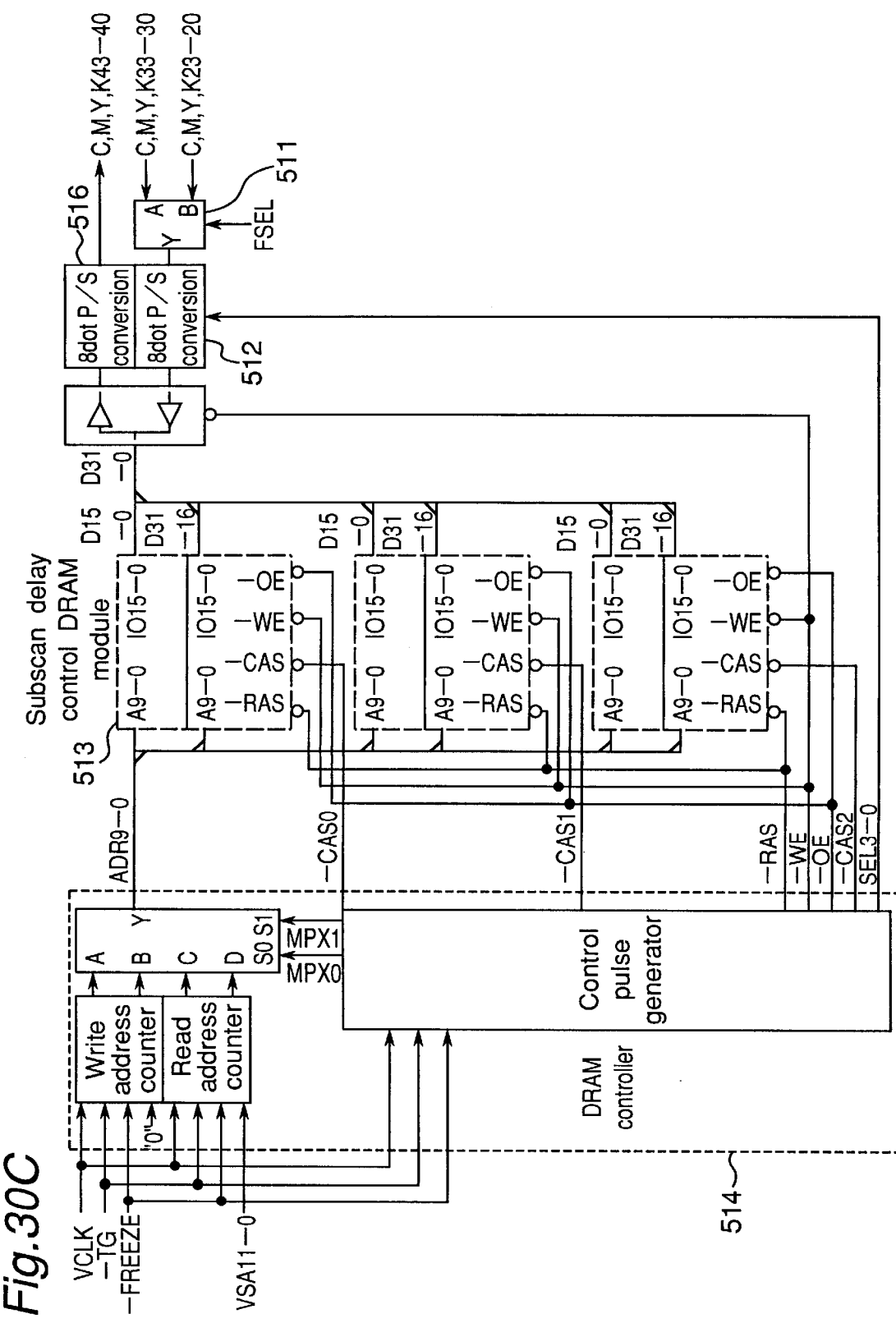
FIG. 30C is a diagram on the subscan drawing position controller.

The subscan delay control DRAM modules 513 (shown in detail in FIG. 30C) perform delay control on the C, M, Y and K data in the subscan direction. The memory is controlled by addresses $ADR_{9-0}$, RAS, $-CAS_{0, 1, 2}$, WE and $-OE$ which are outputted from a DRAM controller 514. The delay quantity of the subscan is determined in accordance with the difference in the count values between a write address counter and a read address counter. That is, the initial value of the write address counter is "0" while the initial value of the read counter is $VSA_{11-0}$ which is set by the central processing unit in the print imaging controller. Thus, the delay quantity of each color corresponds to the $VSA_{11-0}$ lines. The read and write address counters generate the addresses in the main scan and subscan directions. The main scan address is counted by VCLK (image synchronization clock) and reset to the initial value by $-TG$ (main scan synchronization signal). The subscan address is counted with the $-TG$ signal. For the read address, the count value is periodically loaded to $VSA_{11-10}$ set by the central processing unit in the print imaging controller, as described above. For the write address, the count value is loaded to zero. The address to the DRAM modules 513 is selected from these count values by the following address selector in synchronization with the DRAM control operation.

$-FREEZE$ is a signal transmitted from the reference signal generator 550. This signal repeats "L"/"H" line by line when an image is copied on an overhead projector paper or a thick paper. (It is "H" during the normal copy.) For reproducing the image on an overhead projector or a thick paper, it is necessary to reduce a paper feeding speed to ½ of the speed for the normal copy because of thermal conductivity of the fixing unit. In this case, the subscan is operated so that the image is reproduced at 800 dpi. However, the normal 800-dpi operation needs delay memories having a double capacity for each color. The corrector for the subscan distortion also needs first-in first-out buffer memories having a double capacity. In the case of the data of 800 dpi, a double amount of toners adhere to the paper. Thus, it is necessary to insert white data for each line. During the control at half a speed, the following operation is therefore performed in order to inhibit the read/write operation of these subscan delay memories for each line. That is, if $-FREEZE$ "L", a DRAM control signal outputted from a control pulse generator in the DRAM controller 514 becomes inactive. Also, the read and write address counters are stopped so as to prevent the counters from counting the address. Thereby, it is not needed to increase the memory capacity.

Next, an 8-dot P/S converter 515 converts the 32-bit parallel image data for 8 dots outputted from the subscan delay control DRAM modules 513 into the original serial data C, M, Y and $K_{43-40}$. Then, the converter 515 outputs the serial data.

Figure 31:
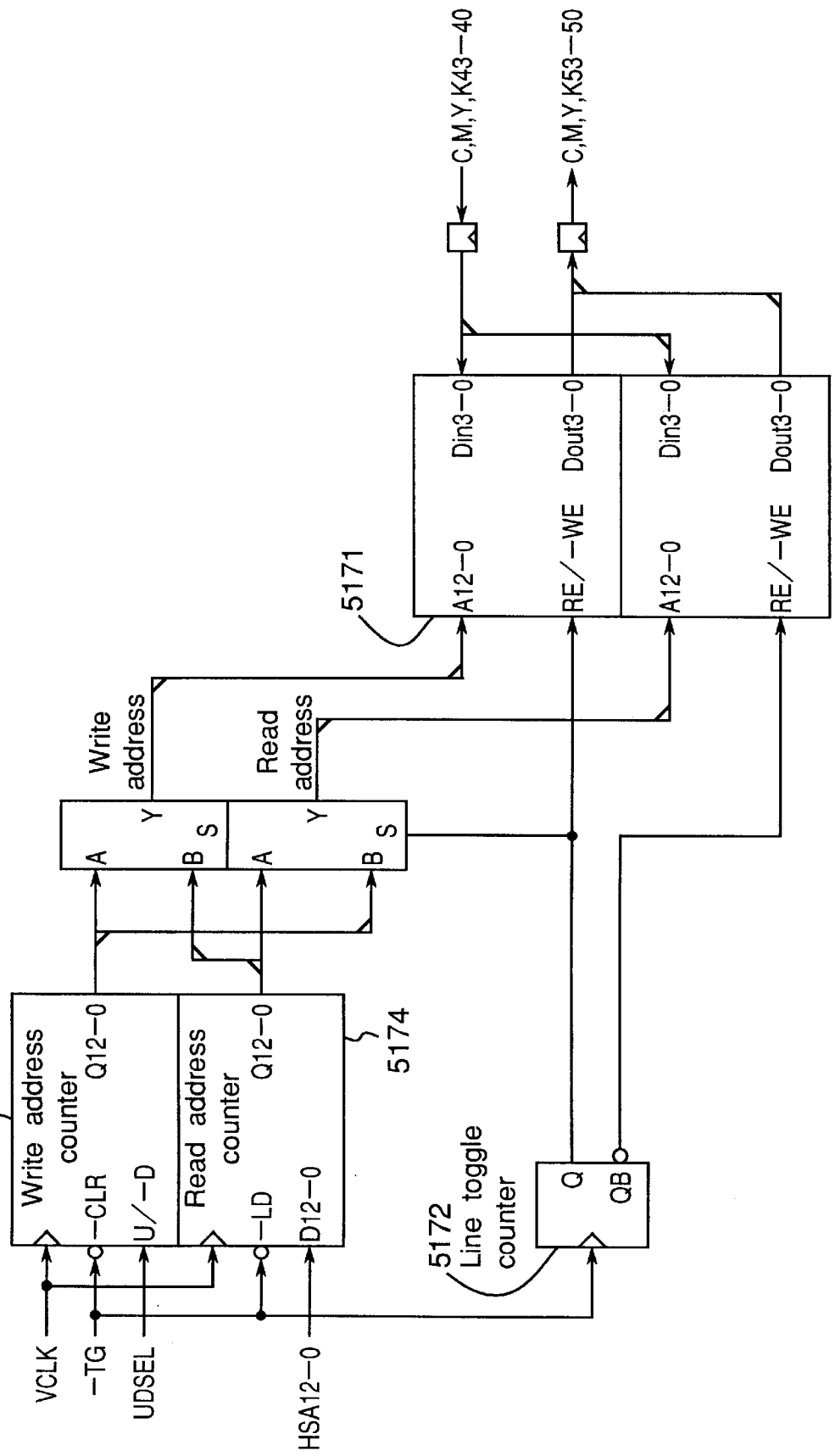
FIG. 31 is a block diagram of a main scan drawing position corrector.

FIG. 31 shows a main scan drawing position corrector 516. The data C, M, Y and $K_{43-40}$ transmitted from the subscan drawing position controller is inputted to the main scan drawing position corrector 516. After the main scan drawing position correction and the mirror image processing of the necessary data, the data C, M, Y and $K_{53-50}$ is outputted to the image distortion corrector 540. A main scan drawing position memory 5161 comprises two memories, connected in parallel, which can store the data of one line in the main scan. The write and read operations are alternately switched for the memory by a line toggle counter 5162.

For both the write and read addresses for the main scan drawing position memory 5161, the image synchronization clock VCLK is counted by counters 5163 and 5164, thereby generating a main scan address. In order to set the address counters 5163 and 5164 to an initial value at the start of the main scan, the following operation is performed. The main scan synchronous signal ($-TG$) is reset or inputted as a load signal. The write count value is reset to "0", and the read count value is loaded to $HSA_{12-0}$ set by the central processing unit in the print imaging controller. Because the laser scan raster direction of the C and M data is opposite to that of the reference color signal K data, the write address counters 5163 are allowed to count down from the initial value "0".

Thus, a normal image control is performed by UDSEL for the Y and K signals="H". A mirror image control is performed by UDSEL for the C and M signals="L". $HSA_{12-0}$ set to the read address as the load value by the central processing unit in the print imaging controller, indicates a position at which the drawing is started in the main scan direction. Thus, this value permits controlling the main scan drawing start position for each color. The K image data sets drawing positions for the main scan and for the subscan so that the image is drawn on appropriate drawing positions on a paper fed onto the transfer belt 304. The other data C, M and Y set the drawing position relative to the K image data.

Figure 32A:
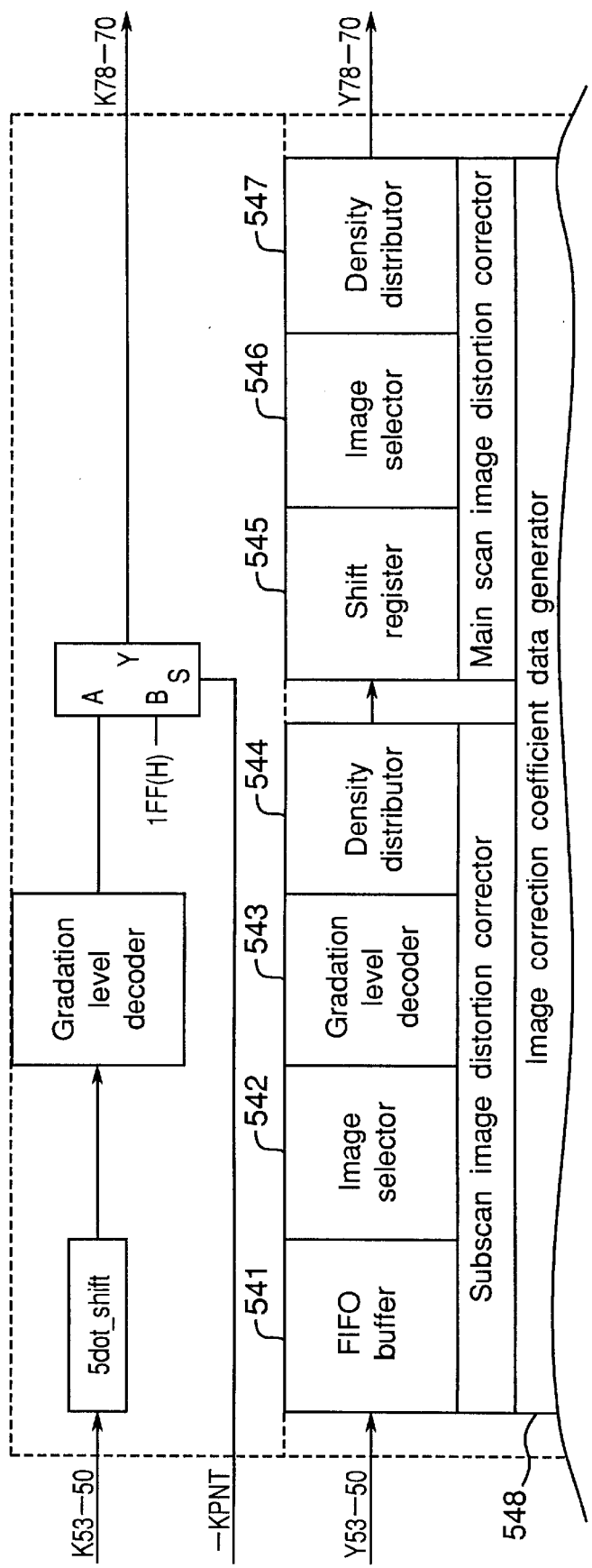
FIGS. 32A and 32B are parts of a block diagram of an image distortion corrector.
Figure 32B:
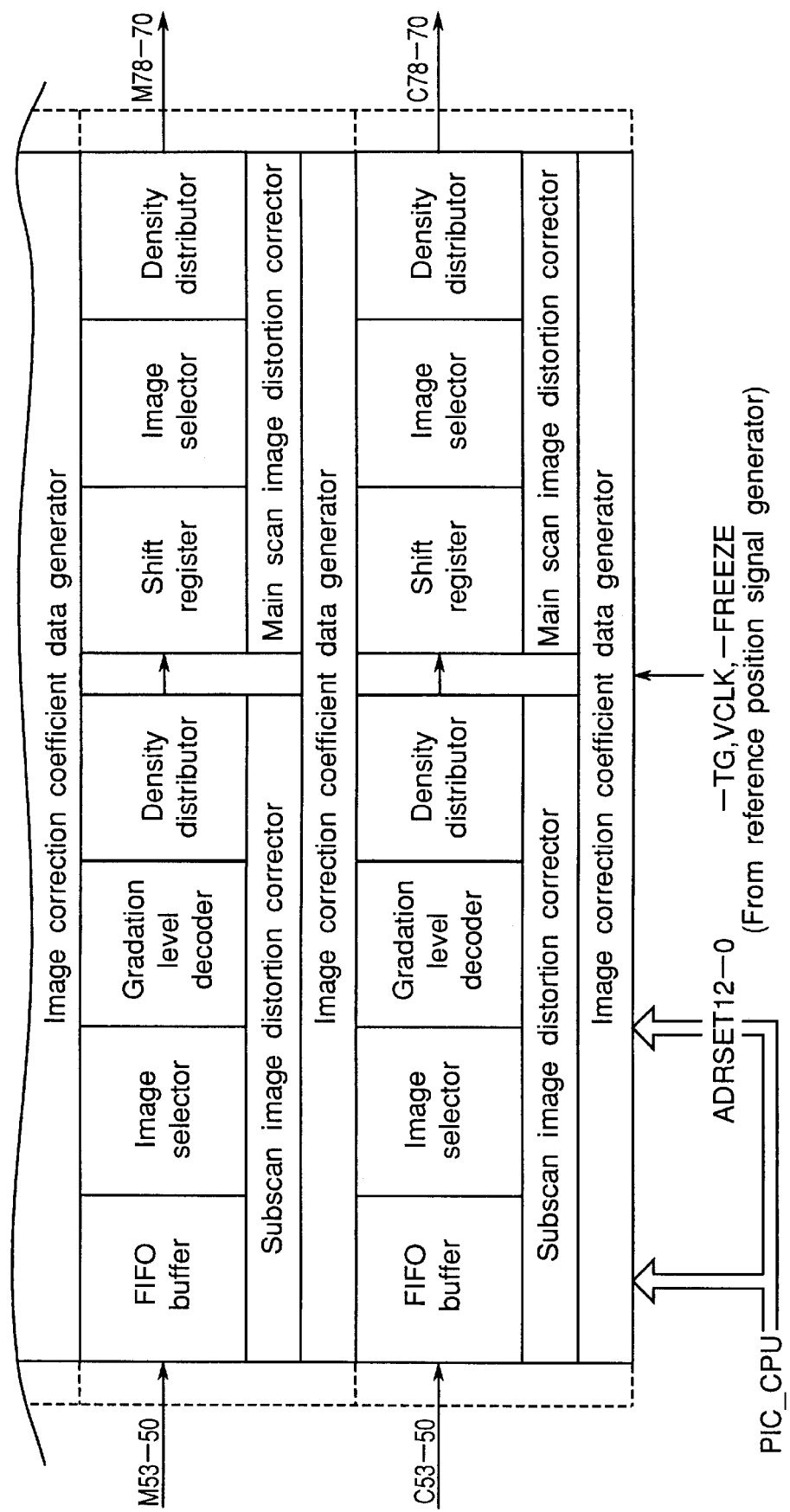

FIGS. 32A and 32B show the image distortion corrector 540 which corrects the image distortion in the main scan and subscan directions for the 4-bit data C, M, Y and $K_{53-50}$ transmitted from the drawing position controller 510. The corrector 540 outputs 9-bit data C, M, Y and $K_{78-70}$ to the print head controller. The image distortion corrector 540 has the following two functions.

(1) A memory device stores data as to a number of lines corresponding to the maximum width of the distortion (bow and skew distortions) of the image on the transfer belt 304 in the subscan direction, the distortions being caused due to the relative shift of the laser exposure position on each color photoconductor. The distortion along the subscan direction is interpolated and outputted.

(2) A flip-flop circuit stores the data as to the number of dots corresponding to the maximum width of the distortion (main scan magnification distortion) of the image on the transfer belt 304 in the main scan direction, the distortion being caused due to the relative shift of the laser exposure position on each color photoconductor. The distortion along the main scan direction is interpolated and outputted.

The black data is used as the reference of the above-described image distortion correction. In order to correct the relative distortion of the other three colors C, M and Y, the image distortion correction is not performed for the black data $K_{53-50}$. Meanwhile, for the other data C, M and $Y_{53-50}$, the correction data is generated and the distortion is interpolated for each color so that the C, M and Y correspond with the distortion of the black data. The same circuits are provided for three colors C, M and Y.

Figure 33A:
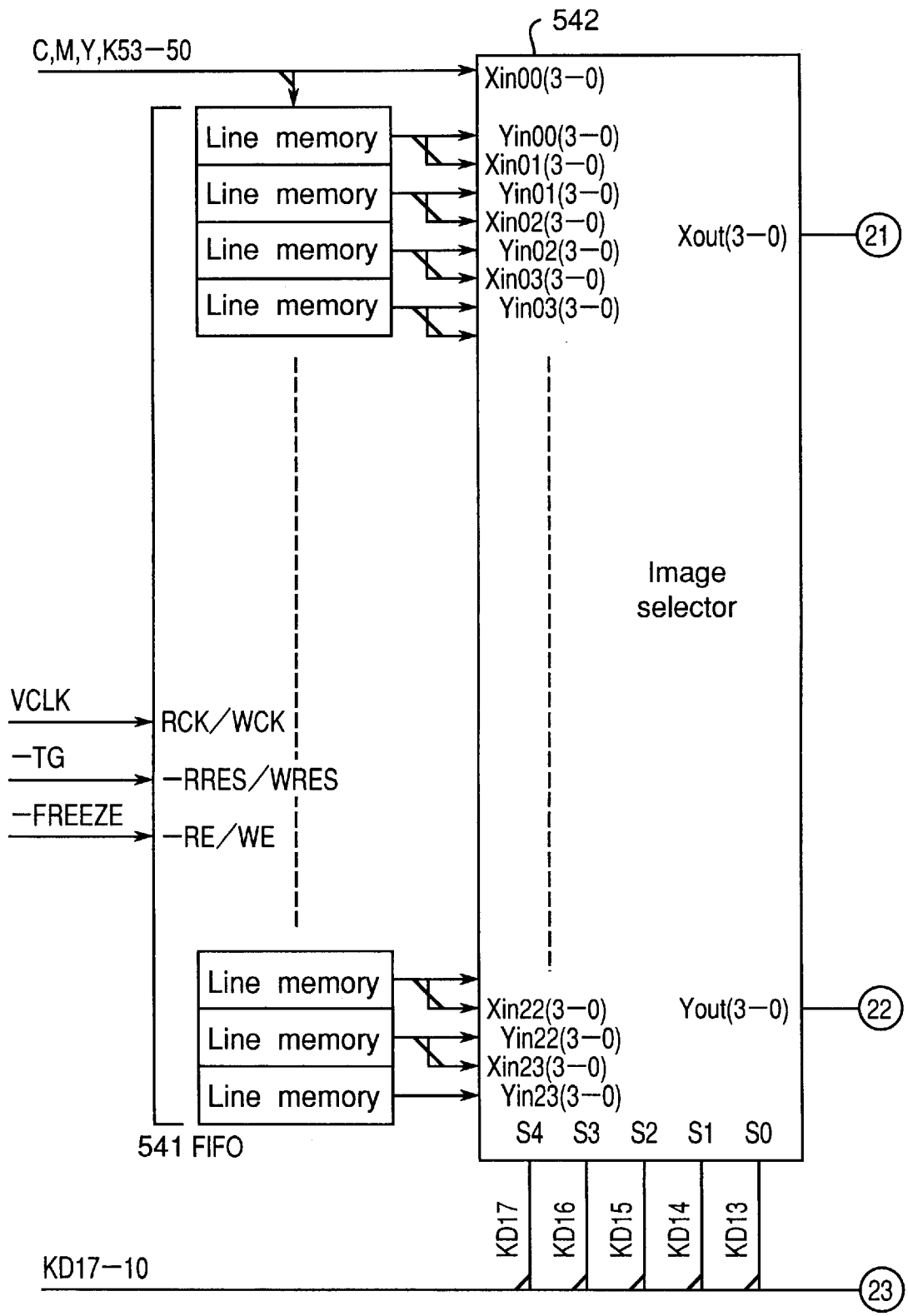
FIGS. 33A and 33B are parts of a block diagram of a subscan image distortion correction.
Figure 33B:
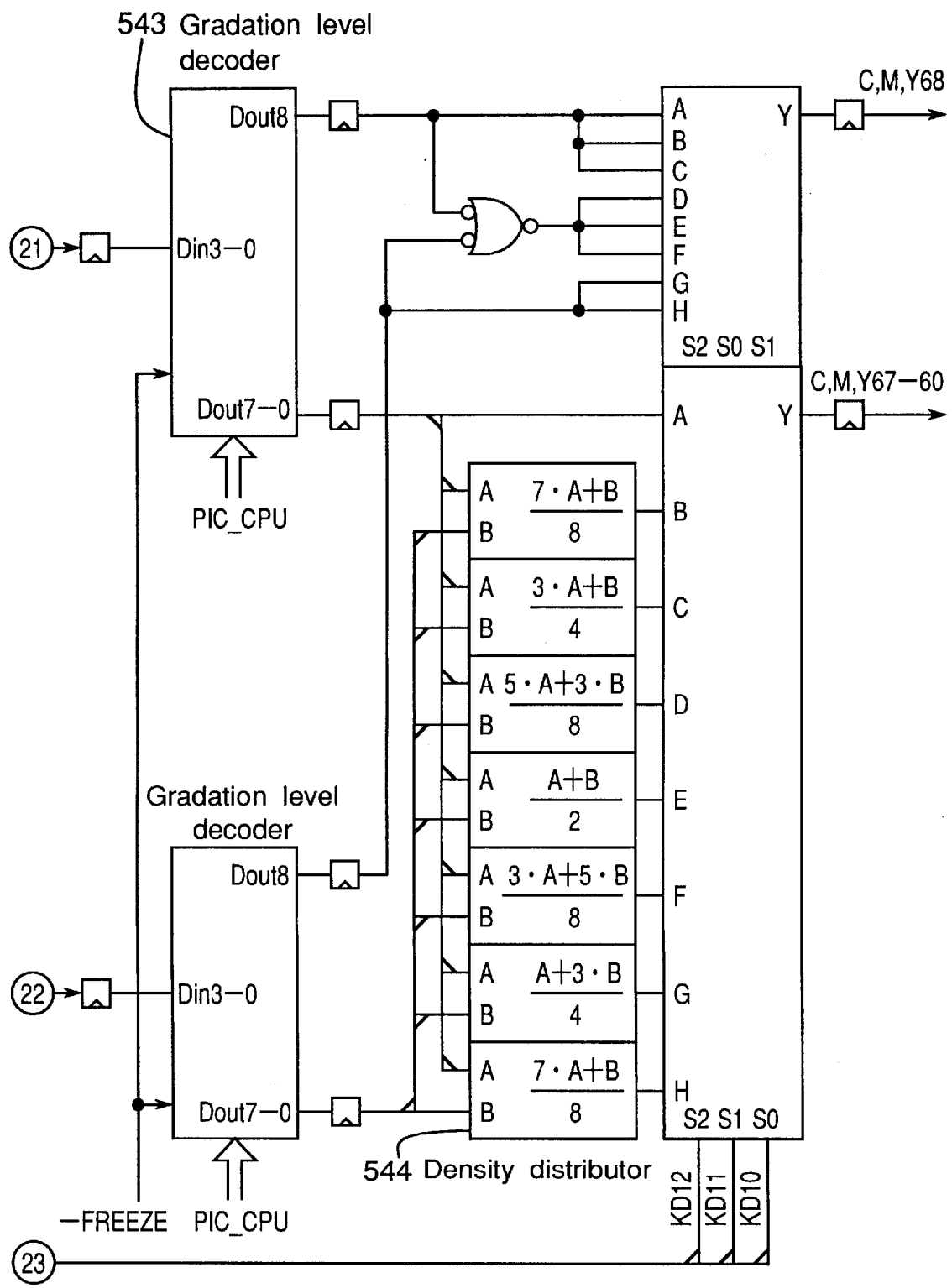

As shown in FIGS. 33A and 33B, in the subscan image distortion correction, the data is first transmitted to a first-in first-out (FIFO) buffer memory 541 capable of storing the data corresponding to the maximum distortion width (24 lines). The FIFO buffer memory 541 stores 24 lines of the image data C, M, Y and $K_{53-50}$ continuously transmitted for each line. A read/write clock of the FIFO buffer memory 541 is VCLK. The address is reset by the –TG signal. The FIFO buffer memory 541 comprises line memories connected dependently, so that the data is sequentially delayed line by line. If –FREEZE="H", the operation is performed in the same manner as the operation for stopping the read/write of the subscan delay control DRAM. That is, the –FREEZE signal makes RE/–WE signal enable, and the operation is stopped for each line, thereby performing the half speed control for the 800-dpi operation.

The delay data of each FIFO buffer memory is inputted in parallel to an image selector 542. In order that the following density distributor is easily operated, the data of two adjacent lines is outputted in parallel from data of 24 lines*4 bits supplied from the FIFO buffer memory 541 in accordance with a select control terminal $S_{4-0}$. That is, when $Xout_{3-0}$ selects n-th line delay data, $Yout_{3-0}$ outputs (n+1)-th line delay data. The signal to be selectively outputted to $Xout_{3-0}$ is selected from $Xin00_{3-0}$ to $Xin23_{3-0}$. The signal is determined by a 5-bit signal of a subscan interpolation data $KD_{17-13}$.

Figure 34:
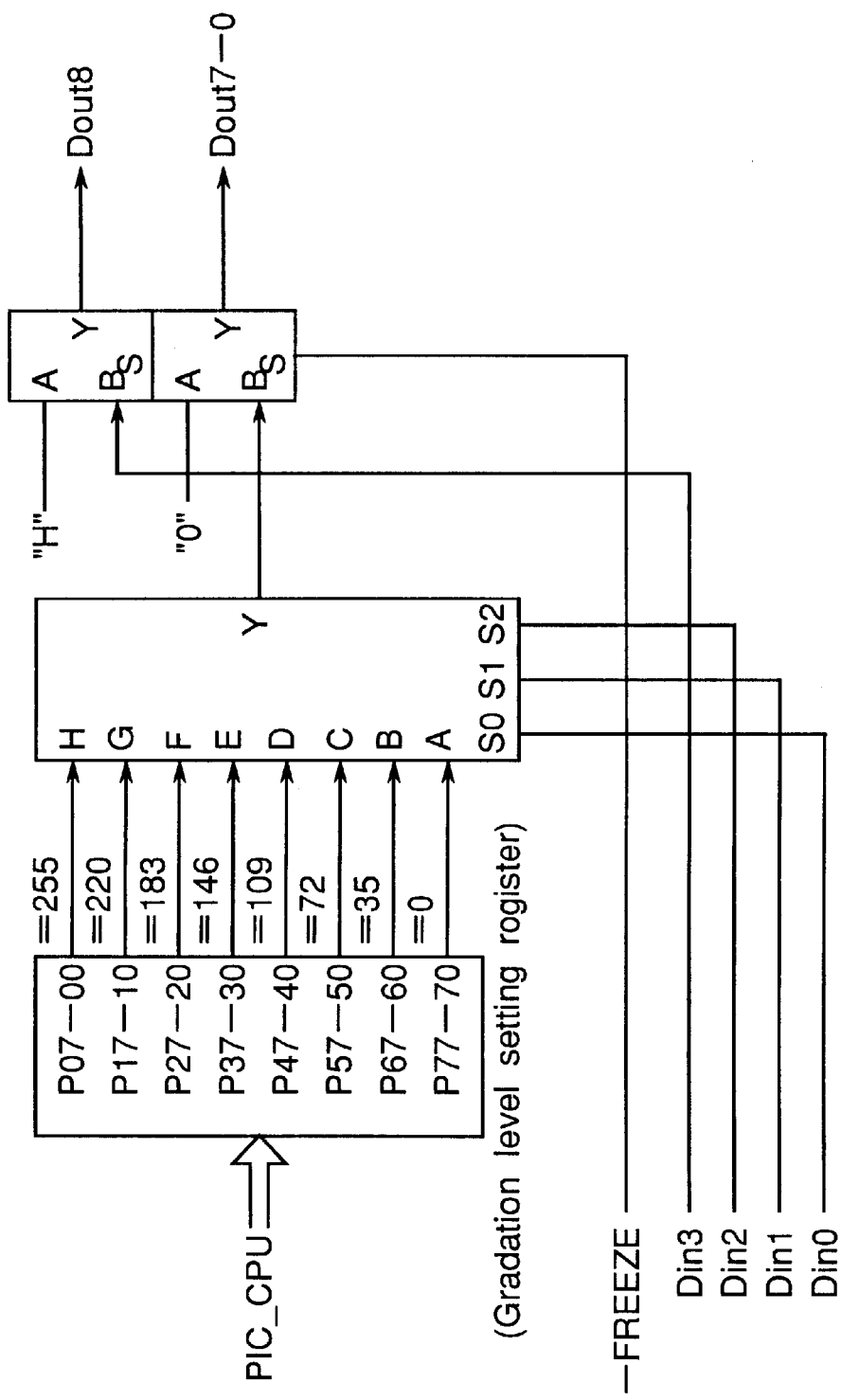
FIG. 34 is a block diagram of a gradation level decoder.

A gradation level decoder 543 (shown in detail in FIG. 34) converts or decodes bits 2-0 of $Din_{3-0}$ of input gradation level code to the gradation level corresponding to the threshold level for the 3-bit encoder in the gradation reproducer. That is, the code is changed in the following manner.

| Input code ($Din_{2-0}$) |  | Gradation level ($Dout_{7-0}$) |
| --- | --- | --- |
| 0 | → | 0 |
| 1 | → | 35 |
| 2 | → | 72 |
| 3 | → | 109 |
| 4 | → | 146 |
| 5 | → | 183 |
| 6 | → | 220 |
| 7 | → | 255 |

$Doubt_8$ the gradation reproduction attribute signal of each color, and it is passed though as $Dout_3$.

If –FREEZE signal="L", the data is replaced by white ("00") for each line so that the amount of toner adhesion is equivalent to that of toner adhesion for the normal 400-dpi operation.

A density distributor 544 performs interpolation of density distribution for each ⅛ dot by using the data of two adjacent lines. That is, assuming that A is n-th line gradation level data and B is (n+1)-th line gradation level data, the interpolation is as follows.

| $KD_{12-10} = 0$ | → | $Y = A$ |
| $KD_{12-10} = 1$ | → | $Y = (7A + B)/8$ |

-continued

Figure 7:
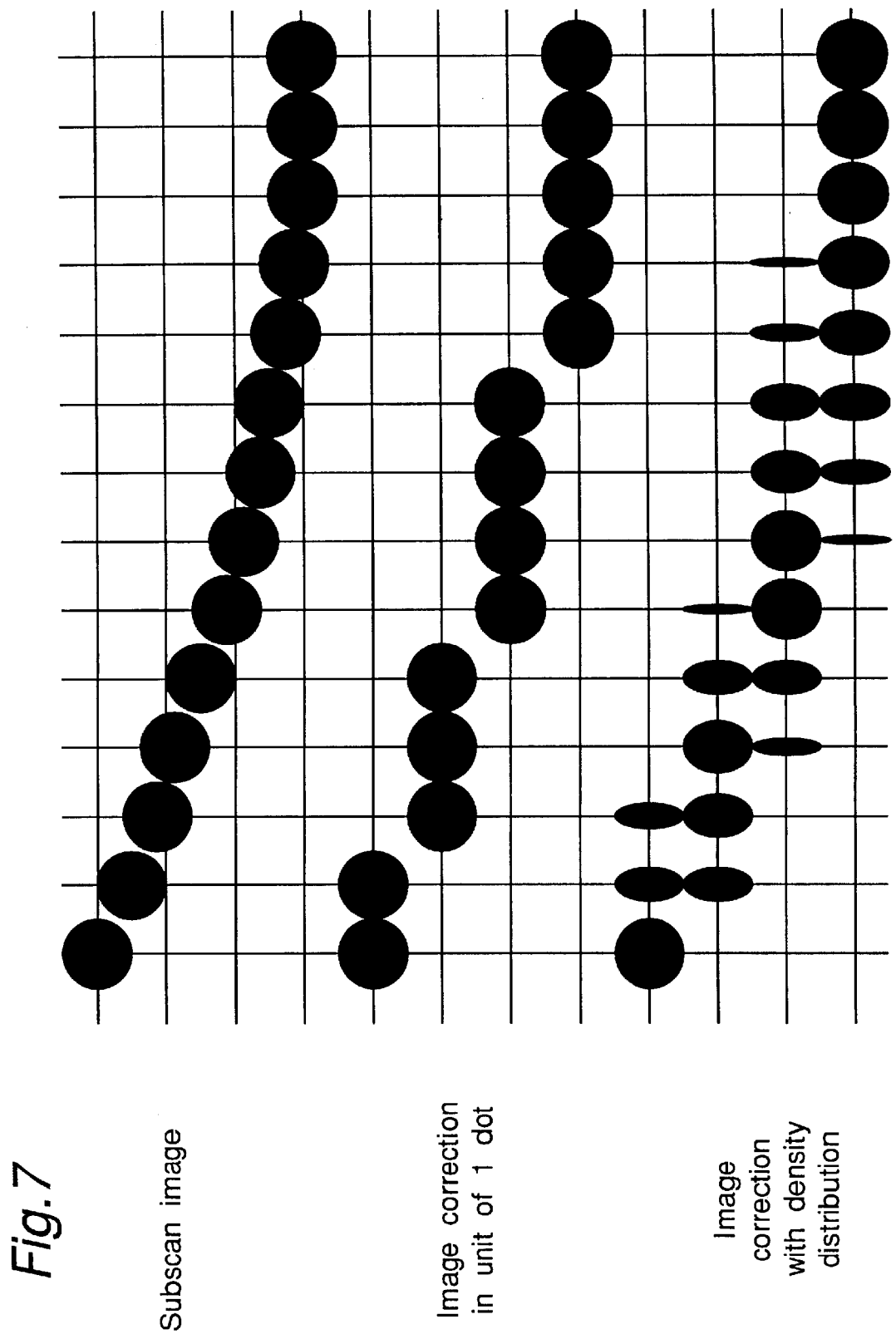
FIG. 7 is a diagram of an example of an image correction by a gradation level distribution.

| $KD_{12-10} = 2$ | → | $Y = (3A + B)/4$ |
| $KD_{12-10} = 3$ | → | $Y = (5A + 3B)/8$ |
| $KD_{12-10} = 4$ | → | $Y = (A + B)/2$ |
| $KD_{12-10} = 5$ | → | $Y = (3A + 5B)/8$ |
| $KD_{12-10} = 6$ | → | $Y = (A + 3B)/4$ |
| $KD_{12-10} = 7$ | → | $Y = (A + 7B)/8$ | mixture ratio of inputs A:B with respect to output Y is changed in accordance with the subscan interpolation data. Assuming that a correction quantity due to the distortion is q lines, the interpolation data $KD_{17-10}$ is 8*q. Thus, the distortion corrector 540 can correct the distortion with high accuracy at every ⅛ dot within the width of 24 lines. That is, the gradation reproducer 500 reduces a memory capacity of the delay memory needed for the subscan drawing position control to ½ (this is similar for an FIFO buffer memory in the image distortion corrector) by encoding the data into the 4-bit data, while maintaining the 8-bit image quality. In an interpolator which does not need a large memory capacity, the gradation level is decoded to the 8-bit data so that the interpolation can be performed with high accuracy, thereby distributing the density. FIG. 7 shows an example of the image distortion correction using the density distribution for the subscan.

After the density distribution for the subscan, the data is outputted as C, M and $Y_{67-60}$ to the image distortion corrector for the main scan.

On the other hand, bit 8 indicating the gradation reproduction attribute in the density distributor is processed by using the data of two adjacent lines similarly. Now assuming that the attribute signal of n-th line is A and the attribute signal of (n+1)-th line is B, the processing is as follows.

$KD_{12-10} = 0 \rightarrow Y = A$ $KD_{12-10} = 1 \rightarrow Y = A$ $KD_{12-10} = 2 \rightarrow Y = A$ $KD_{12-10} = 3 \rightarrow Y = An \text{ or } B$ (edge if A or B is an edge)

$KD_{12-10} = 4 \rightarrow Y = A \text{ or } B$ $KD_{12-10} = 5 \rightarrow Y = A \text{ or } B$ $KD_{12-10} = 6 \rightarrow Y = B$ $KD_{12-10} = 7 \rightarrow Y = B$ When the amount of shift of the line from the reference position (K data) is small (within ±2/8 line), the edge attribute data of a nearby line is used. When the amount of shift of the line from the reference position is large (±3/8 or ±4/8 line), a reference is made to an OR of both the edge information (priority is given to the edge). The data, which is selected and judged as the edge, is then outputted as C, M and $Y_{6-8}$ to the main scan image distortion corrector.

Figure 35A:
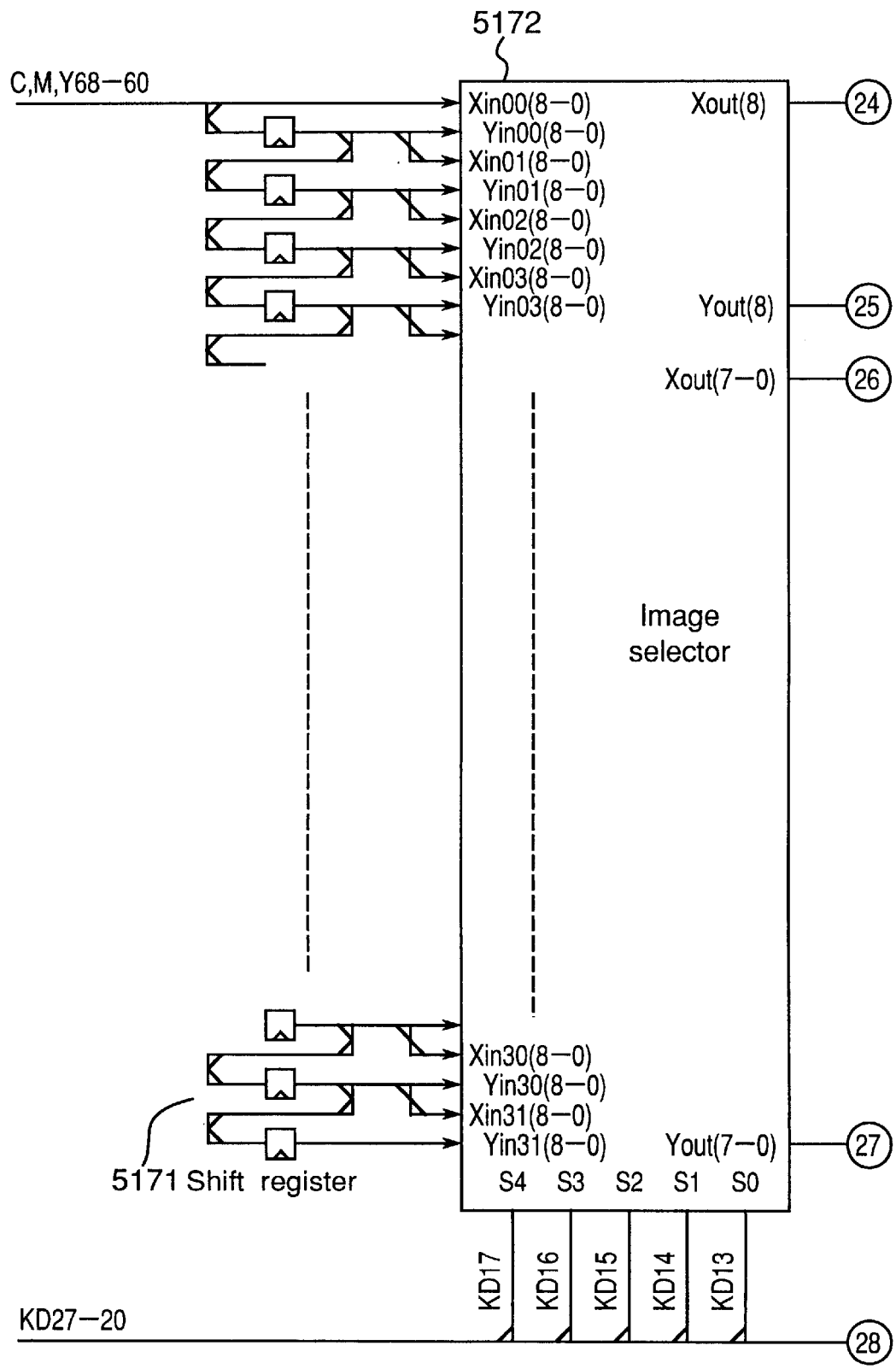
FIGS. 35A and 35B are parts of a block diagram of a main scan image distortion corrector.
Figure 35B:
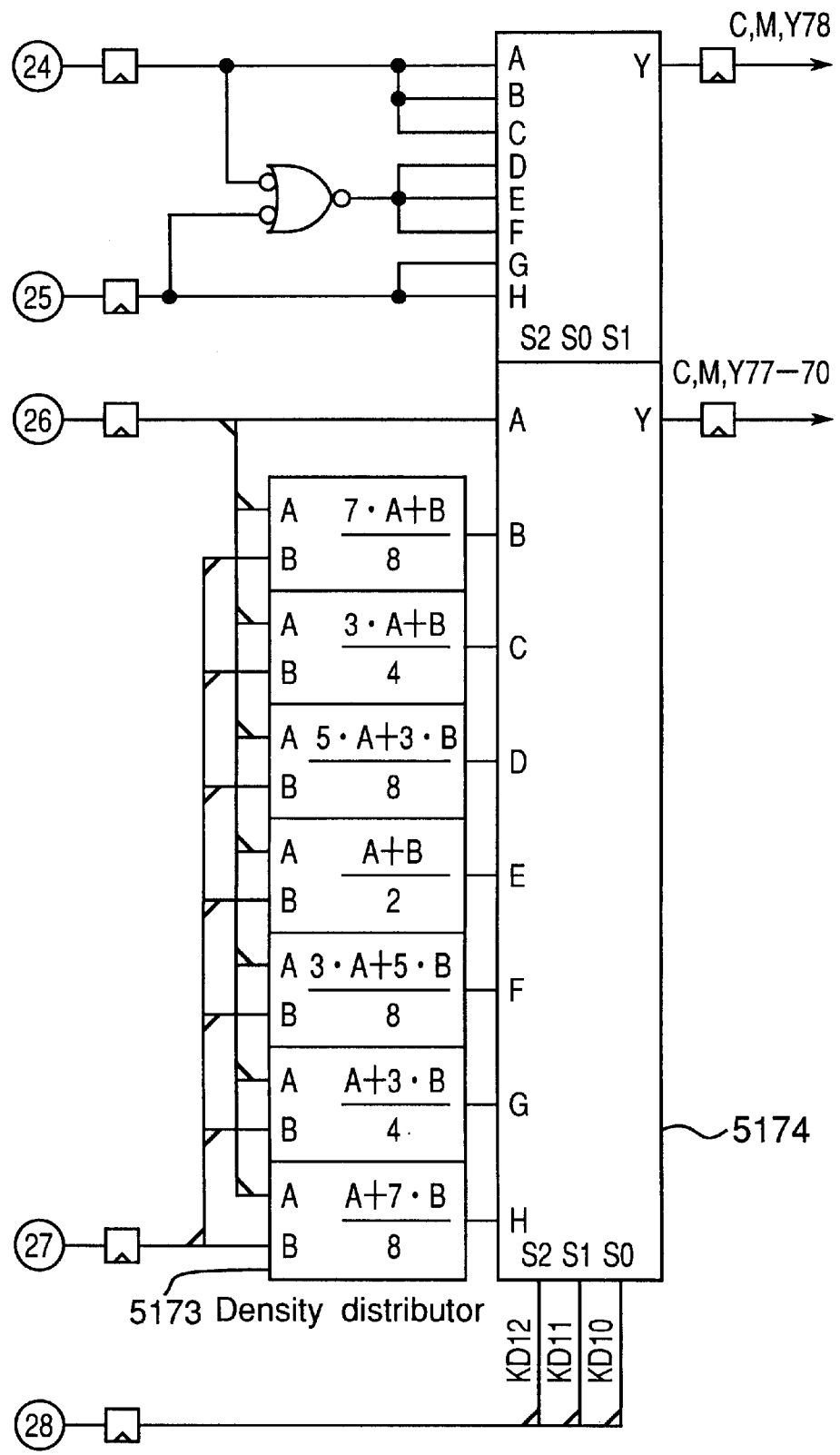

As shown in FIGS. 35A and 35B, a main scan image distortion corrector 516 performs interpolation as in the case of the subscan distortion correction. Differently from the subscan, a shift register 5171 using flip-flop circuits is used in order to generate continuous delay data along the main scan direction instead of the FIFO buffer memory. In this case, the width of the maximum distortion correction is constituted so that 9-bit data can be delayed by 32 dots. An image selector 5172 selects the data of two adjacent dots in parallel. Since the value is already decoded to gradation level, a decoder is not needed. A density distributor 5173 processes the data between two adjacent dots. The density distribution and the selection of the image of two adjacent lines are accomplished in accordance with the main scan interpolation data $KD_{27\text{-}20}$.

Figure 36:
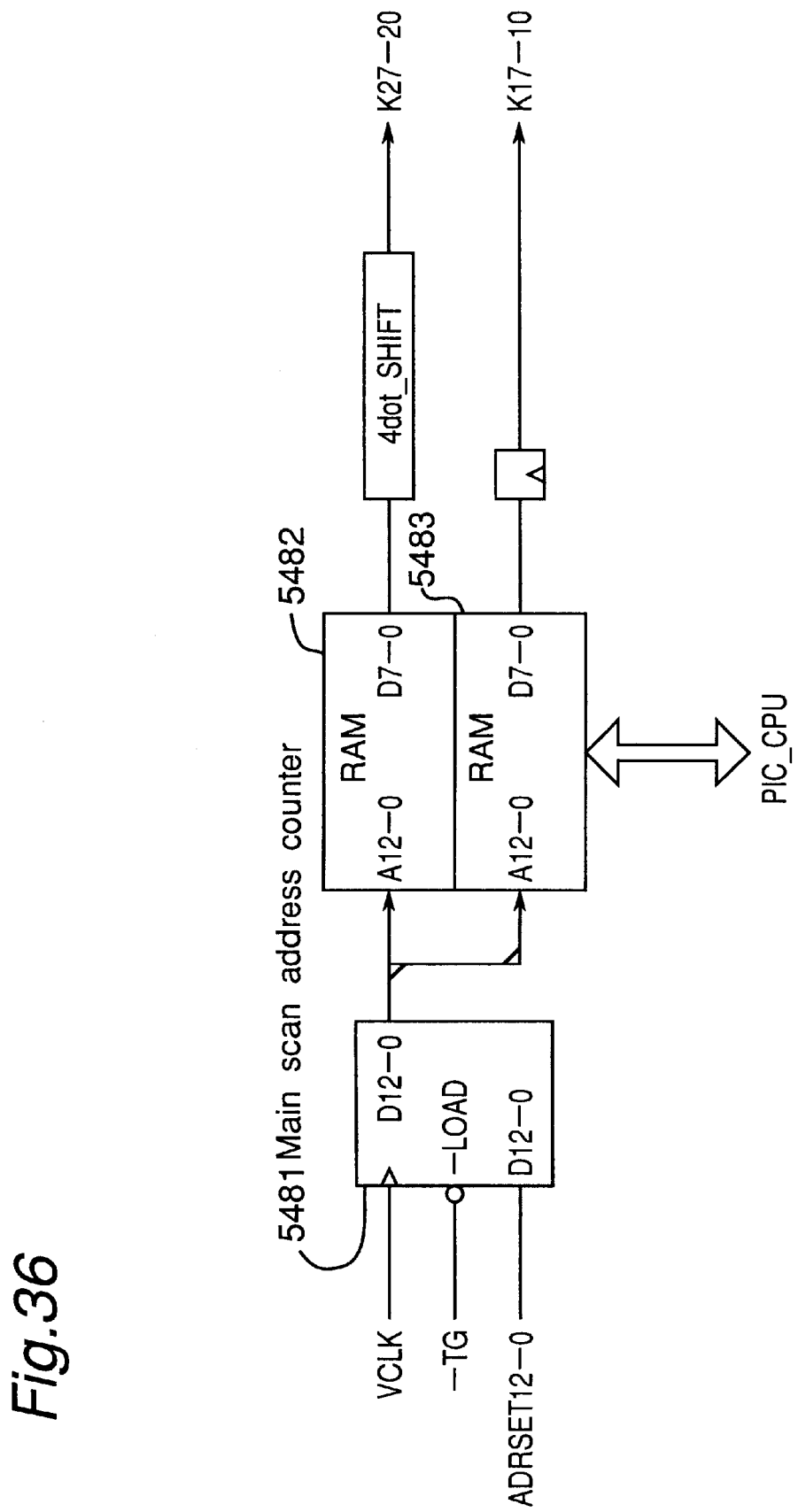
FIG. 36 is a block diagram of an image distortion coefficient data generator.

An image distortion correction coefficient data generator 548 shown in FIG. 36 generates a correction data for correcting the image distortion along the main scan and subscan directions by using a main scan address counter 5481 and two types of line memories 5482 and 5483 for the correction. The data on the amount of correction of the image distortion along the main scan and subscan directions to be corrected is continuously changed depending on the main scan position (address). Accordingly, the central processing unit of the print imaging controller expands continuous correction distribution data of one line in accordance with the amount of shift of the C, M and Y images from the K image obtained by the resist sensor. Then, the amount of correction is created for each main scan pixel.

As described above, the K image is the reference image data for the C, M and Y images. In order to form an image on the transfer belt 304 on a proper position on the paper, the vertical and main scan positions of the K data are determined by the delay memory devices and by the main scan drawing position controller respectively, in the drawing position controller 510. However, three resist sensors along the main scan direction are not arranged at the proper positions on the transfer belt 304 along the main scan direction, i.e., the sensors are not arranged at the same positions for each machine. Therefore, the relative relationship is not fixed between the sensor detection position and the address on two types of line memories (main scan and subscan image distortion correction RAMs 5482 and 5483) for expanding the correction coefficient. Thus it is necessary to shift the distribution of the correction data in accordance with the sensor position obtained from the K resist image. The central processing unit in the print imaging controller changes the data expanded in the memory as to the distortion correction quantity in accordance with the sensor detection position.

A position at which a main scan address counter 5481 starts reading can be changed by $ADRSET_{12\text{-}0}$ (common to C, M and Y) set by the central processing unit in the print imaging controller. This counter counts VCLK, and the count value is loaded to $ADRSET_{12\text{-}0}$, by the –TG signal. The change in this value is controlled in the following reason.

Figure 37:
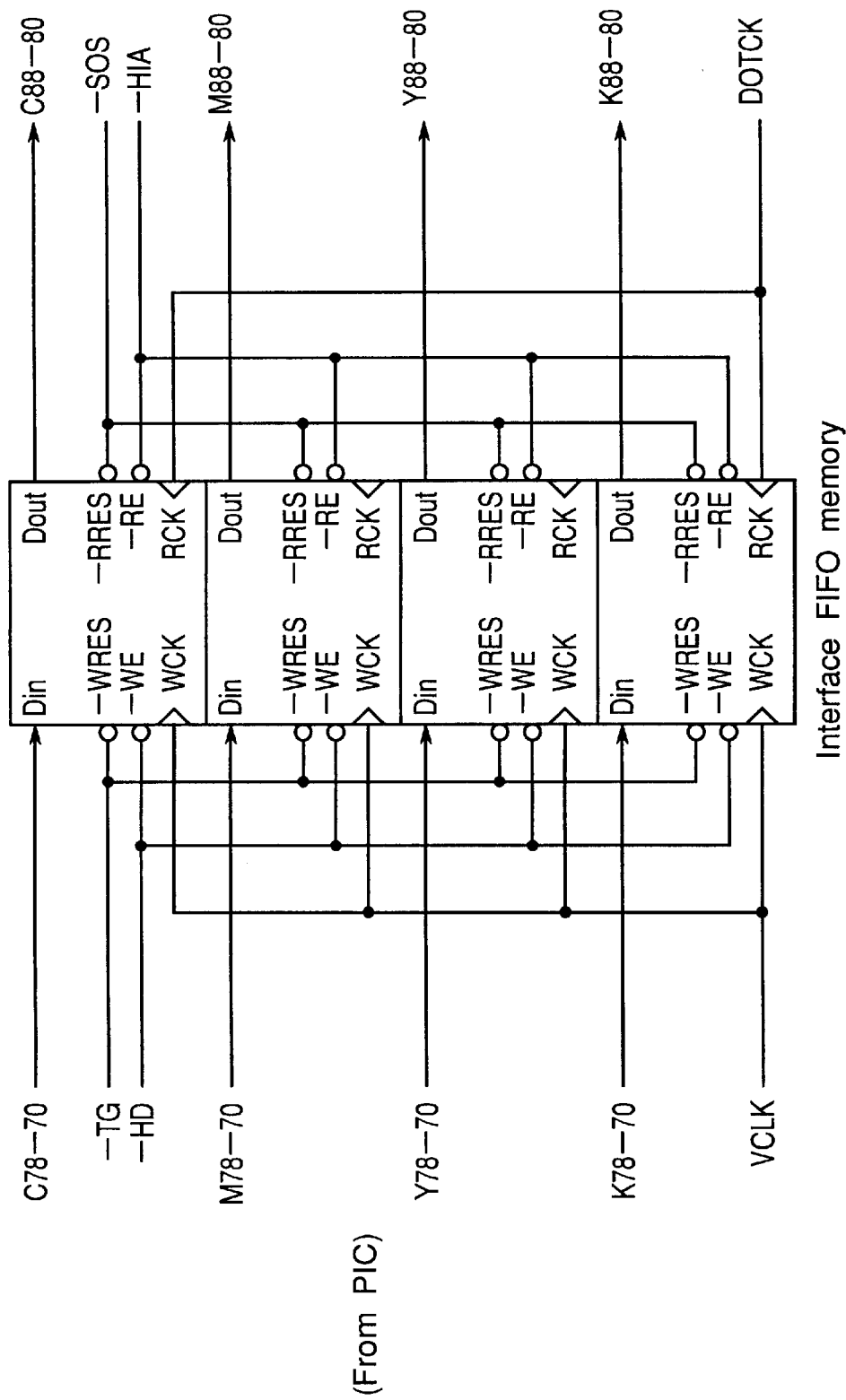
FIG. 37 is a diagram of an interface between the print image controller and the print head controller.
Figure 38:
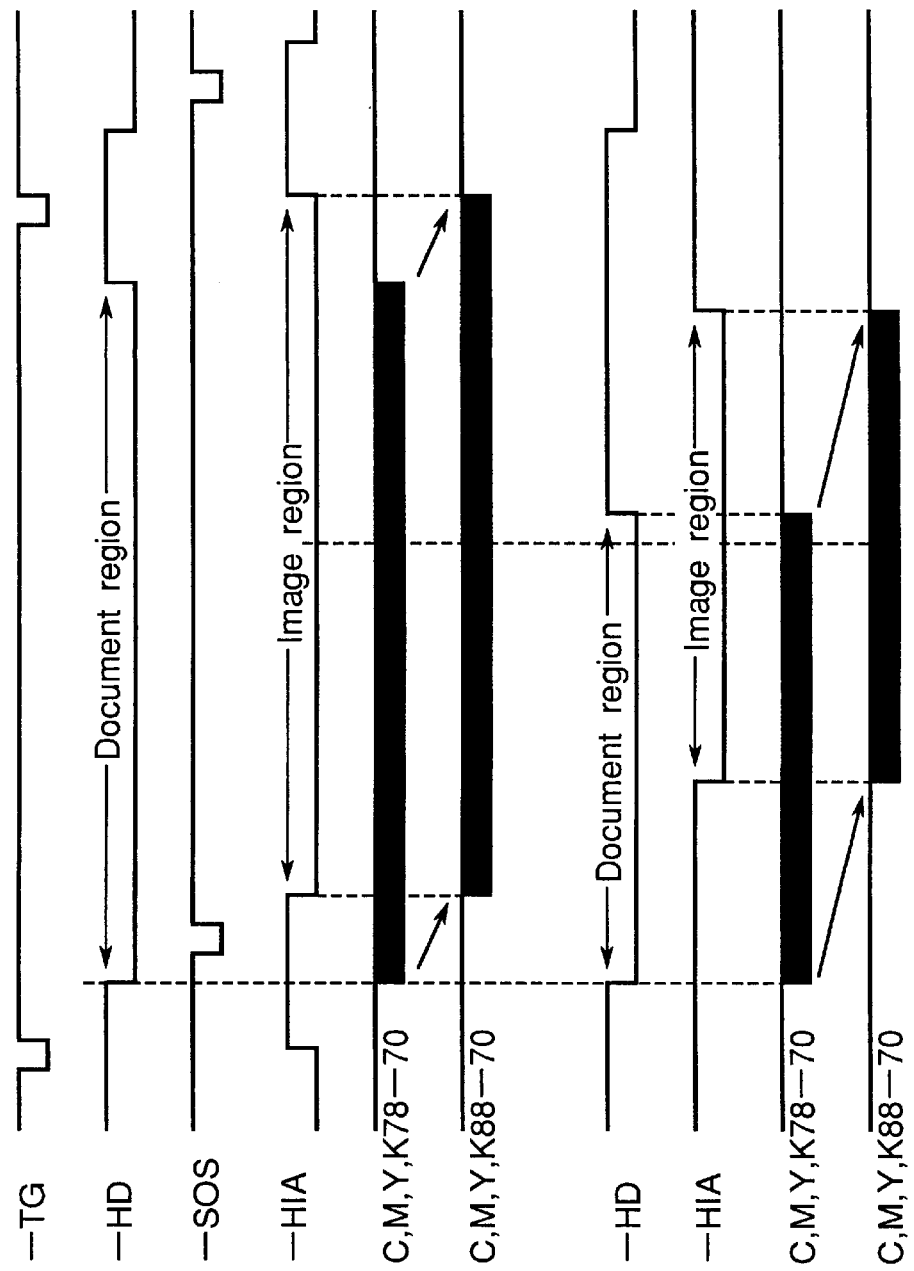
FIG. 38 is a timing chart of data transmission from the print image controller to the print head controller.

When data is transmitted from the print image controller to the print head controller, an image of the image reader 200 always has a reference position at one side because a document is put on the platen glass plate with reference to the end of the platen glass plate for the main scan. However, the image of the image forming section 300 has a reference at the center so that a paper is fed on the basis of the center position of a polygon motor (or the center of the transfer belt). Thus, as shown in FIG. 37, an interface between the print image controller and the print head controller comprises an interface FIFO memory. The image outputted from the print image controller is transmitted to the print head controller by converting the one-side-based image into the center-based image. FIG. 38 shows the timing chart for this processing. The main scan reference signal –TG of the image reader is used as an address write reset –WRES for the interface, and a main scan enable region signal –HD is used as a write enable (–WE), thereby controlling the write to the interface FIFO memory device. Signal –SOS is a scan start signal for the laser diode which is generated for each line according to the rotation of the polygon, and –HIA is a main scan drawing area signal used as a read enable signal –RE so as to control the read from the interface FIFO memory. Since both of –TG and –SOS are the main scan reference signals, they have the same cycle. Signal –TG is used as the reference of the read of the CCD sensor, and signal –SOS is used as the reference of the write of the laser scan. The signal –HD can be changed on the basis of the signal –TG in accordance with the range of from one side to the image read area. The signal –HIA can be changed on the basis of the center position of the signal –SOS in accordance with the width of the main scan of a paper to be fed.

An address of the memory device for expanding the image distortion correction data is generated on the basis of signal –TG. For the data generation, it is necessary to change the position for expanding the correction data, in accordance with the size of a paper to be fed, because the data is guided by detecting the resist pattern on the transfer belt 304, as described below. However, much time is wasted because the distortion correction data is expanded in the correction memory after the paper size is determined. Therefore, the load value of the main scan address generator is changed in accordance with –HIA changed with the paper and the start position from the –SOS signal, whereby the main scan position of the distortion correction coefficient is adjusted.

After the correction of the image distortion, the K data is selected as data (1FF(h)) of uniform black in the interface with the print head controller before it is written to the FIFO memory. This means that the bill recognizer 415 in the image processor of the image reader judges whether or not the document on the platen glass plate is a bill. If the document is judged as a bill, the whole surface of the image is painted with black data so as to avoid a normal copy. In a conventional full color copying machine in which an image is scanned four times, a bill is recognized when the C, M and Y images are formed before the black image is formed, and the image is painted in black when the K image is formed. On the other hand, the color copying machine like the present system for simultaneously copying four colors by one scan needs to judge whether or not a document should be painted in black while scanning the image while scan is performed. However, it is necessary for the bill recognition to select some extent of the document region any time and to perform pattern matching with a certain reference pattern in order to judge whether or not the document is a bill. Thus, some time is required for the determination of the image reading position during the scan. Sometimes, the image reading position is not yet determined at the time of the image forming (or the bill recognizer 415 judges the document as a bill after the image of the bill is formed on a paper). Thus, the painting is controlled after the subscan drawing position is controlled. Thereby, the K image is delayed and controlled for at least the time corresponding to the distance between the photoconductors. A normal copy operation can be inhibited if the bill recognition is only completed for the time between the scan start and the forming of the K image on the photoconductor.

The C, M, Y and K images, C, M, Y and $K_{78\text{-}70}$, which have been subjected to the image distortion correction in the main scan and subscan directions, are transmitted to the interface (FIG. 37) between the print imaging controller and the print head controller. The drawing position is shifted with reference to the paper. The data are transmitted to the print head controller shown in FIG. 8. The data are optically modulated and exposed on each color photoconductor, whereby an image is formed.

Figure 39:
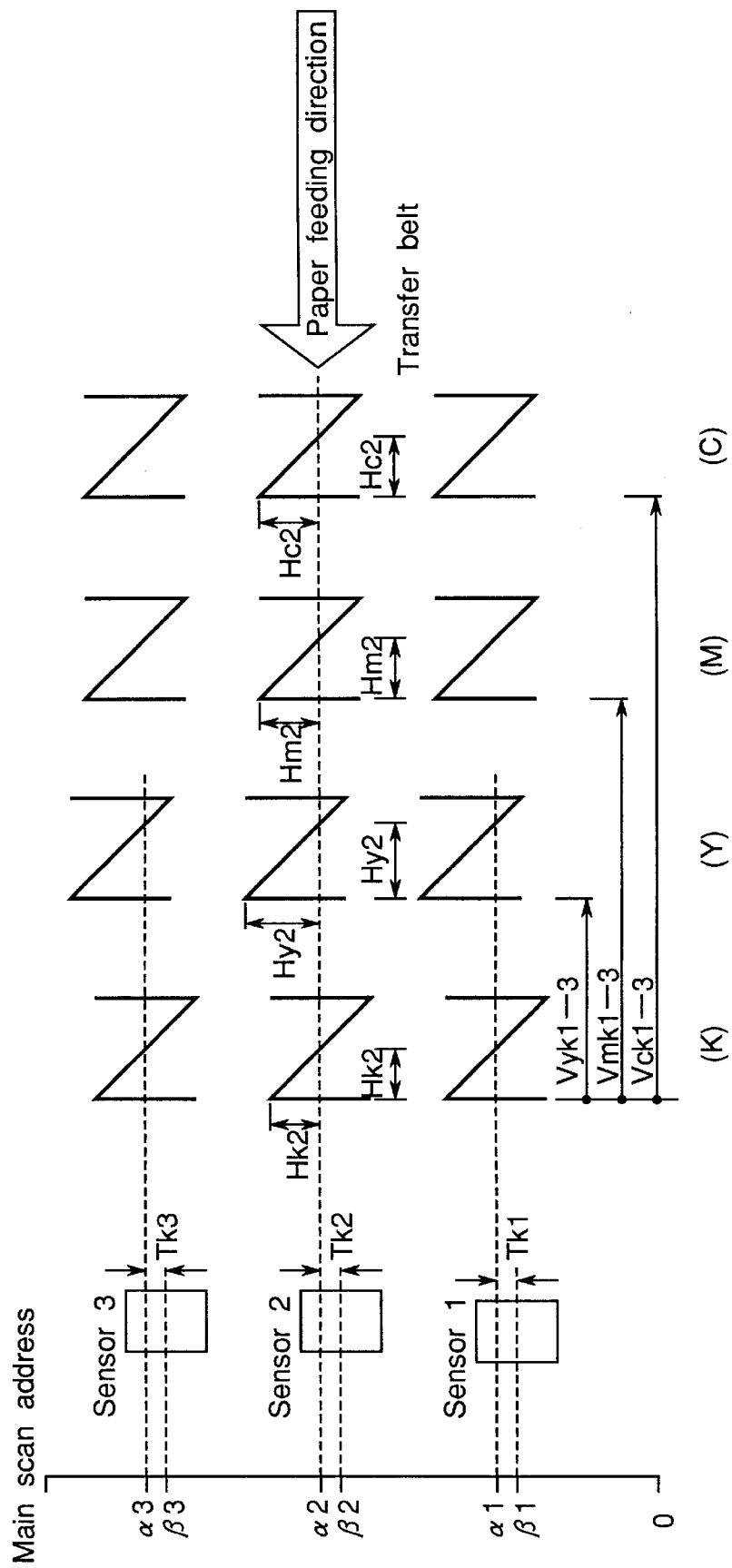
FIG. 39 is a diagram of a resist detecting pattern.

Next, it is described how the amount of shift from the resist sensor is feed-backed. FIG. 39 shows a resist detecting pattern. The resist detecting pattern is generated by the test data generator 530. This pattern is selected as an image data by the gradation reproducer 500. Three Z-shaped data are generated along the main scan direction in each of the C, M, Y and K resist patterns.

The print image controller controls the drawing under the following conditions.

(1) As the amount of subscan delay C, M, Y, $K\_VSA_{11-0}$ of each color for controlling the subscan drawing position, are set to have the same control value for all the C, M, Y and K data.

(2) As the main scan drawing start position, C, M, Y, $K\_HSA_{12-0}$, of each color for controlling the main scan drawing position, all of C, M, Y, BK have a control value so that the K image is drawn on the proper position on the transfer belt.

(3) The mirror image processing is performed for C and M in (2).

(4) The image distortion correction values for both of main scan and subscan are set to zero (all the data $KD_{17-10}$ and $KD_{27-20}$ are 0).

The color shift data transmitted from the resist sensors to the central processing unit in the print imaging controller are the amounts ($Vck_{1-3}$, $Hck_{1-3}$, $Vmk_{1-3}$, $Hmk_{1-3}$, $Vyk_{1-3}$, $Hyk_{1-3}$ of main scan and subscan color shift of each sensor relative to K, and the amount $Tk_{1-3}$ of position shift of each sensor calculated from the K image. Thus, the amounts $Vvk_{1-3}$, $Vmk_{1-3}$, $Vck_{1-3}$ of color shift of C, M and Y relative to K are substantially the same as the distances between the photoconductors for the colors.

The amounts Vyk, Vmk, Vck of subscan shift are calculated in accordance with the difference in the time when each color Z pattern passes on the sensor for the first time. An oblique line of the Z-shaped pattern tilts at 45°. Thus, the lateral (main scan) shift of the position can be calculated by knowing the time when a horizontal line and the oblique line pass on the sensor. The amount $Hck_{1-3}$, $Hmk_{1-3}$, $Hyk_{1-3}$ of main scan color shift of each color from K are determined from the difference between the amount $Hk_{1-3}$ of position shift of K and the amounts $Hc_{1-3}$, $Hm_{1-3}$, $Hy_{1-3}$ of position shift of the colors. The position $\alpha a_{1-3}$, which the each sensor is attached at, can be calculated from a predetermined value $\beta_{1-3}$ of a print address of the Z pattern and the amount $Hk_{1-3}$ of main scan color shift of K. In the correction of the subscan direction, a delay control quantity $VSA_{12-0}$ of the subscan drawing position control of each of C, M, Y and K is determined in the following manner. Assuming that $K\_VSA_{11-0}$ is Q1, $Y\_VSA_{11-0} = Q1 - (Vyk_1 + Vyk_2 + Vyk_3)/3 - 12$, $M\_VSA_{11-0} = Q1 - (Vmk_1 + Vmk_2 + Vmk_3)/3 - 12$ and $C\_VSA_{11-0} = Q1 - (Vck_1 + Vck_2 + Vck_3)/3 - 12$.

Figure 40:
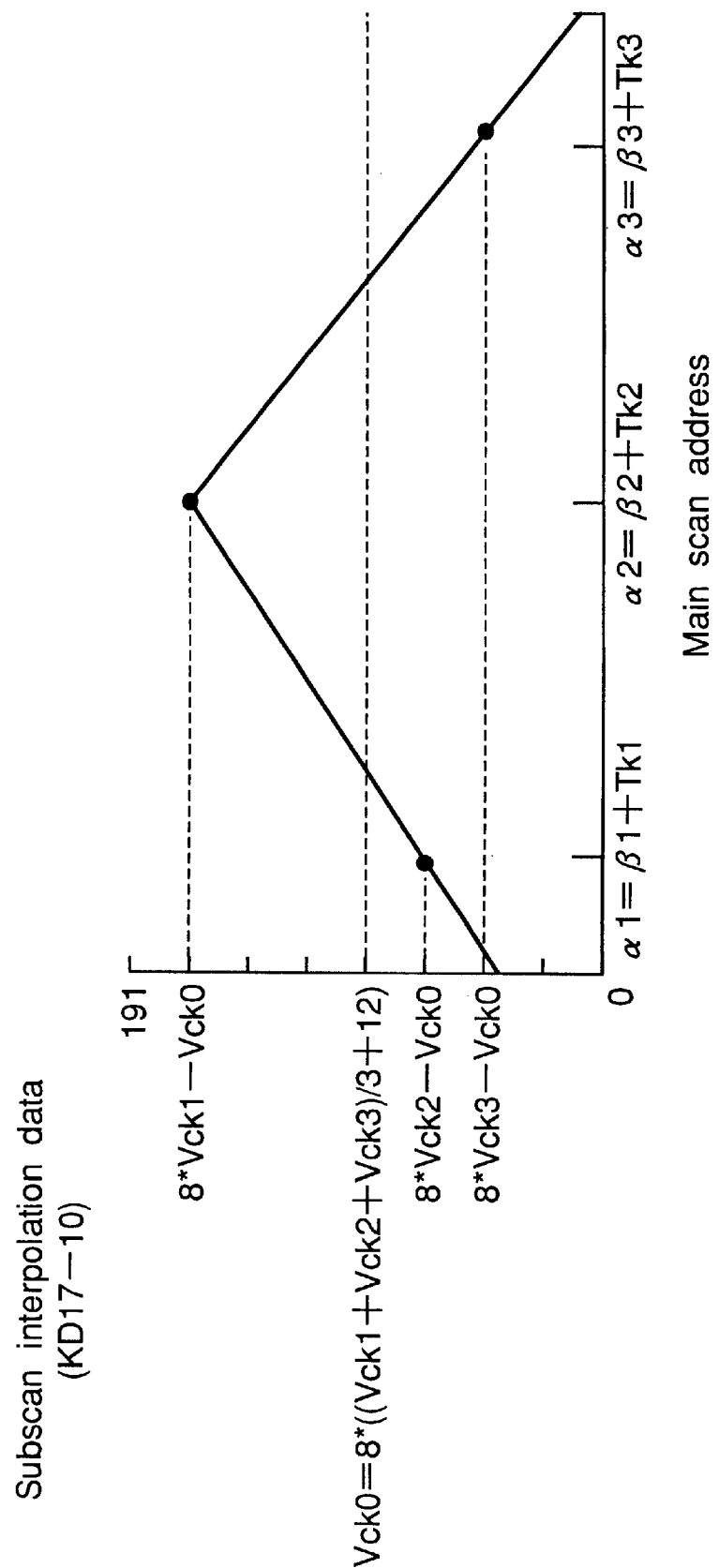
FIG. 40 is a diagram of subscan distortion correction.

Next, in the subscan distortion correction memory, the amount of shift of each color from the K image is expanded into a quadratic approximation curve in the main scan direction shown in FIG. 40. In the distortion corrector, the amount of shift correction equivalent to q lines is 8*q for the interpolation data $KD_{17-10}$. In this case, the position of the resist sensor with respect to the main scan address is corrected by the value $HK_{1-3}$, and the correction data is expanded. When any correction data at any main scan position expanded in the memory is equal to or smaller than 0 ($KD_{17-10}=0$) or equal to or larger than 24 ($KD_{17-10}191$), the central processing unit in the print imaging controller clips the correction data at the upper and lower limit values.

In the correction of the main scan direction, a drawing start position address $HSA_{12-0}$ of the main scan drawing position control of each of C, M, Y and K is determined in the following manner. Assuming that $K\_HSA_{11-0}$ is Q2, $Y\_HSA_{11-0} = Q2 - 16 - (Hyk_1 + Hyk_2 + Hyk_3)/3$, $M\_HSA_{11-0} = Q2 - 16 - (Hmk_1 + Hmk_2 + Hmk_3)/3$, and $C\_HSA_{11-10} = Q2 - 16 - (Hck_1 + Hck_2 + Hck_3)/3$.

Figure 41:
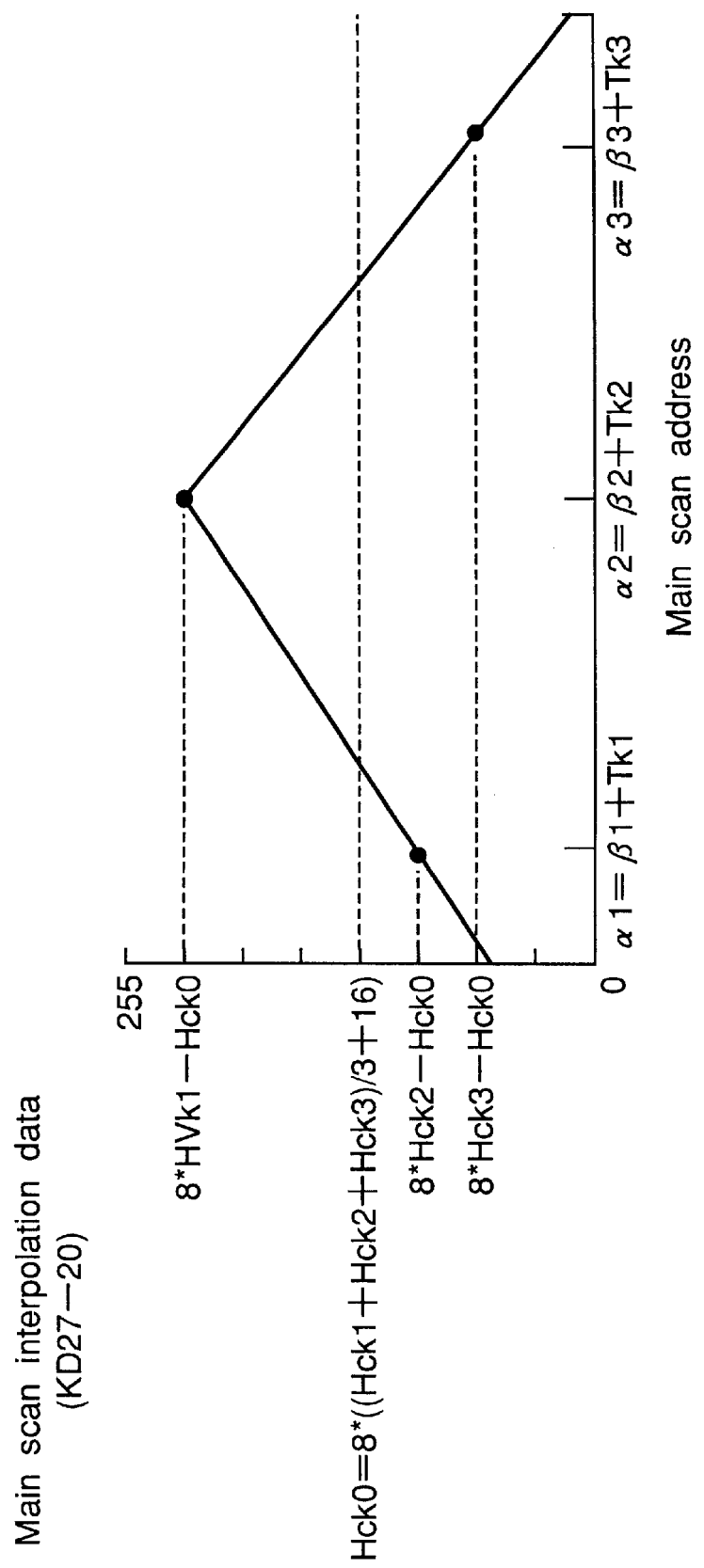
FIG. 41 is a diagram of main scan distortion correction.

Next, in the main scan distortion correction memory, the amount of shift of each color from the K image is expanded into a quadratic approximation curve in the main scan direction shown in FIG. 41.

In this case, the position of the resist sensor with respect to the main scan address is corrected by $Hk_{1-3}$. In the distortion corrector, the amount of shift correction equivalent to q dots is 8*q for the interpolation data $KD_{27-20}$. At this time, the position of the resist sensor with respect to the main scan address is corrected by the value $Hk_{1-3}$, and the correction data is expanded. When any correction data at any main scan position expanded on the memory is equal to or smaller than 0 ($KD_{17-10}=0$) or equal to or larger than=($KD_{27-20}=255$), the central processing unit in the print imaging controller clips the correction data at the upper and lower limit values.

Figure 42A:
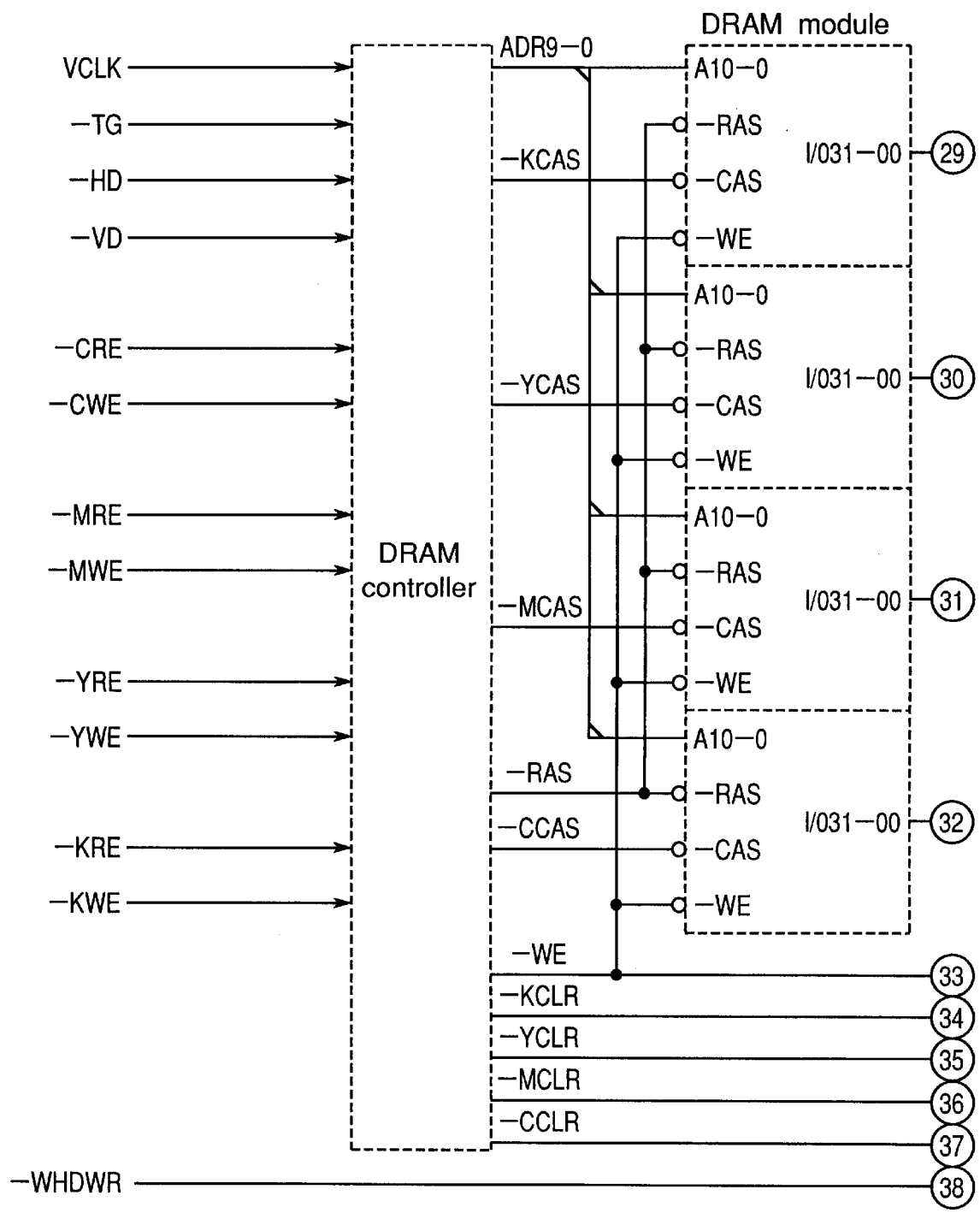
FIGS. 42A and 42B are parts of a block diagram of a frame memory.
Figure 42B:
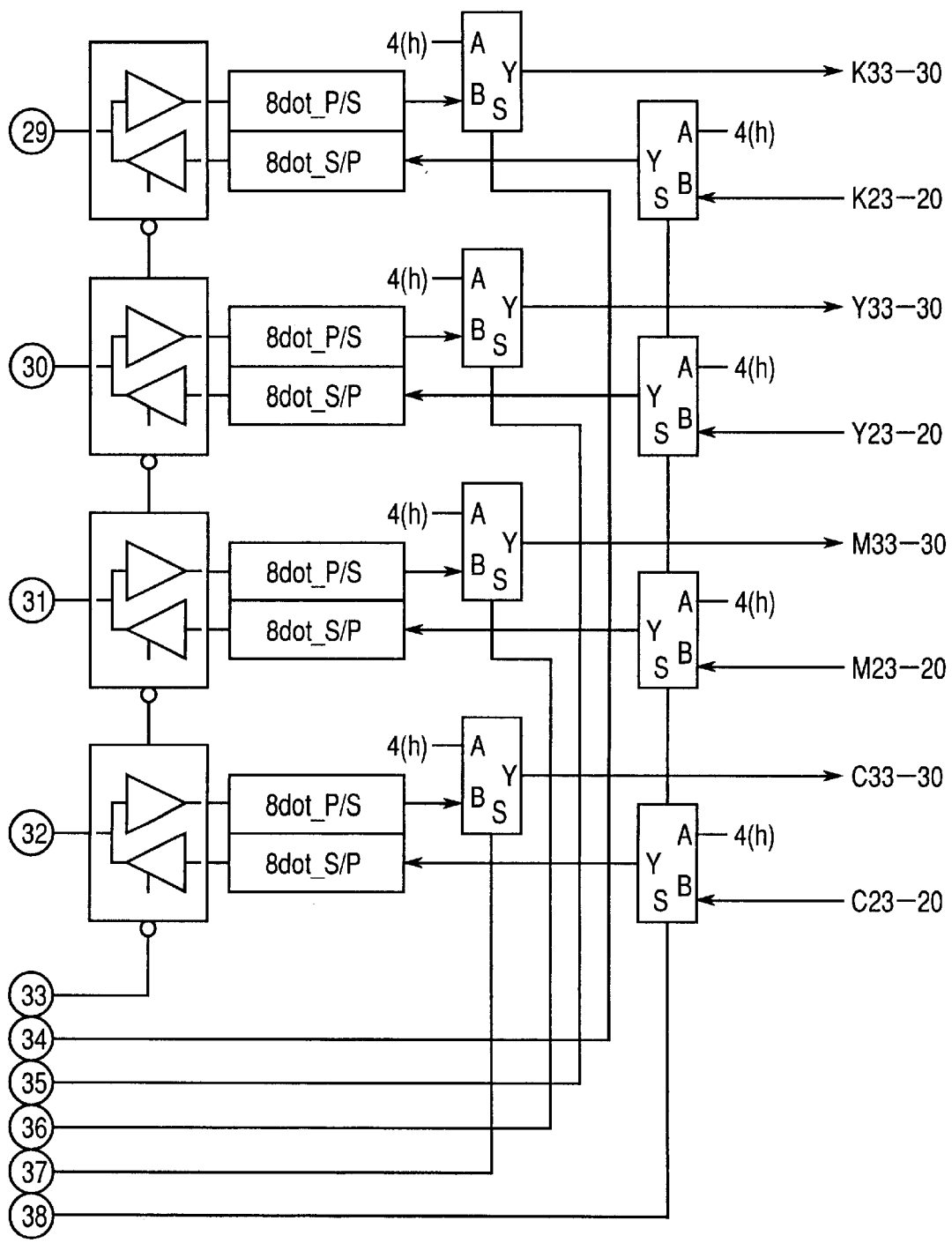

FIGS. 42A and 42B show the frame memory 520. In the double-sided copy operation of the system (for an A4/horizontal paper), an image is formed on five sheets of paper on the transfer belt and along the paper reversal path. A multi-double-sided copy operation is therefore performed by repeating the front-side copy and back-side copy every five sheets. Thus, the image reader needs to temporarily store, in the frame memory, the C, M, Y and K data on the document surface corresponding to the front-side copy. A document surface corresponding to the back-side copy is repeatedly read by the image reader (in the same manner as a normal copy). These functions of the memory and the controller for controlling this memory are performed by the frame memory 520.

In DRAM controller 4401, the main scan address is counted with VLCK (image synchronization clock). The address is cleared by the −TG signal (main scan synchronous signal), and the signals −RAS, −CAS and −WE needed for DRAM control are generated. For the subscan, the address is counted by the TG signal and cleared by −VD signal (subscan enable region signal). At the same time, data writable area signals −C, M, Y, K_WE and data readable area signals −C, M, Y, K_RE are received. The signals WE and −CAS to a DRAM module 4402 are controlled so that they are allowed or inhibited, whereby the write/read can be performed for each region independently of each color. Particularly, the WE signal is enabled at a predetermined timing in the area in which any one of the −C, M, Y, K_WE signals is active ("L"). In this case, in the area in which the −C, M, Y, K_WE signal is active, −C, M, Y, K_CAS signal is allowed to be independently outputted, thereby controlling the write of each color to an optional area of the DRAM module. In the area in which any one of the −C, M, Y, K_RE signals is active, the WE signal is not enabled, and by making −C, M, Y, K_CAS signal active, it is possible to read each color data from the DRAM module in a predetermined area. The signal −RAS is always outputted at a predetermined timing, thus ensuring that the memory device is refreshed. The DRAM module comprises a plurality of DRAMs, and the DRAM module has an area for storing the color data C, M, Y, K on one surface of an A3-size document. The data is written and read in accordance with WE, –CAS and –RAS from the DRAM controller 4401.

The input/output of image data are processed in the same manner as the subscan side of the drawing position controller. That is, for the input, one pack of 8 dots of the main scan is converted from serial to parallel data, to write the 32-bit parallel data. For the output, conversely, the data is converted from parallel to serial data, and the 4-bit serial data is read. For the input, when –WHDWR signal is active ("L"), the data (4h) for initializing the memory device is used as the input data to the frame memory, thereby erasing the memory device in accordance with the write control. When –WHDWR signal is inactive ("H"), the data C, M, Y and $K_{23-20}$ from the gradation reproducer 500 are used as an input data to the frame memory, thereby each color data is controlled to be written to the memory device. For the output, when –C, M, Y, K_CLR signal is "H", a predetermined value (4h) is used as the output data from the frame memory, thereby using the value as transmission data C, M, Y and $K_{33-30}$ to the following step (the drawing position controller). This is performed in the following way. In an area where the 1-node control in an area (–HD="H" or –VD="H") that is not an enable area on the main scan and subscan sides and the color data readable area signals (C, M, Y, K_RE) are inactive, the image data is cleared and outputted. This memory control is used so as to print the sequential data C, M, Y and K transmitted from an external apparatus. This operation is performed in the following manner. The C, M, Y and K image data is sequentially received and sequentially written to a predetermined frame memory for each color. The four colors are simultaneously read, and a full color print is performed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor which processes image data of an image consisting of a plurality of pixels, comprising:
    a first allocator which decides an edge portion in the image included in the image data and allocates a specified attribute as an attribute of pixels located in the edge portion; and
    a second allocator which allocates the specified attribute as an attribute of pixels located in an area interposed between two edge portions,
    wherein said second allocator spreads pixels having the specified attribute allocated by said first allocator in two dimensions, and performs thickening on the attributes of the spread pixels and thinning on them thereafter, whereby said second allocator allocates the specified attribute.

2. The image processor according to claim 1, further comprising an image corrector which performs a specified correction for image data of the pixels to which the specified attribute is allocated by said first and second allocators.

3. The image processor according to claim 2, wherein said first allocator decides a boundary between a character image and a background image as the edge portion.

4. The image processor according to claim 1, wherein said first allocator decides a boundary between a character image and a background image as the edge portion.

5. An image processor which processes image data of an image consisting of a plurality of pixels, comprising:
    a first allocator which decides a boundary portion between a character image and a background in the image included in the image data and allocates a specified attribute as an attribute of pixels located in the boundary portion;
    a second allocator which allocates the specified attribute as an attribute of pixels located in an area interposed between two boundary portions;
    an area discriminator which discriminates whether each of the image data belongs to a character image area or a background image area; and
    a corrector which performs a specified correction for image data of the pixels to which the specified attribute is allocated by said first and second allocators according to discrimination by said area discriminator;
    wherein in order to allocate the specified attribute, said second allocator spreads pixels having the specified attribute allocated by said first allocator in two dimensions, and performs thickening on the attributes of the spread pixels and thinning on them thereafter, whereby said second allocator allocates the specified attribute.

6. An image processor which processes image data of an image consisting of a plurality of pixels, comprising:
    a first allocator which decides a boundary portion between a character image and a background in the image included in the image data and allocates a specified attribute as an attribute of pixels located in the boundary portion;
    a second allocator which allocates the specified attribute as an attribute of pixels located in an area interposed between two boundary portions;
    an area discriminator which discriminates whether each of the image data belongs to a character image area or a background image area; and
    a corrector which performs a specified correction for image data of the pixels to which the specified attribute is allocated by said first and second allocators according to discrimination by said area discriminator,
    wherein said second allocator lays the pixels having the specified attribute allocated by said first allocator in two dimensions, and performs thickening on the attributes of the spread pixels and thinning on them thereafter, in the allocation of the specified attribute to pixels on which said area discriminator decides belong to a character image area.

7. An image processor which processes image data of an image consisting of a plurality of pixels, comprising:
    a first allocator for detecting a boundary portion between a character image and a background in the image included in the image data and assigning a specified attribute as an attribute of pixels located in the boundary portion;
    a second allocator for assigning said specified attribute as an attribute of pixels located in an area interposed between two boundary portions;
    a first emphasis means for emphasizing the detected edge portion of the image data to which the specified attribute is assigned by the first allocator; and
    a second emphasis means for emphasizing, by increasing the density thereof, the interposed portion to which the specified attribute is assigned by the second allocator.

8. An image processor which processes image data of an image consisting of a plurality of pixels, comprising:

a first allocator which decides an edge portion in the image included in the image data and allocates a specified attribute as an attribute of pixels located in the edge portion;

a second allocator which allocates the specified attribute as an attribute of pixels located in an area interposed between two edge portions;

an area discriminator for discriminating whether the image data belongs to a character image area or a background image area; and a corrector for performing a specified correction on image data from one of at least two data sources in accordance with the discrimination of said area discriminator, wherein a first one of the at least two data sources provides image data that has been processed by said first allocator and that has bypassed said second allocator, and wherein a second one of the at least two data sources provides image data that has been processed by said first allocator and that has also been processed by said second allocator.

9. The image processor according to claim 8, wherein the corrector performs the specified correction on image data from the first one of the at least two data sources when the area discriminator discriminates that the image data belongs to the background image area, and wherein the corrector performs the specified correction on image data from the second one of the at least two data sources when the area discriminator discriminates that the image data belongs to the character image area.

10. The image processor according to claim 9, wherein the corrector comprises one or more emphasis means, and wherein the specified correction performed by the corrector includes an edge emphasis process.

* * * * *

UNITED STATES PATENT AND TRADEMARK OFFICE
CERTIFICATE OF CORRECTION

PATENT NO. : 6,631,207 B2
DATED : October 7, 2003
INVENTOR(S) : Yoshihiko Hirota et al.

It is certified that error appears in the above-identified patent and that said Letters Patent is hereby corrected as shown below:

Column 4,
Line 10, after "Then", insert -- , --.

Column 8,
Line 3, delete "can", and insert -- scan --.

Column 9,
Line 18, delete "450", and insert -- 45° --.

Column 10,
Line 20, after "C", delete ".", and insert -- , --.
Line 23, delete "$MM_{7-0}= MY_{7-0}$ 128.", and insert -- $MM_{7-0}= MY_{7-0}= 128.$ --.
Line 29, delete "UCRIBP", and insert -- UCR/BP --.
Line 57, delete "$\alpha(W)/P(W)$", and insert -- $\alpha(W)/\beta(W)$ --.

Column 11,
Line 27, delete "experimentally-determined," and insert -- experimentally determined --.
Line 37, delete "(-MCAREA "L")", and insert -- (–MCAREA ="L") --.
Line 39, delete "$Ki_{17-10}$" and insert -- $K_{17-10}$ --.

Column 12,
Line 11, delete "$W_{97-80}$", and insert -- $W_{87-80}$ --.

Column 14,
Line 30, delete "$WREF_{7-10}$", and insert -- $WREF_{17-10}$ --.
Line 31, delete "$MIN_{87-8}$", and insert -- $MIN_{87-80}$ --.

Column 17,
Line 59, after "mode", insert -- , --.

Column 18,
Line 50, delete "color-to", and insert -- color to --.

Column 20,
Lines 42 and 61, delete "morie", and insert -- moiré --.

Column 21,
Line 65, delete "solutions", and insert -- resolutions --.

Column 23,
Line 49, delete "offset-quantity", and insert -- offset quantity --.

UNITED STATES PATENT AND TRADEMARK OFFICE
CERTIFICATE OF CORRECTION

PATENT NO. : 6,631,207 B2
DATED : October 7, 2003
INVENTOR(S) : Yoshihiko Hirota et al.

It is certified that error appears in the above-identified patent and that said Letters Patent is hereby corrected as shown below:

Column 25,
Line 28, after "O", insert -- , --.
Line 62, after "–FREEZE", insert -- = --.

Column 27,
Line 51, delete "Doubt$_8$", and insert -- Dout$_8$ --.

Column 28,
Line 10, before "mixture", insert -- A --.

Column 29,
Line 25, after "controller", insert -- , --.

Column 31,
Line 25, delete "Hyk$_{1-3}$", and insert -- Hyk$_{1-3}$) --.
Line 41, delete "αa$_{1-3}$,", and insert -- α$_{1-3}$, --.

Column 32,
Lines 24 and 25, delete "=(KD$_{27-20}$ = 255)", and insert -- 32 (KD$_{27-20}$ = 255) --.

Signed and Sealed this

Sixth Day of July, 2004

JON W. DUDAS
*Acting Director of the United States Patent and Trademark Office*